US008351383B2

(12) United States Patent
Agarwal

(10) Patent No.: US 8,351,383 B2
(45) Date of Patent: Jan. 8, 2013

(54) CARRIER GROUP APPORTIONMENT FOR A SATELLITE COMMUNICATIONS SYSTEM

(75) Inventor: Anil Agarwal, North Potomoc, MD (US)

(73) Assignee: ViaSat, Inc., Carlsbad, CA (US)

(*) Notice: Subject to any disclaimer, the term of this patent is extended or adjusted under 35 U.S.C. 154(b) by 455 days.

(21) Appl. No.: 12/615,491

(22) Filed: Nov. 10, 2009

(65) Prior Publication Data

US 2010/0118765 A1    May 13, 2010

Related U.S. Application Data

(60) Provisional application No. 61/112,924, filed on Nov. 10, 2008.

(51) Int. Cl.
H04W 4/00      (2009.01)
H04W 72/00     (2009.01)
H04J 3/22      (2006.01)
H04B 7/185     (2006.01)

(52) U.S. Cl. ....... 370/329; 370/316; 370/468; 455/12.1; 455/452.1

(58) Field of Classification Search ....... 370/229–235.1, 370/312, 316, 320, 321, 324, 326, 328, 329, 370/336, 468, 522; 455/12.1, 77, 427, 450, 455/452.1, 447
See application file for complete search history.

(56) References Cited

U.S. PATENT DOCUMENTS

| | | | |
|---|---|---|---|
| 5,216,427 A | 6/1993 | Yan et al. | |
| 5,552,920 A | 9/1996 | Glynn | |
| 5,790,070 A | 8/1998 | Natarajan et al. | |
| 5,914,944 A | 6/1999 | Haugli et al. | |
| 6,037,983 A | 3/2000 | Au et al. | |
| 6,091,936 A | 7/2000 | Chennakeshu et al. | |
| 6,574,794 B1 | 6/2003 | Sarraf | |
| 7,027,414 B2 | 4/2006 | Walsh et al. | |
| 7,130,283 B2 * | 10/2006 | Vogel et al. | 370/322 |
| 7,366,134 B2 | 4/2008 | Bose et al. | |
| 7,382,743 B1 | 6/2008 | Rao et al. | |
| 7,729,244 B2 | 6/2010 | Sadr | |
| 7,751,320 B2 | 7/2010 | Nuzman et al. | |
| 7,936,707 B2 * | 5/2011 | Kota et al. | 370/316 |
| 7,945,269 B2 * | 5/2011 | Drakos | 455/450 |

(Continued)

FOREIGN PATENT DOCUMENTS

EP    1089459 A2    4/2001

(Continued)

OTHER PUBLICATIONS

PCT Application No. PCT/US2010/038721, International Search Report dated Oct. 19, 2010, 13 pages.

(Continued)

Primary Examiner — Habte Mered
(74) Attorney, Agent, or Firm — Holland & Hart LLP

(57) ABSTRACT

Satellite communications systems, methods, and related devices are described. In one embodiment, a satellite communications system is configured to dynamically allocate bandwidth and frequencies among different beams. Bandwidth request data may be received and compiled from the terminals. The satellite may be configured with different beam coverage areas, and may dynamically allocate bandwidth and particular frequency channels to different beam coverage areas based on the requests. In each of a series of one or more epochs, and according to the bandwidth requests, there may be allocations among carrier groups, traffic classes, and particular terminals. The setup of slot structure and selection of modes for particular terminals is also addressed.

24 Claims, 37 Drawing Sheets

U.S. PATENT DOCUMENTS

| | | |
|---|---|---|
| 8,085,802 B1 | 12/2011 | Monk et al. |
| 2001/0049284 A1 | 12/2001 | Liu et al. |
| 2002/0027896 A1 | 3/2002 | Hughes et al. |
| 2002/0054576 A1 | 5/2002 | Gobbi |
| 2002/0159403 A1 | 10/2002 | Reddy |
| 2002/0176398 A1 | 11/2002 | Nidda |
| 2003/0031141 A1 | 2/2003 | Schweinhart et al. |
| 2003/0069043 A1 | 4/2003 | Chhaochharia et al. |
| 2004/0100941 A1 | 5/2004 | Lim |
| 2004/0192376 A1 | 9/2004 | Grybos |
| 2004/0219923 A1 | 11/2004 | Oses et al. |
| 2005/0037764 A1 | 2/2005 | Trachtman |
| 2005/0053033 A1 | 3/2005 | Kelly et al. |
| 2005/0227618 A1 | 10/2005 | Karabinis et al. |
| 2007/0195817 A1 | 8/2007 | Denney et al. |
| 2008/0001812 A1 | 1/2008 | Jalali |
| 2008/0062028 A1 | 3/2008 | Chang |
| 2008/0080451 A1 | 4/2008 | Rofougaran |
| 2008/0146145 A1 | 6/2008 | Pateros et al. |
| 2008/0219266 A1 * | 9/2008 | Agarwal et al. ............... 370/392 |
| 2008/0233865 A1 | 9/2008 | Malarky et al. |
| 2008/0320540 A1 | 12/2008 | Brooks et al. |
| 2009/0109895 A1 | 4/2009 | Kota et al. |
| 2010/0034107 A1 | 2/2010 | Chin et al. |
| 2010/0118764 A1 | 5/2010 | Agarwal |
| 2010/0118766 A1 | 5/2010 | Agarwal |
| 2010/0118767 A1 | 5/2010 | Agarwal |
| 2010/0118769 A1 | 5/2010 | Agarwal |
| 2010/0120357 A1 | 5/2010 | Agarwal |
| 2010/0120359 A1 | 5/2010 | Agarwal |
| 2010/0120418 A1 | 5/2010 | Agarwal |
| 2010/0238869 A1 | 9/2010 | Bruin et al. |
| 2010/0255776 A1 | 10/2010 | Hudson et al. |
| 2010/0315949 A1 | 12/2010 | Agarwal |
| 2011/0034166 A1 | 2/2011 | Karabinis et al. |

FOREIGN PATENT DOCUMENTS

| | | |
|---|---|---|
| WO | WO 99-49590 A1 | 9/1999 |
| WO | WO 2004-073229 A2 | 8/2004 |
| WO | WO-2008-100341 A2 | 8/2008 |
| WO | WO 2008-109860 A2 | 9/2008 |

OTHER PUBLICATIONS

PCT Application No. PCT/US2009/063919, International Search Report dated Jun. 22, 2010, 4 pages.
PCT Application No. PCT/US2009/063914, International Search Report dated Jun. 28, 2010, 16 pages.
PCT Applicaiton No. PCT/US2009/063917, International Search Report dated Jun. 24, 2010, 13 pages.
Non-final Office Action, U.S. Appl. No. 12/615,483, dated Feb. 2, 2012, 20 pgs.
International Preliminary Report on Patentability, Int'l App. No. PCT/US2009/063919, dated May 19, 2011, 6 pgs.
Non-final Office Action, U.S. Appl. No. 12/615,709, dated Mar.14, 2012, 21 pgs.
Non-final Office Action, U.S. Appl. No. 12/615,720, dated Mar.13, 2012, 22 pgs.
Non-final Office Action, U.S. Appl. No. 12/615,735, dated Mar.1, 2012, 20 pgs.
International Preliminary Report on Patentability, Int'l App. No. PCT/US2009/063917, dated May 19, 2011, 8 pgs.
Non-final Office Action, U.S. Appl. No. 12/615,488, dated Feb. 28, 2012, 19 pgs.
Notice of Allowance, U.S. Appl. No. 12/615,499, dated Jan. 27, 2012, 15 pgs.
International Preliminary Report on Patentability, Int'l App. No. PCT/US2009/063914, dated May 19, 2011, 11 pgs.
International Preliminary Report on Patentability, Int'l App. No. PCT/US2010/038721, dated Dec. 29, 2011, 8 pgs.
Non-final Office Action dated Oct. 12, 2012, U.S. Appl. No. 13/569,641, 19 pgs.
Notice of Allowance dated Oct. 12, 2012, U.S. Appl. No. 12/615,720, 15 pgs.
Non-final Office Action dated Aug. 2, 2012, U.S. Appl. No. 12/615,488, 21 pgs.
Notice of Allowance dated Oct. 15, 2012, U.S. Appl. No. 12/615,499, 12 pgs.
Non-final Office Action dated Aug. 22, 2012, U.S. Appl. No. 12/615,512, 24 pgs.

* cited by examiner

| Terminal Id | Terminal Priority | Mode | Class | Min SR | CIR | RIR |
|---|---|---|---|---|---|---|
| 1 | 3 | Burst Size, Modulation | 0 | 32 | 100 | 50 |
| | | | 1 | 64 | 0 | 200 |
| | | | 2 | 0 | 100 | 100 |
| | | | 3 | 0 | 200 | 200 |

FIG. 3

| | | | 3105-a | 3105-b | 3105-c | 3105-d |
|---|---|---|---|---|---|---|
| | | | 1.67 Mhz | 5 Mhz | 20 Mhz | 80 Mhz |
| 3110-a | BPSK | Pr/No<br>Mbps/Ch<br>Mbps/80MHz<br>Min Alloc | 7 dB<br>.5 Mbps<br>25.1 Mbps<br>.008 Mbps | 11 dB<br>1.6 Mbps<br>25.1 Mbps<br>.022 Mbps | 17 dB<br>6.3 Mbps<br>25.1 Mbps<br>.088 Mbps | 24 dB<br>25.1 Mbps<br>25.1 Mbps<br>.355 Mbps |
| 3110-b | QPSK | Pr/No<br>Mbps/Ch<br>Mbps/80MHz<br>Min Alloc | 10 dB<br>1.1 Mbps<br>50.3 Mbps<br>.016 Mbps | 14 dB<br>3.2 Mbps<br>50.3 Mbps<br>.044 Mbps | 20 dB<br>12.6 Mbps<br>50.3 Mbps<br>.176 Mbps | 27 dB<br>50.3 Mbps<br>50.3 Mbps<br>.708 Mbps |
| 3110-c | 8-PSK | Pr/No<br>Mbps/Ch<br>Mbps/80MHz<br>Min Alloc | 16 dB<br>2.2 Mbps<br>100.7 Mbps<br>.032 Mbps | 21 dB<br>6.4 Mbps<br>100.7 Mbps<br>.088 Mbps | 27 dB<br>25.1 Mbps<br>100.7 Mbps<br>.352 Mbps | 33 dB<br>100.7 Mbps<br>100.7 Mbps<br>1.41 Mbps |
| 3110-d | 16 QAM | Pr/No<br>Mbps/Ch<br>Mbps/80MHz<br>Min Alloc | | 23 dB<br>8.32 Mbps<br>133.4 Mbps<br>.116 Mbps | 29 dB<br>33.26 Mbps<br>133.4 Mbps<br>.471 Mbps | 35 dB<br>133.4 Mbps<br>133.4 Mbps<br>1.87 Mbps |

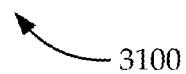

CARRIER GROUP APPORTIONMENT FOR A SATELLITE COMMUNICATIONS SYSTEM

CROSS-REFERENCES

This application claims priority from U.S. Provisional Patent Application No. 61/112,924, filed Nov. 10, 2008, entitled "DYNAMIC BANDWIDTH RESOURCE ALLOCATION FOR MULTI-BEAM SATELLITE UPLINKS", which is hereby expressly incorporated by reference in its entirety for all purposes.

This application is related to the following commonly assigned patent applications:

U.S. patent application Ser. No. 12/615,488, filed Nov. 10, 2009, entitled "BANDWIDTH ALLOCATION ACROSS BEAMS IN A MULTI-BEAM SYSTEM";

U.S. patent application Ser. No. 12/615,499, filed Nov. 10, 2009, entitled "APPORTIONED CARRIER GROUP SLOT PLACEMENT FOR A SATELLITE COMMUNICATIONS SYSTEM"; and U.S. patent application Ser. No. 12/615,512, filed Nov. 10, 2009, entitled "TERMINAL MODE ASSIGNMENT FOR A SATELLITE COMMUNICATIONS SYSTEM"; each of which is hereby expressly incorporated by reference in its entirety for all purposes.

This application is also related to the following applications:

U.S. patent application Ser. No. 12/615,709, filed Nov. 10, 2009, entitled "TRAFFIC CLASS POOL SIZING FOR A SATELLITE COMMUNICATIONS SYSTEM";

U.S. patent application Ser. No. 12/615,720, filed Nov. 10, 2009, entitled "TERMINAL SLOT ASSIGNMENT FOR A SATELLITE COMMUNICATIONS SYSTEM";

U.S. patent application Ser. No. 12/615,735 filed Nov. 10, 2009, entitled "RESOURCE FAIRNESS POLICIES FOR ALLOCATION OF RESOURCES IN A SATELLITE COMMUNICATIONS SYSTEM"; and U.S. patent application Ser. No. 12/615,483, filed Nov. 10, 2009, entitled "DYNAMIC FREQUENCY ASSIGNMENT IN A MULTI-BEAM SYSTEM".

STATEMENT AS TO RIGHTS TO INVENTIONS MADE UNDER FEDERAL CONTRACTS

This Government may have rights in aspects of this invention pursuant to Prime Contract No. FA8808-04-C-0023.

BACKGROUND

The present invention relates to satellite communications in general and, in particular, to resource allocation in a multi-beam satellite communications network.

Satellite communications systems often have a limited amount of available resources to be allocated to terminals. In many multi-beam system designs, a set amount of such resources is allocated to each beam. However, the resource needs for the terminals within each beam and, consequently, the beams themselves, may change over time. Moreover, different terminals may have different priority levels, have varying service level agreements, and carry different types of traffic.

It may, therefore, be desirable to utilize a system design in which bandwidth is allocated among beams, within beams, and to terminals dynamically, in response to bandwidth requests and various quality of service metrics.

SUMMARY

Novel satellite communications systems, methods, and related devices are described. In some embodiments, a satellite communications network is configured to dynamically allocate resources among different beams, and allocate specific time-slots to terminals. Such a network may be made up of a satellite in communication with terminals (e.g., user terminals or gateways). Resource requests from the terminals may be received and compiled (e.g., by a gateway, the satellite, or any combination thereof). The satellite may be configured with different beam coverage areas, and resources (e.g., bandwidth, particular frequency channels, etc.) may be allocated to different beam coverage areas based on the requests. A number of ordering and allocation schemes are described, as well. Slots may be allocated to particular terminals based on the resource requests.

In a first set of embodiments, systems, methods, and devices are described for dynamically allocating uplink bandwidth to particular beams of a multi-beam satellite system. The allocation may be based on bandwidth requests received from particular terminals. In some instances, the allocation may be made based on information in the requests such as terminal priority, traffic class, minimum sustained rate (MinSR), committed information rate (CIR), and requested information rate (RIR). In a second set of embodiments, frequency channels may be assigned to particular beams of a multi-beam satellite system. There may be a number of distinct frequency channels that may be assigned to different beams, and different reuse patterns may be utilized.

In a third set of embodiments, systems, methods, and devices are described to determine how to apportion allocated bandwidth (and perhaps leftover slots) among different carrier group sizes. Thus, for allocated bandwidth, there may be an identification of the total number of slots for each carrier group size (e.g., across n epochs). In a fourth set of embodiments, the apportioned slots in each carrier group may be re-apportioned among traffic classes. The carrier group apportionment and class pool sizing may be based on bandwidth requests received from particular terminals. As above, decisions may be made based on terminal priority, traffic class, minimum sustained rate (MinSR), committed information rate (CIR), and requested information rate (RIR).

In a fifth set of embodiments, systems, methods, and devices are described to place the apportioned slots of different carrier groups in particular time and frequency slots before they are actually assigned to particular terminals. Various spreading schemes are described to generate a layout wherein the time and frequency slots are used efficiently.

In a sixth set of embodiments, systems, methods, and devices are described to assign, for each class, the slots of different carrier groups to particular terminals. Thus, assume that each traffic class for a set of terminals is allocated a number of slots within each carrier group. For each class, the slots may be assigned to particular terminals based on terminal priority, traffic class, MinSR, CIR, and RIR.

In a seventh set of embodiments, systems, methods, and devices are described to identify a mode that will be used for a terminal. The mode for a terminal may be assigned dynamically in response to a bandwidth request of a terminal and an uplink power to noise ratio (Pr/No) (or other signal quality factors). A mode for a terminal may be defined by the carrier group and modulation scheme being used, while in other embodiments the mode may also be defined by the coding rate or other factors.

In an eighth set of embodiments, systems, methods, and devices are described for resource sharing when available resources are insufficient. For example, when resources are insufficient to meet aggregate MinSR, CIR, or RIR requests, there are a number of ways the available resources may be distributed. In some embodiments, a sharing policy provides priority or weighted allocations to the particular traffic classes. Allocations may also be in proportion to the CIR requests for one or more classes at one or more terminals. Proportional, Weighted Proportional, Fair Share, and Weighted Fair Share policies are described.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 is a diagram of a table making up a resource request from a terminal according to various embodiments of the invention.

FIG. 31 is a block diagram of a mode table illustrating a variety of mode options according to various embodiments of the invention.

DETAILED DESCRIPTION

Novel satellite communications systems, methods, and related devices are described. In some embodiments, a satellite communications network is configured to dynamically allocate bandwidth among different beams, prioritize allocations with such beams, and allocate specific time-slots to terminals. Such a network may be made up of a satellite in communication with terminals (e.g., user terminals or gateways). Resource requests from the terminals may be received and compiled (e.g., by a network control center, the satellite, or a combination thereof). The satellite may be configured with different beam coverage areas, and resources (e.g., bandwidth, particular frequency channels, etc.) may be allocated to different beams based on the requests. A number of ordering and allocation schemes are described within beams, as well. For example, time slots may be allocated to particular terminals based on terminal requests, quality of service agreements, traffic composition, and terminal priority.

This description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

As noted above, a satellite communications network may be configured to dynamically allocate resources among different beams, allocate resources within beams, and allocate resources to particular terminals. In some embodiments, the satellite may be configured with different uplink beam coverage areas, and uplink resources may be allocated to and within different uplink beams. In other embodiments, much of the functionality described herein may be used on downlink beams.

Figure 1:
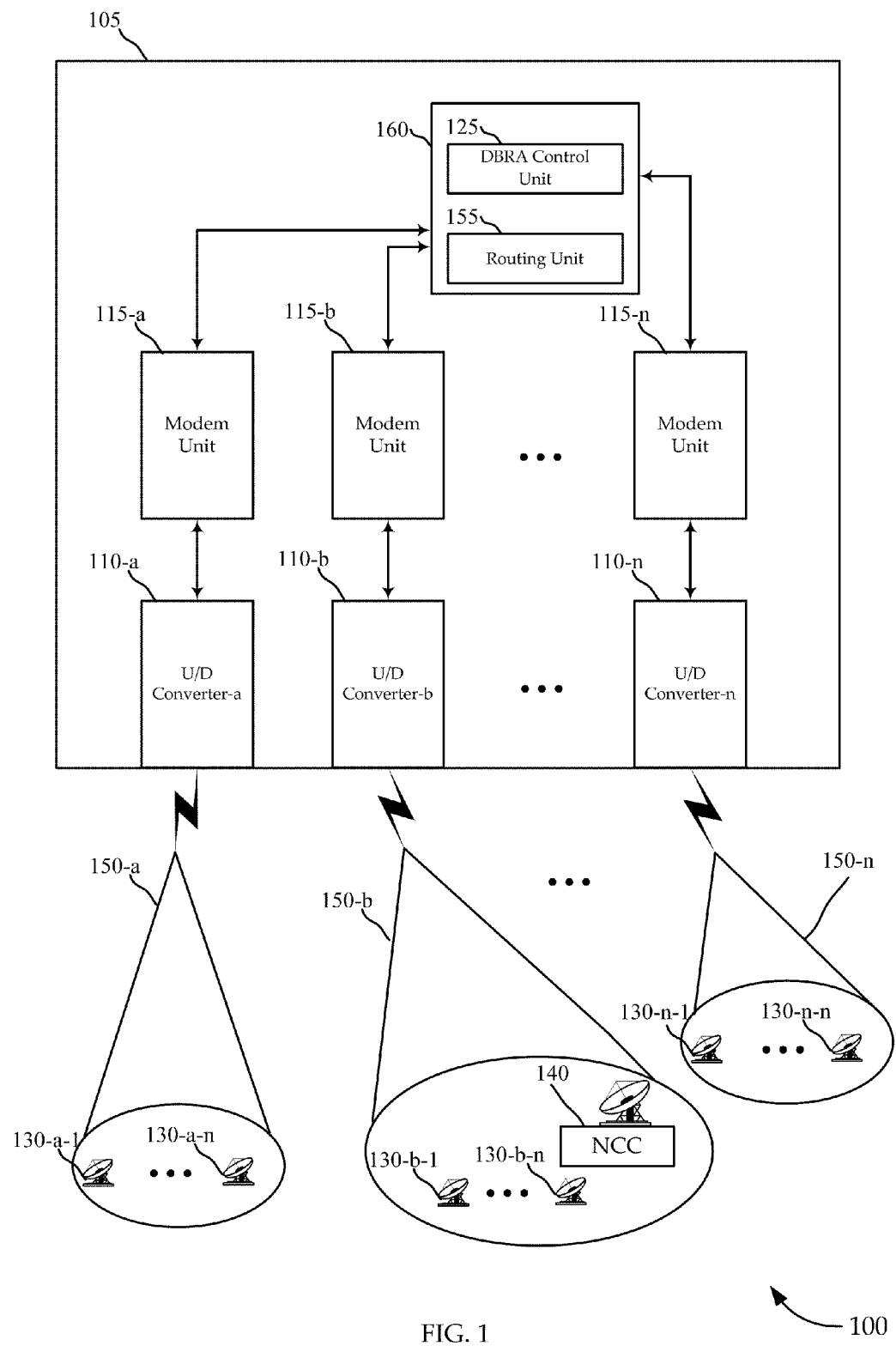
FIG. 1 is a block diagram of a satellite communications system configured according to various embodiments of the invention.

FIG. 1 is a high level block diagram illustrating a satellite communications system 100 according to various embodiments of the invention. The system includes a satellite 105 in communication with terminals 130 (e.g., subscriber terminals or gateways), a network control center (NCC) 140, and possibly one or more other satellites (not shown). The satellite 105 in the illustrated embodiment includes three or more beams 150-a, 150-b . . . 150-n, each beam 150 including a coverage area (note that in other embodiments, there may be a single beam satellite). Respective U/D converters 110 may receive signals transmitted via the terminals 130, and transmit signals to terminals 130, in their beam coverage area, as shown in FIG. 1. The U/D converters 110 for each beam may be configurable to receive different frequency ranges, and may be dynamically configured to serve different beams (e.g., all or part of one or more beams). U/D converters 110 are in communication with modem units 115, which may provide a range of modulator and demodulator functionality described in more detail below. The modem units 115 are in communication with a control unit 160 (including DBRA control unit 125 and routing unit 155), which may manage and allocate system and satellite 105 resources.

Each beam 150 supports the terminals 130 within its coverage area (e.g., providing uplink and downlink resources). Each beam 150 may be allocated one, or more, frequency channels. The coverage of different beams 150 may be non-overlapping or have varying measures of overlap. A portion of spectrum may also be allocated for use to communicate with another satellite (not shown) via an inter-satellite link (ISL). The satellite 105 may provide connectivity between terminals 130 in the same beam and across beams (via star or mesh connections), as well as to and from beams of other satellites via ISLs. Thus, for terminals 130 served by the same satellite 105, there may be full-mesh, single-hop connectivity between terminals, or they may communicate via the NCC 140. For terminals 130 served by different satellites, there may be full-mesh, two-satellite-hop connectivity between terminals, or various star configurations may be employed.

In one embodiment, the DBRA control unit 125 onboard satellite 105 manages bandwidth resources (e.g., ranges of frequencies, and time slots therein) and assigns them to coverage beams 150 and terminals 130. These allocations may be for a downlink or uplink, although much discussion herein is attributable to the uplink. To accomplish these allocations, the DBRA control unit 125 dynamically manages both bandwidth resources and satellite 105 resources (e.g., routing and switching functionality, U/D converter frequencies, demodulators, modulators, buffers, etc.). DBRA resource management decisions may be driven by terminals 130, as the DBRA control unit 125 may receive terminal 130 resource requests and link characteristics, and assign frequencies and slots to terminals dynamically based on service level agreements (SLAs) and terminal priority, for example. In other embodiments, one or more of the DBRA control unit 125 functions described herein may be performed by the NCC 140 (which may be made up of a number internetworked devices, or be integrated into a gateway terminal). Various types of bandwidth-related resources are described generally herein as "resource units." For example, a resource unit may include an assignable or allocatable time slot, frequency sub-band, or any other type of system or satellite resource. Further, the resource units may not correspond to other units of measurement (e.g., each time slot resource unit does not necessarily represent a single time slot), and should therefore be broadly construed, for example as any type of quantization that is useful for allocation.

Terminals 130 may be mobile or fixed, and thus may log on to different beams 150 depending on location and may move from beam to beam. Terminals 130 (which may include the NCC 140) may, for example, request particular amounts of uplink bandwidth for different traffic types, and may consume varying amounts of uplink resources for different types of traffic, using varying link condition dependent uplink modes. The DBRA control unit 125 may be configured to allocate the appropriate amount of resources at the right mode to each terminal. It may utilize sharing rules (policies) to allocate resources among terminals when demand exceeds resource availability, providing preferences to higher priority terminals and terminal traffic that conforms to the SLAs. In some embodiments, terminal 130 SLAs provide information about how much traffic of a given traffic class is guaranteed to a terminal (CIR). Multi-level CIR may be used to provide the capability to break up the CIR into multiple levels, in increasing order of priority.

In one embodiment, the satellite 105 includes a separate modem unit 115 for each beam, and the modem units 115 may be managed by the DBRA control unit 125. Each modem unit 115 may receive a signal (e.g., an IF signal) from, or output a signal to, an associated U/D converter 110. Each modem unit 115 may provide some or all of the physical, link, and MAC layer functions for signals received from terminals 130. In another embodiment, a single integrated modem device may support two or more of the beams by housing two or more logical modem units 115. Other modem configurations may be used as well, as evident to those skilled in the art. A variety of functions may be performed by the modems units 115, such as: a) modulation, coding, framing, time-division multiple access (TDMA); b) dynamic/adaptive/variable modulation/coding; c) frequency and/or power management; d) master, or secondary, reference terminal functions, including acquisition and synchronization support and link quality measurements (e.g., measuring frequency, timing, or power of one or more received signals); e) packet segmentation and reassembly; f) dynamic TDMA bandwidth request; g) packet queuing, scheduling, and queue management; and h) internet protocol (IP) packet routing and forwarding. In other embodiments, one or more of these functions may be performed by the NCC 140.

The routing unit 155, in communication with each of the modem units 115, may provide the layer 3 functionality or other routing functionality (instead of the modem units 115), including IP packet routing across multiple beams/transponders. The routing unit 155 (or the modem units 115) may perform a variety of routing functions including: a) IP routing for various protocols (RIP, BGP, OSPF, PIM) and multicast replication; b) traffic conditioning, policing, and access control; and c) RSVP/ARSVP.

The NCC 140 may also provide network management services for the modems 115 and the terminals 130. The NCC 140 may include the following functions: a) IP modem management (provisioning, configuration, software/firmware downloads to terminals, status and performance management); b) system broadcast messages; c) terminal acquisition and synchronization support; d) adaptive terminal frequency, timing, and power management support and correction; e) dynamic bandwidth/resource allocation; and f) interface with network management and router management.

Therefore, uplink and downlink bandwidth (or other resources) may be dynamically assigned to terminals 130 by the DBRA control unit 125 onboard satellite 105, the NCC 140, or any combination thereof. Terminals 130 may measure traffic flows and estimate uplink bandwidth requirements, and may send bandwidth requests periodically to the DBRA control unit 125, or to the NCC 140 (via satellite 105 or otherwise). In the alternative, bandwidth needs may be estimated. Specific time slots in specific uplink carriers may be dynamically allocated to individual terminals 130 based on requests and/or estimates. For downlink bandwidth, a similar process may occur, except that bandwidth estimation and requests may be done by any combination of the satellite modem units 115, the NCC 140, the DBRA control unit 125, or terminals 130. Time slots in specific downlink carriers may be allocated to individual modem units 115, perhaps for communication with particular terminals 130. The NCC 140 and/or the DBRA control unit 125 may include algorithms and software to efficiently perform dynamic bandwidth allocation for all terminals, while meeting CIR and fairness objectives.

System 100 parameters may be configurable using the NCC 140 and can be optimized even after the system is operational. Examples of such parameters include carrier group sizing, spacing and number, number of bursts for control and management traffic, guard times between bursts, and rules for bandwidth allocation. In one embodiment, an off-path link is made available for managing modem units 115 and the DBRA control unit 125 (e.g., in case the on-path link becomes unavailable due to a software and/or hardware failure). This off-path link may be a slow access link. Thus, the NCC 140 may be configured to control, manage, and monitor the links of the system 100. The NCC 140 may monitor and control links in beams other than its own. The NCC 140, therefore, may perform near real-time capacity and dynamic bandwidth management in addition to configuration, accounting, performance, and security/authentication functions. The NCC 140 may host a web server to provide access to browser clients.

As noted above, although the communications system 100 is illustrated as a geostationary satellite-based communications system, it should be noted that various embodiments described herein are not limited to use in geostationary satellite-based systems, for example some embodiments could be low earth orbit (LEO) satellite-based systems. The terminals 130 may include, for example, gateways or subscriber terminals (sometimes called user terminals). The system 100 may be a star, mesh, or hybrid, and may be implemented in an existing star, mesh, or hybrid system.

One or more computing devices may be connected locally (e.g., a LAN, with wired or wireless connectivity) with a terminal 130, and a connected terminal may be connected to a wider network, as well. Data and information, such as IP datagrams, may be sent from such a connected device through a terminal 130 and the satellite 105, and to another terminal 130 (or other satellite 105). A variety of physical layer transmission modulation and coding techniques may be used on links between the satellite 105 and terminal 130 (or other satellite 105), including those defined with the DVB-S2 and WiMAX standards. Different multiplexing schemes may be used as well, including Multi-Frequency Time-Division Multiple Access (MF-TDMA), TDMA, Frequency Division Multiple Access (FDMA), Orthogonal Frequency Division Multiple Access (OFDMA), Code Division Multiple Access (CDMA), or any number of hybrid or other schemes known in the art. In various embodiments, the physical layer techniques may be the same, or different, for downstream and upstream links between the satellite 105 and terminal 130 (or other satellite). In one embodiment, the system 100 will support binary phase shift keying (BPSK) and quadrature phase shift keying (QPSK) modulations and Viterbi and Reed-Solomon forward error correction (FEC). The system may additionally support 8-PSK and 16 QAM, and LDPC and Turbo code FEC.

In one embodiment, the uplink is in a multi-frequency time-division multiple access (MF-TDMA) format. The uplink spectrum is configured as N carriers, which may include different or configurable different symbol rates and carrier sizes. Each carrier is divided in time into fixed period frames, and each frame contains a number of variable sized time slots, or bursts. In general, each time slot may be dynamically assigned to and used by a terminal 130 for sending data. Each time slot may use a specific modulation and FEC coding rate, and contain one or more packet segments. User IP packets may be fragmented into packet segments and reassembled at the modem unit 115 before IP processing. Certain bursts are used for network control packets for terminal acquisition, terminal synchronization maintenance, and bandwidth requests. In one embodiment, the burst structures used may be the same as those used in existing mesh architectures.

A terminal 130 may use an antenna to transmit a signal to the satellite 105. In one embodiment, the antenna is a parabolic reflector with high directivity in the direction of the satellite and low directivity in other directions. The antenna may have a variety of alternative configurations and include operating features such as high isolation between orthogonal polarizations, high efficiency in the operational frequency bands, and low noise. Terminals with small antenna/HPA sizes and limited power may be accommodated by configuring a few small sized carriers (e.g., 384 or 512 ksps) on the uplink.

Terminals 130 may include existing, modified, and specifically configured terminals. Terminals 130 may include a small indoor unit (IDU) and an appropriately sized antenna and RF equipment (the outdoor unit ODU). The IDU may have a 10/100 baseT Ethernet/IP interface as the user traffic interface. The IDU may provide IP router functionality to the user network. In one embodiment, terminals 130 are managed through the satellite 105 by the NCC 140. The NCC 140 may, therefore, be configured to allocate uplink bandwidth on carriers for these terminals, and send routing information to the terminals 130.

The satellite 105 may, for example, use a reflector antenna, lens antenna, array antenna, active antenna, or other mechanism known in the art for reception of such signals. The satellite 105 may process the signals received from a terminal 130, and then route and transmit the processed signal down to another terminal 130 (which may be within the same, or different, beam, or may be served via another satellite 105 via an ISL). In one embodiment, the satellite 105 operates in a multi-beam mode, transmitting a number of narrow beams each directed at a different region of the earth, allowing for frequency re-use.

With the foregoing description of certain options for the system, one particular embodiment will now be described with more detail. In this embodiment, assume that there are eight 100 MHz bands (channels) to be allocated among a set of 80 uplink beams. One or more channels will be allocated to each uplink beam, and a 4-color reuse constraint will be employed. The bandwidth allocation among beams may occur every n epochs (e.g., every 16 epochs). Each epoch may be 640 ms, and there may be 320 time slots in each epoch. For each time slot, the 100 MHz band may be channelized into a mix of 100 MHz, 25 MHz, 6.25 MHz, and 2.08 MHz sub-channels. Each sub-channel may support BPSK, QPSK, 8-PSK, and 16 QAM. Time slots in the appropriate sub-channel size and at a particular modulation may be assigned to terminals. It is worth noting that the above are merely examples. For example, there may instead be ten 80 MHz bands, channelized into a mix of 80 MHz, 20 MHz, 5 MHz, and 1.67 MHz sub-channels. Alternatively, there may be four 80 MHz channels and eight 40 MHz channels. A number of other channel sizes, sub-channel sizes, epoch lengths, and time slot lengths may be used in other embodiments.

Figure 2:
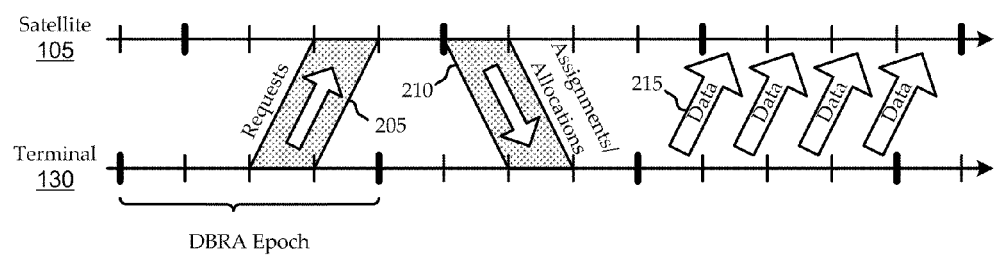
FIG. 2 is a diagram of a resource request from, and a resource assignment to, a terminal according to various embodiments of the invention.

FIG. 2 is a diagram illustrating an example of how terminals 130 may request resources and how resources (e.g., bandwidth or time slots) may be allocated among beams and/or within terminals, in a system such as the system of FIG. 1. Terminals 130 in each beam may transmit bandwidth requests 205 to the satellite 105. These requests may be based on any combination of past and estimated future bandwidth needs, and may, for example, be sent every epoch, every n epochs, or whenever bandwidth needs change in excess of a threshold. Based on these requests, the satellite 105 (e.g., internally or via the NCC 140) may allocate system resources to particular beams, and within particular beams. Slot assignments and other allocation information 210 may be transmitted to terminals 130. Terminals 130 may then transmit data 215 on the uplink. It is worth noting that while in this embodiment, the satellite 105 performs this allocation and assignments; in other embodiments, all or part of this functionality may be performed by an NCC 140.

FIG. 3 is a diagram that illustrates a table 300 of information that may be sent from a terminal 130 to a satellite 105 (or NCC 140). This may be the information in the bandwidth request 205 message of FIG. 2. All, or any subset, of the following information may be transmitted from a terminal 130 to request bandwidth. For example, a terminal may send a terminal ID 305 (MAC Address, IP Address, other unique identifier or account number for the terminal), a terminal priority 310 (which provides information on the priority of the terminal relative to other terminals), and a mode 315 (which may provide information on a requested modulation scheme, coding, a requested carrier group, or amount of bandwidth). A terminal may also transmit specific requests for each of a number of classes 320 of traffic (e.g., voice, interactive data, interactive video, streaming video, or other types of data with different quality of service metrics). For each traffic class (or for a number of traffic classes), a minimum sustained rate 325 (Min SR), a committed information rate 330 (CIR), and requested information rate 335 (RIR) may each be transmitted. There may also be sub-types of traffic within a class.

It is worth noting, moreover, that the bandwidth requests may instead be forwarded via the satellite 105 to one or more ground terminals (e.g., NCC 140). The satellite 105, the NCC 140, or any combination thereof may perform the system allocation and time slot assignment functionality. It is also worth noting that the bandwidth request data may be made up of specific MinSR 325, CIR 330, and RIR 335 data, or may be in different forms. For example, the bandwidth request messages may instead reflect past data traffic in one or more of the categories. In different embodiments, there may be other formulations reflecting various quality of service or traffic class metrics, and include various types of past traffic or estimated future traffic information.

Figure 4:
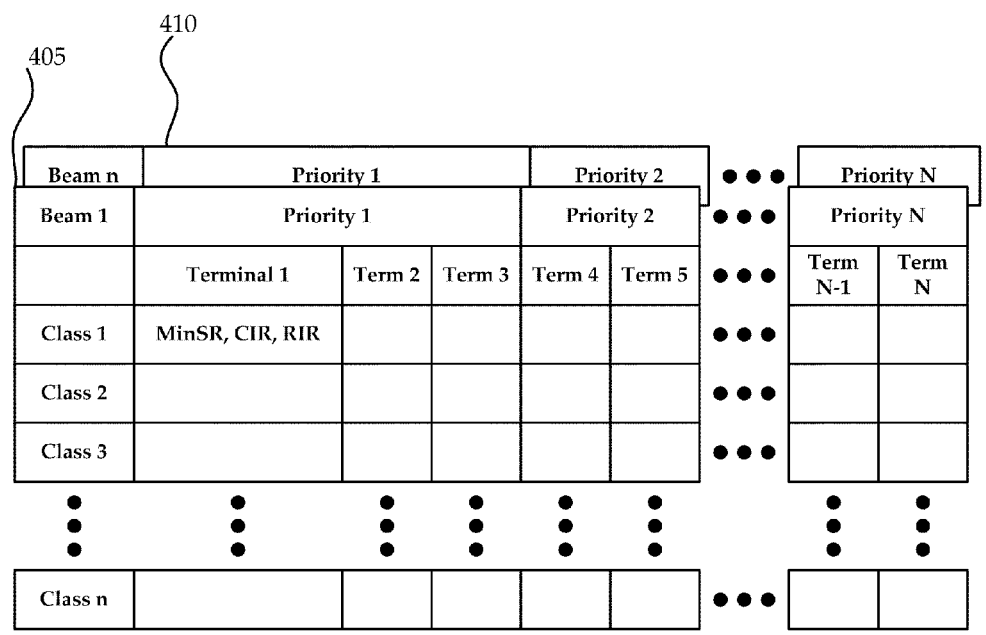
FIG. 4 is a diagram of a table of per-beam requests according to various embodiments of the invention.

Turning next to FIG. 4, a diagram is shown that illustrates tables 400 of information that may be stored (e.g., in the satellite 105 or in the NCC 140). These tables may be based, for example, on the information sent in bandwidth requests 205 from a terminal 130 to a satellite 105 (or NCC 140). In one embodiment, the bandwidth requests from the terminals 130 within each beam are separated into different tables 405, 410 for each beam. The MinSR, CIR, and RIR for each terminal are identified in groups according to terminal priority (e.g., from highest priority to lowest priority). In one embodiment, the MinSR, CIR, and RIR are further divided for each traffic class. The MinSR, CIR, and RIR values may be specified in bits/second, Kbits/second, or other metric; they may also be converted to a measure of normalized time-slots/epoch. The conversion may be based on the terminal mode (e.g., channel size, modulation, and coding) used to carry the request. Those skilled in the art will recognize the various ways in which the MinSR, CIR, and RIR bit rate values may be normalized into time slots to ease calculations.

There are a number of different ways that per-beam request information may be organized. For example, the resource requests for a defined duration of time (n epochs) may be consolidated into an aggregate MinSR, CIR, and RIR request per beam. The resource requests for a defined duration of time (n epochs) may be consolidated into an aggregate MinSR, CIR, and RIR request per beam, broken down according to traffic class. In other embodiments, per-beam request information may be estimated by using requests from only a subset of terminals within each beam.

Figure 5A:
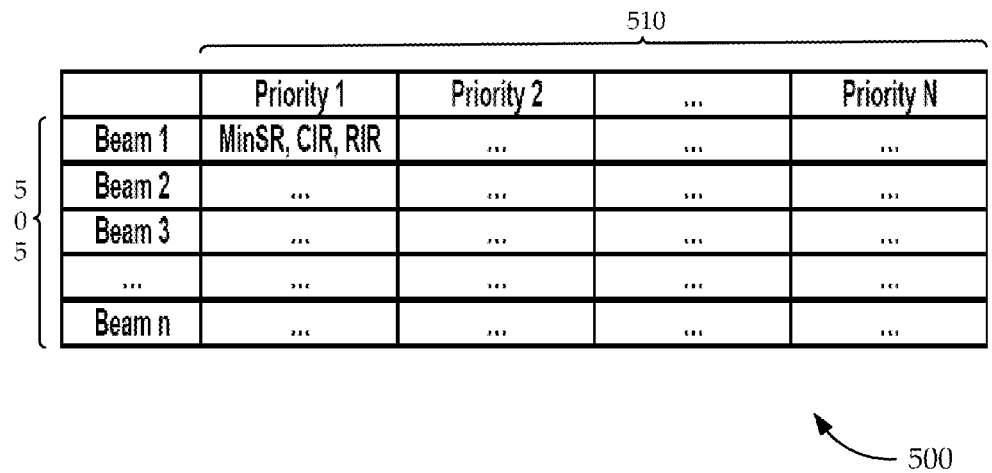
FIGS. 5A and 5B illustrate tables of request information organized according to various embodiments of the invention.

Therefore, there may be a number of different ways in which tables may be stored to reflect bandwidth requests 205 sent from the terminals 130. Turning next to FIG. 5A, a diagram is shown that illustrates a table 500 of information based, for example, on the information sent in bandwidth requests from a terminal to a satellite 105 (or NCC 140). In one embodiment, the bandwidth requests from the terminals are combined into a single table, organized in rows 505 by beam. The MinSR, CIR, and RIR for each beam may then each be separated in columns 510 according to priority (e.g., from highest priority to lowest priority).

Figure 5B:
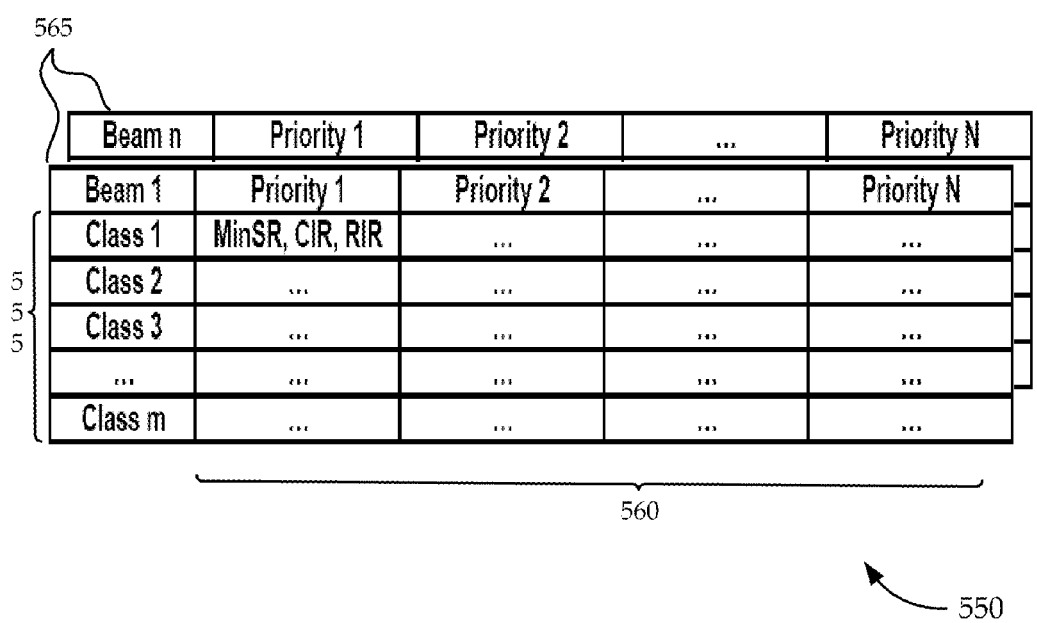

FIG. 5B illustrates a diagram with a table 550 of information based, for example, on the information sent in bandwidth requests from a terminal to a satellite 105 (or NCC 140). In one embodiment, the bandwidth requests from the terminals are combined into a table for each beam. The MinSR, CIR, and RIR for each beam 565 may be separated in groups according to priority 560 and traffic class 555. Thus, the tables 400, 500, and 550 from FIGS. 4, 5A, and 5B, respectively, may be used in determining how to allocate system resources across beams, and how to allocate time slots to particular terminals.

Figure 6:
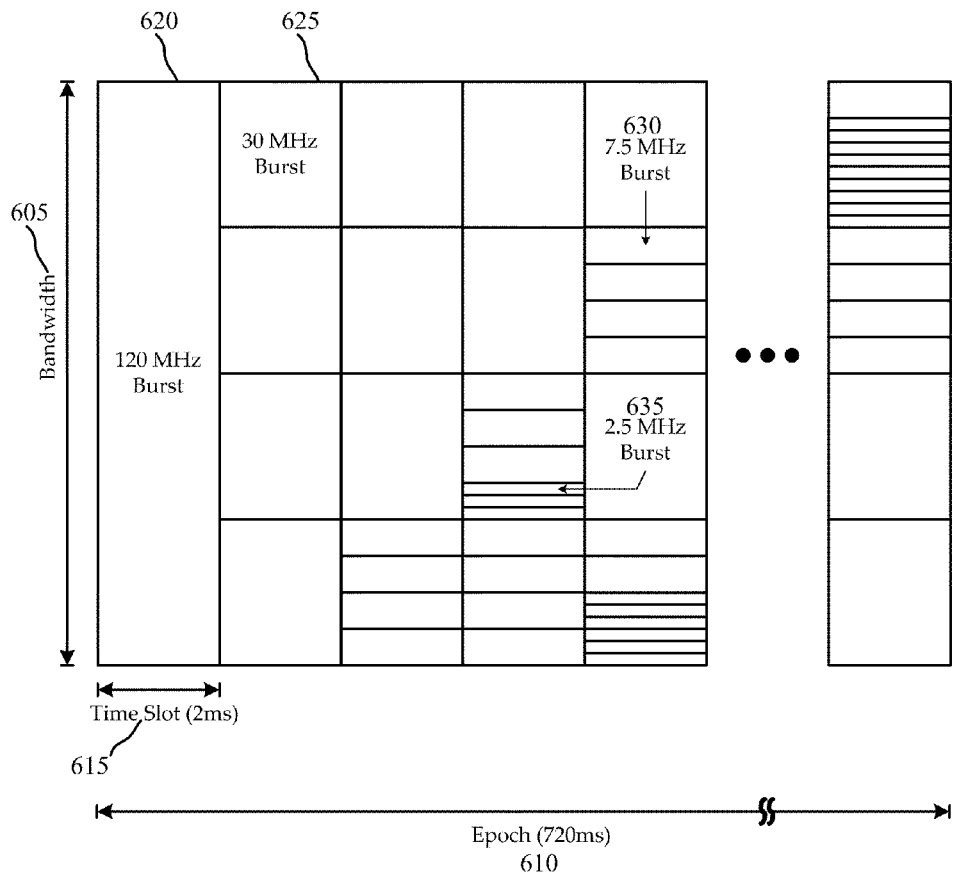
FIG. 6 is a diagram of frequency channel sizing according to various embodiments of the invention.

As noted above, there may be n bands (channels) to be allocated among a set of uplink and/or downlink beams. FIG. 6 is a diagram 600 illustrating how one such channel may be structured. In this embodiment, there is a 120 MHz channel 605, and portions of this channel may be allocated to terminals in each epoch 610 (in this embodiment, 640 ms). In one embodiment, multiple beams may be mapped to a single channel (e.g., according to a 3-color, 4-color, or n-color reuse pattern); alternatively, a beam may also be mapped to a subset of time slots 615 for a channel in an epoch 610. A channel may be divided up into sub-channels, which in the illustrated embodiment may be 120 MHz 620, 30 MHz 625, 7.5 MHz 630, and 2.5 MHz 635; in other embodiments, there may be different channel or sub-channel sizes. Each epoch 610 may be split into different time slots 615, or bursts; in one embodiment, the time slots 615 are 2 ms each. For a given system, the satellite 105 may be allocated a limited amount of bandwidth 605, and thus particular channels (or time slots therein) may be allocated to certain beams, and the time slots within channels may be allocated to terminals.

Bandwidth Allocation Across Beams: The DBRA process may be initiated by generating one or more of the tables 400, 500, 550 set forth in FIGS. 4, 5A, or 5B. A determination may then be made regarding the total amount of resources that is available to be allocated across beams for n epochs. This total amount may consist of a specified number of normalized time slots for a given sub-channel size, or may be expressed in terms of bandwidth required per n epochs. There may, in the alternative, be any number of ways to identify a total amount of resources that is to be allocated over n epochs. The total capacity may be limited by the frequency spectrum available for use on the uplink, or the demodulators on the satellite, or a number of other factors. There may be a margin used in identifying the bandwidth available, as well.

Then, each beam (e.g., beam 150 of FIG. 1) may be allocated a portion of the available resources for use. The allocation across beams may be performed dynamically, or may be static at certain times or periods of the day, and may be performed by the NCC 140 or DBRA control unit 125 of FIG. 1. There may be an uplink allocation, and a downlink allocation. The bandwidth allocation may occur for a number of epochs (n epochs), as it may be somewhat stable over time (e.g., for epochs of 640 ms, n may equal 8, 10, 20, 50, or 100). As will be explained in more detail below, the allocation to particular terminals may be performed in smaller intervals (e.g., each epoch).

Thus, referring briefly back to FIG. 1, the terminals 130 in each beam 150 may transmit resource requests. The NCC 140 may receive the transmitted resource requests via satellite 105, and use the requests to generate per-beam resource request data associated with a defined time duration (e.g., n epochs). The NCC 140 may also identify an amount of allocatable resource units for the defined time duration. The NCC 140 may then use the per-beam resource request data to dynamically allocate portions of the allocatable resource units to each of the beams to generate a per-beam resource unit allocation for the defined time duration.

Figure 7:
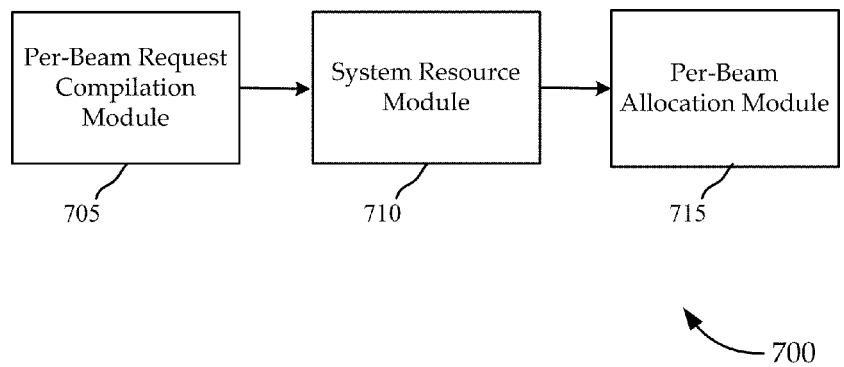
FIG. 7 is a block diagram of a configuration that may be used in a device or system to dynamically allocate system resources among beams according to various embodiments of the invention.

Turning to FIG. 7, a block diagram is shown illustrating an example configuration 700 for dynamically allocating resources to beams in a satellite communications network. This configuration 700 may be implemented in the system 100 of FIG. 1 or, more specifically, in the NCC 140 or DBRA control unit 125 of FIG. 1. However, some or all of the functionality of these modules may be implemented in other devices or sets of devices.

The configuration 700 includes a per-beam request compilation module 705, a system resource module 710, and a per-beam allocation module 715, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The per-beam request compilation module 705 may receive one or more resource requests from terminals in each beam of the multi-beam system, the resource requests identifying an amount of requested resource units for the requesting terminal. The resource requests may be the requests 205 of FIG. 2 or 300 for FIG. 3 from terminals 130. The received resource requests may identify an amount of requested resource units for a particular future time duration (e.g., an n epoch time duration in which the system bandwidth is to be allocated), or for only a portion of the time duration to be allocated. Alternatively, the received resource requests may identify an amount of requested resource units for a past defined time duration (or subpart thereof). The per-beam request compilation module 705 may generate per-beam resource request data associated with a defined time duration based at least in part on the received resource requests. This may, for example, be an estimate based on past requests from a subset of the terminals, or be an actual requested amount for the time duration to be allocated.

The system resource module 710 may be configured to identify an amount of allocatable resource units for the defined time duration (e.g., the n epoch time duration in which the system bandwidth is to be allocated among beams for the multi-beam satellite communications system).

The per-beam allocation module 715 may then receive the per-beam resource request data associated with a defined time duration, and the identified amount of allocatable resource units for the defined time duration. The per-beam allocation module 715 may be configured to dynamically allocate, responsive to the per-beam resource request data, a subset of the amount of allocatable resource units to each of the of beams to generate a per-beam resource unit allocation for the defined time duration.

Figure 8:
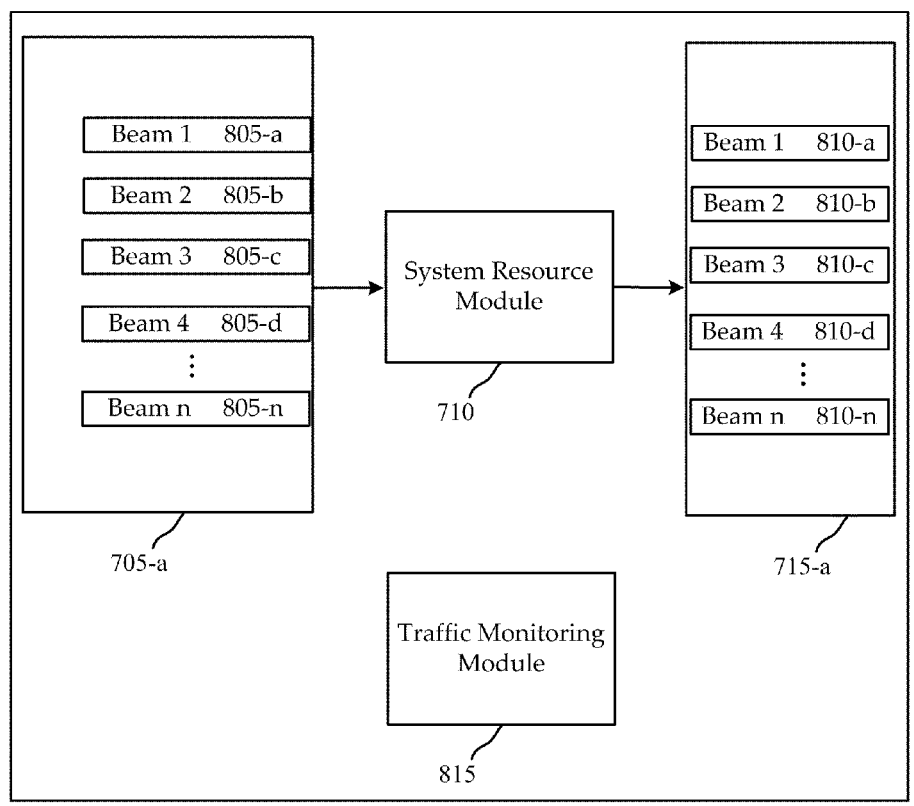
FIG. 8 is a block diagram of a device that may be used to dynamically allocate system resources among beams in a multi-beam satellite communications network according to various embodiments of the invention.

Turning to FIG. 8, a block diagram is shown illustrating an example device 800 for dynamically allocating resources to beams of a multi-beam satellite communications network. This device 800 may be implemented in a gateway of the system 100 of FIG. 1 or, more specifically, be the NCC 140 or DBRA control unit 125 of FIG. 1. This may be an implementation of the configuration 700 of FIG. 7. In other embodiments, the functionality of the device 800 may be implemented in one or more other devices.

The device 800 includes a per-beam request compilation module 705-*a*, a system resource module 710, a per-beam allocation module 715-*a*, and a traffic monitoring module 815, which may each be in communication with each other. The per-beam request compilation module 705-*a* may receive one or more resource requests from the terminals in each beam of the multi-beam system, the resource requests identifying an amount of requested resource units for the requesting terminal. The resource requests may be for the n epoch allocation period (e.g., the defined time duration described above in which the system bandwidth is to be allocated among beams for the multi-beam satellite communications network). The resource requests may also be for only a portion of the n epoch allocation period, or be for a prior allocation period. The per-beam request compilation module 705-*a* may generate per-beam resource request data for the allocation period. For example, the amount of requested resource units for each beam (805-*a* ... 805-*n*) for the allocation period may be compiled and stored in the per-beam request compilation module 705-*a*.

The system resource module 710 may be configured to identify an amount of allocatable resource units for the allocation period (e.g., the n epoch time duration in which the system bandwidth is to be allocated among beams for the multi-beam satellite communications system).

The per-beam allocation module 715-*a* may be configured to allocate, based on the per-beam resource request data, a portion of the allocatable resource units to each of the beams to generate a per-beam resource unit allocation for the allocation period. Thus, the amount of requested resource units allocated for each beam (810-*a* ... 810-*n*) for the allocation period may be generated by the per-beam allocation module 715-*a*. In some embodiments, the per-beam allocation module 715-*a* dynamically changes the per-beam resource unit allocation among beams across different allocation periods. Thus, the amount allocated for at least some of the of beams for the allocation period may be different from an allocated amount of requested resource units for a prior allocation period (which was based on prior resource requests). Thus, the allocation period changes may occur dynamically across adjacent allocation periods, responsive to the requests associated with each allocation period.

In some embodiments, the per-beam allocation module 715-*a* is configured to perform to dynamic allocation for each allocation period by first allocating to respective beams the minimum sustained rate resource request specified in the per-beam resource request data for each beam. The per-beam allocation module 715-*a* may allocate to each beam, after allocating the minimum sustained rate resource requests, a committed information rate resource request specified in the per-beam resource request data for each beam. The per-beam allocation module 715-*a* may then allocate to each beam, after allocating the committed information rate resource requests, a requested information rate resource request specified in the per-beam resource request data for each beam. For each of a series of allocation steps, the per-beam allocation module 715-*a* may determine whether a sufficient amount of the allocatable resource units remain to satisfy an allocation associated with the respective allocation step. When there is not a sufficient amount of allocatable resource units remaining to satisfy an allocation associated with the allocation step, the remainder of the allocatable resource units is allocated among the beams according to a fairness policy, described in more detail below.

In some embodiments, and as noted above, the resource requests identify one or more traffic classes associated with different portions of the amount of requested resource units for each requesting terminal. Each requesting terminal is associated with different priority levels. The per-beam allocation module 715-*a* may perform the dynamic allocation in an order responsive to the traffic class associations and the terminal priority levels for the resource requests.

The traffic monitoring module 815 may be configured to monitor an amount of data traffic flow through the satellite communications network. This monitoring may occur on a per-beam or per-beam group basis, occur at different intervals for different beams, and occur with more or less regularity at different times of the day. The monitoring may be for the uplink or the downlink. As the monitored data traffic flow changes, or the rate of change varies, the length of the allocation period may be modified. For example, the length of the allocation period may be extended when the monitored data traffic flow falls below a threshold. Conversely, the length of the allocation period may be reduced when the monitored data traffic flow increases above a threshold. The intervals between receiving resource requests, generating resource request data, and generating an amount of allocatable resource units may also be extended or contracted based on the monitoring.

Figure 9:
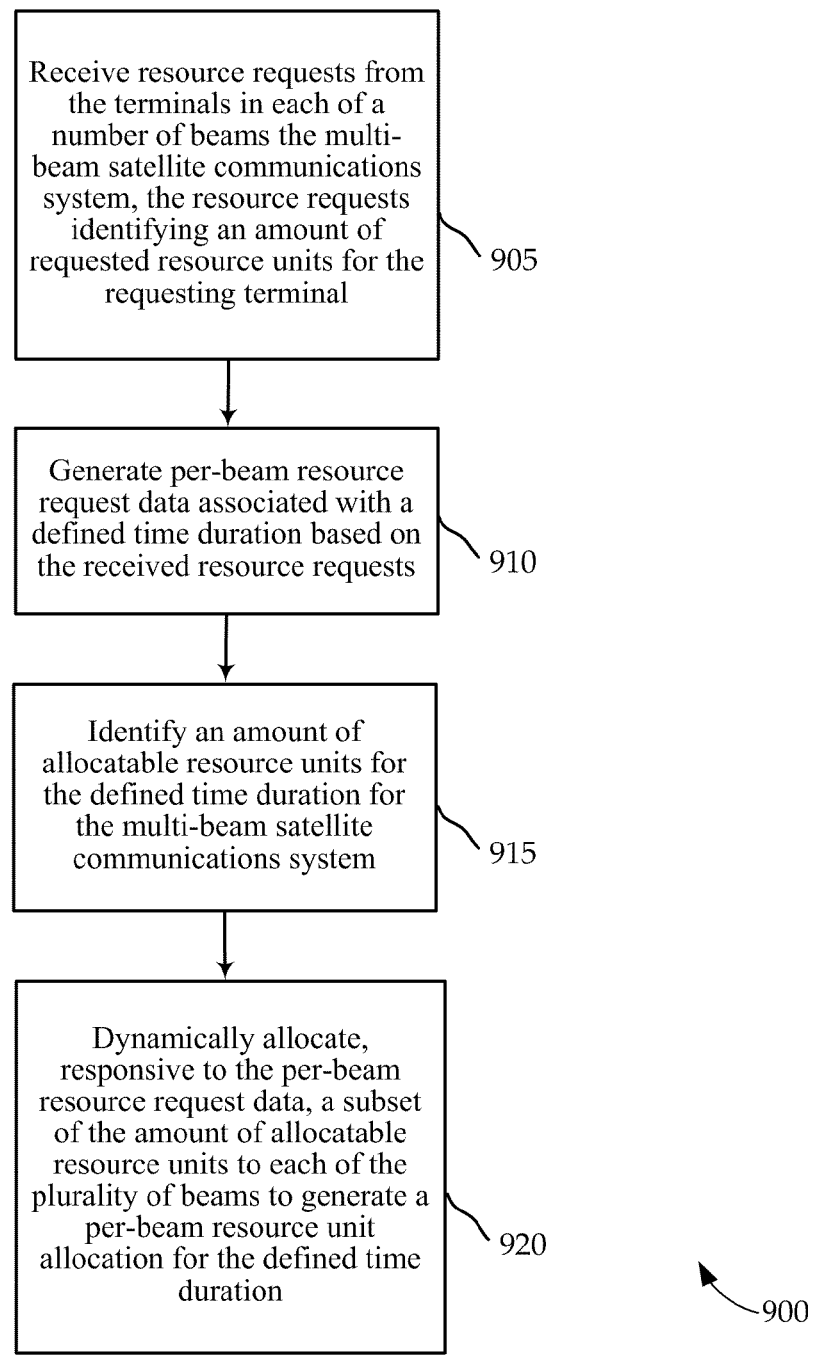
FIG. 9 is a flow chart illustrating the dynamic allocation of system resources among beams in a multi-beam satellite communications network according to various embodiments of the invention.

FIG. 9 is a flowchart illustrating a method 900 of resource allocation among beams in a satellite communications network. The method 900 may, for example, be performed by the NCC 140 or DBRA control unit 125 of FIG. 1, or any combination thereof. More specifically, the method 900 may be performed by the configuration 700 of FIG. 7 or device 800 of FIG. 8.

At block 905, resource requests are received from the terminals in each of a number of beams of a multi-beam satellite communications system, the resource requests each identifying an amount of requested resource units for the requesting terminal. At block 910, per-beam resource request data associated with a defined time duration is generated based on the received resource requests. At block 915, an amount of allocatable resource units is identified for the defined time duration for the multi-beam satellite communications system. At block 920, a subset of the amount of allocatable resource units is dynamically allocated to each of the beams to generate a per-beam resource unit allocation for the defined time duration, the dynamic allocation responsive to the per-beam resource request data.

Figure 10:
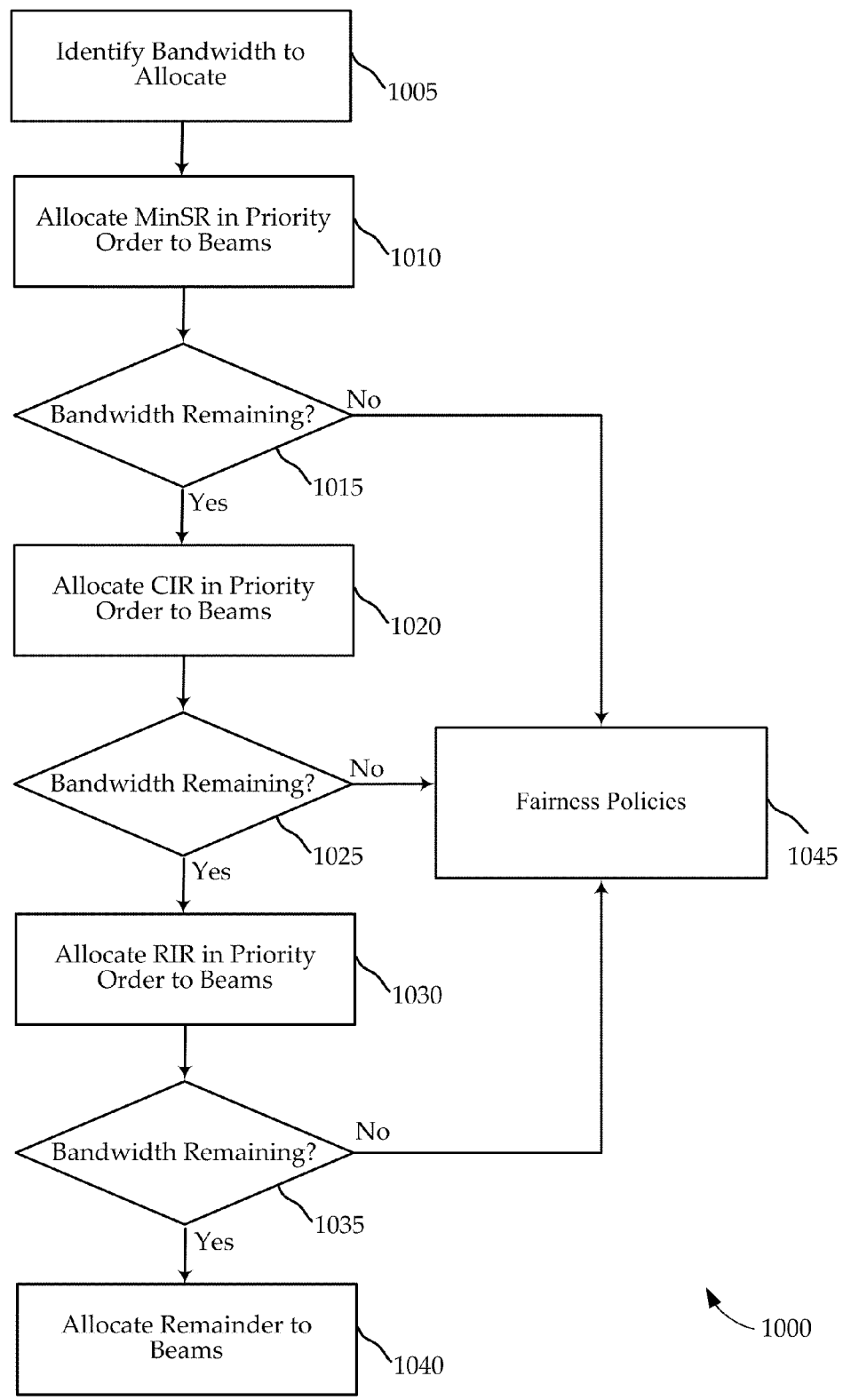
FIG. 10 is a flow chart illustrating an order progression for the dynamic allocation of system resources among beams according to various embodiments of the invention.

FIG. 10 is a flowchart illustrating a method 1000 of bandwidth allocation over n epochs, and the manner in which such bandwidth may be distributed among beams. The method 1000 may, for example, be performed by the NCC 140 or DBRA control unit 125 of FIG. 1, or any combination thereof. More specifically, the method 1000 may be performed by the configuration 700 of FIG. 7 or device 800 of FIG. 8. This method 1000 may be integrated with the method 900 of FIG. 9, in whole or in part.

At block 1005, the amount of bandwidth to allocate is identified (e.g., this may be the amount of allocatable resource units identified in block 915 of FIG. 9). Blocks 1010-1045, and the ensuing discussion, set forth examples of the dynamic allocation that may occur at block 920 of FIG. 9. At block 1010, the MinSR request (e.g., from one or more of the tables 400, 500, 550 set forth in FIGS. 4, 5A, or 5B) over the n epochs is allocated to beams in priority order. Thus, in one embodiment, assume that each terminal has a priority designation of 1, 2, or 3 (1 being the highest priority). Thus, the requested MinSR bandwidth for all priority 1 terminals may be allocated across the beams. If bandwidth remains, the requested MinSR bandwidth for all priority 2 terminals may be allocated across the beams. If bandwidth remains, requested MinSR bandwidth for all priority 3 terminals may be allocated across the beams. If a determination at block 1015 is made during any of these priority allocations that there is insufficient bandwidth to allocate to MinSR at that priority level, the MinSR for that priority level may be allocated according to fairness policies 1045 (e.g., Proportional, Weighted Proportional, Fair Share, or Weighted Fair Share, which will be discussed in more detail below).

If bandwidth remains available for allocation, at block 1020, the CIR request over the n epochs is allocated to beams in priority order. This CIR request may be the CIR request less the previously allocated MinSR. This CIR request value may equal min(CIR, RIR). Again assume that each terminal has a priority designation of 1, 2, or 3. Thus, the requested CIR bandwidth for all priority 1 terminals may be allocated across the beams. If bandwidth remains to be allocated, the requested CIR bandwidth for all priority 2 terminals may be allocated across the beams. If bandwidth remains, requested CIR bandwidth for all priority 3 terminals may be allocated across the beams. If a determination at block 1025 is made during any of these priority allocations that there is insufficient bandwidth to allocate to CIR at that priority level, the CIR for that priority level may be allocated according to fairness policies 1045 among terminals at a given priority level. Note that the CIR requests may be done first, instead of the MinSR requests, in some embodiments.

If bandwidth remains available for allocation, at block 1030, the RIR request over the n epochs is allocated to beams in priority order. This RIR request may be the RIR request less the previously allocated CIR and MinSR. Again assume that each terminal has a priority designation of 1, 2, or 3. Thus, the requested RIR bandwidth for all priority 1 terminals may be allocated across the beams. If bandwidth remains to be allocated, the requested RIR bandwidth for all priority 2 terminals may be allocated across the beams. If bandwidth remains, requested RIR bandwidth for all priority 3 terminals may be allocated across the beams. If a determination at block 1035 is made during any of these priority allocations that there is insufficient bandwidth to allocate to RIR at that priority level, the RIR for that priority level may be allocated according to fairness policies 1045 among terminals at a given priority level. However, if it is determined that bandwidth remains available at block 1035, the remaining bandwidth may be allocated at block 1040.

The preceding discussion illustrates one example of how uplink bandwidth (or some other measure of capacity) over n epochs may be dynamically allocated to particular beams of a satellite in a multi-beam system. Thus, the sum of the bandwidth allocated to each beam for the n epochs may be equal to the total bandwidth to be allocated over the n epochs (although in other embodiments, there may be an error margin). There may be a dynamic allocation of a finite resource (bandwidth) to beams in a multi-beam system. This allocation may be adaptive to changing traffic demands, mobile terminals moving in and out of beams, and weather issues (which may require more bandwidth to transmit the same amount of data). The allocation may be responsive to requests from terminals with the beams and account for terminal priority and the characteristics of the traffic. While the allocation is discussed as occurring over every n epochs, n may vary (occurring more regularly when capacity increases, and less frequently when capacity is plentiful).

While the above discussion identifies some embodiments, it is worth noting that there are a number of alternative options, as well. For example, traffic classes may be considered as well. For example, the class 1 traffic may be allocated in priority order for MinSR, CIR, and then RIR; the class 2 traffic may be allocated in priority order for MinSR, CIR, and then RIR; up to the class n traffic allocated in priority order for MinSR, CIR, and then RIR. In another example, the class 1 traffic may be allocated in priority order for MinSR, and then for CIR; the class 2 traffic may be allocated in priority order for MinSR, and then for CIR; up to the class n traffic allocated in priority order for MinSR and then CIR; then the RIR traffic may be allocated in priority order without accounting for classes. It is worth noting that may be more, or fewer, traffic classes and terminal priority levels. Certain priority levels may have different priority attributes as well. For example, in some embodiments, all the traffic (MinSR, CIR, and RIR) may be allocated first to priority 1 terminals; for lower priority terminals, the allocation may progress as described for FIG. 10. It is also worth noting that the MinSR, CIR, and RIR are merely examples, and these traffic request categorizations may be expanded, narrowed, or otherwise refined.

Figure 11:
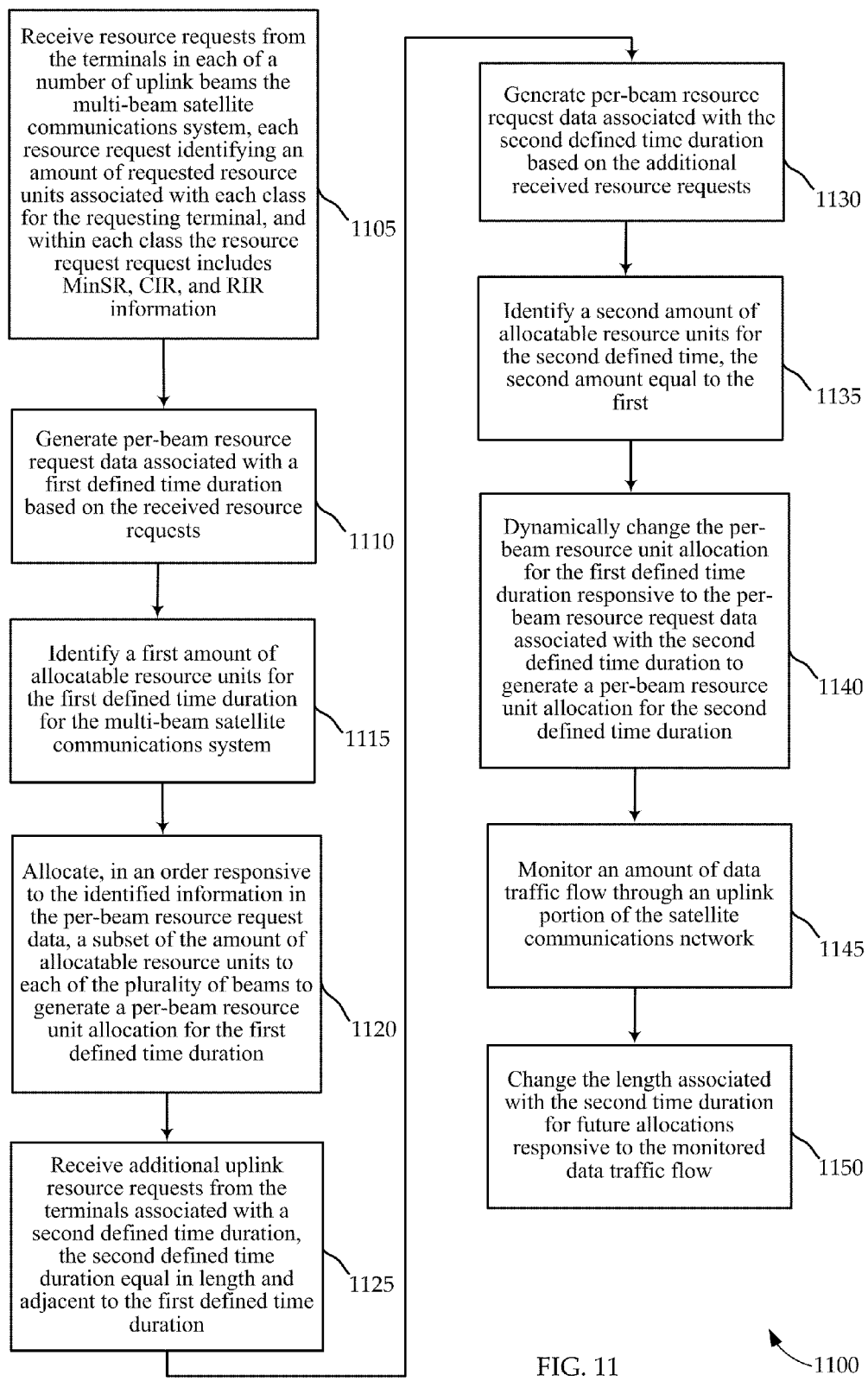
FIG. 11 is a flow chart illustrating the dynamic allocation of system resources among beams across different epochs according to various embodiments of the invention.

FIG. 11 is a flowchart illustrating a method 1100 of resource allocation across allocation periods, as the per-beam resource requests change over time. The method 1100 may, for example, be performed by the NCC 140 or DBRA control unit 125 of FIG. 1, or any combination thereof. More specifically, the method 1100 may be performed by the configuration 700 of FIG. 7 or device 800 of FIG. 8. This method 1100 may be integrated with the method 1000 of FIG. 10, in whole or in part.

At block 1105, resource requests are received from the terminals in each of a number of uplink beams of the multi-beam satellite communications system, each resource request identifying an amount of requested resource units associated with each class for the requesting terminal, and within each class the resource request includes MinSR, CIR, and RIR information. At block 1110, per-beam resource request data associated with a first defined time duration is generated based on the received resource requests. At block 1115, a first amount of allocatable resource units is identified for the first defined time duration for the multi-beam satellite communications system. At block 1120, a subset of the amount of allocatable resource units is allocated in an order responsive to the identified information in the per-beam resource request data to each of the plurality of beams to generate a per-beam resource unit allocation for the first defined time duration. The allocation at block 1120 may be the allocation described with reference to blocks 1010-1045 of FIG. 10.

At block 1125, additional uplink resource requests are received from the terminals associated with a second defined time duration, the second defined time duration equal in length and adjacent to the first defined time duration. At block 1130, per-beam resource request data associated with the second defined time duration is generated based on the additional received resource requests. At block 1135, a second amount of allocatable resource units is identified for the second defined time, the second amount equal to the first. At block 1140, the per-beam resource unit allocation for the first defined time duration is dynamically changed responsive to the per-beam resource request data associated with the second defined time duration to generate a per-beam resource unit allocation for the second defined time duration. The allocation at block 1140 may be the allocation described with reference to blocks 1010-1045 of FIG. 10.

At block 1145, an amount of data traffic flow is monitored through an uplink portion of the satellite communications network. At block 1150, the length of time associated with the second time duration (e.g., n epochs) is changed for future allocation periods (e.g., to n+/−Δ epochs) responsive to the monitored data traffic flow.

Dynamic Frequency Assignment: Once a portion of the available bandwidth has been allocated to each beam, particular ranges of frequencies (referred to above as channels) may be allocated to particular beams. The channels (ranges of frequencies) may be assigned to particular beams every n epochs. In some embodiments, the frequency assignments may be made more, or less, often than the bandwidth allocation. For example, the bandwidth allocation may be stable for a number of sets of epochs, and thus the frequency assignment could be suspended until there is a change in bandwidth allocation that exceeds a threshold.

In some embodiments, there are eight 100 MHz channels to be allocated to beams. In one embodiment, the channels are allocated to beams using a 3-color reuse pattern constraint; in another embodiment, the channels are allocated to beams using a 4-color reuse pattern constraint. In still other embodiments, there may be more channels, and other reuse patterns (e.g., 16 40 MHz channels, with 7-color reuse). In still other embodiments, there may be channels of different sizes (e.g., eight 40 MHz channels and four 80 MHz channels). Regardless, the frequencies are, in some embodiments, assigned dynamically every n epochs in response to the bandwidth allocated to each beam.

Figure 12:
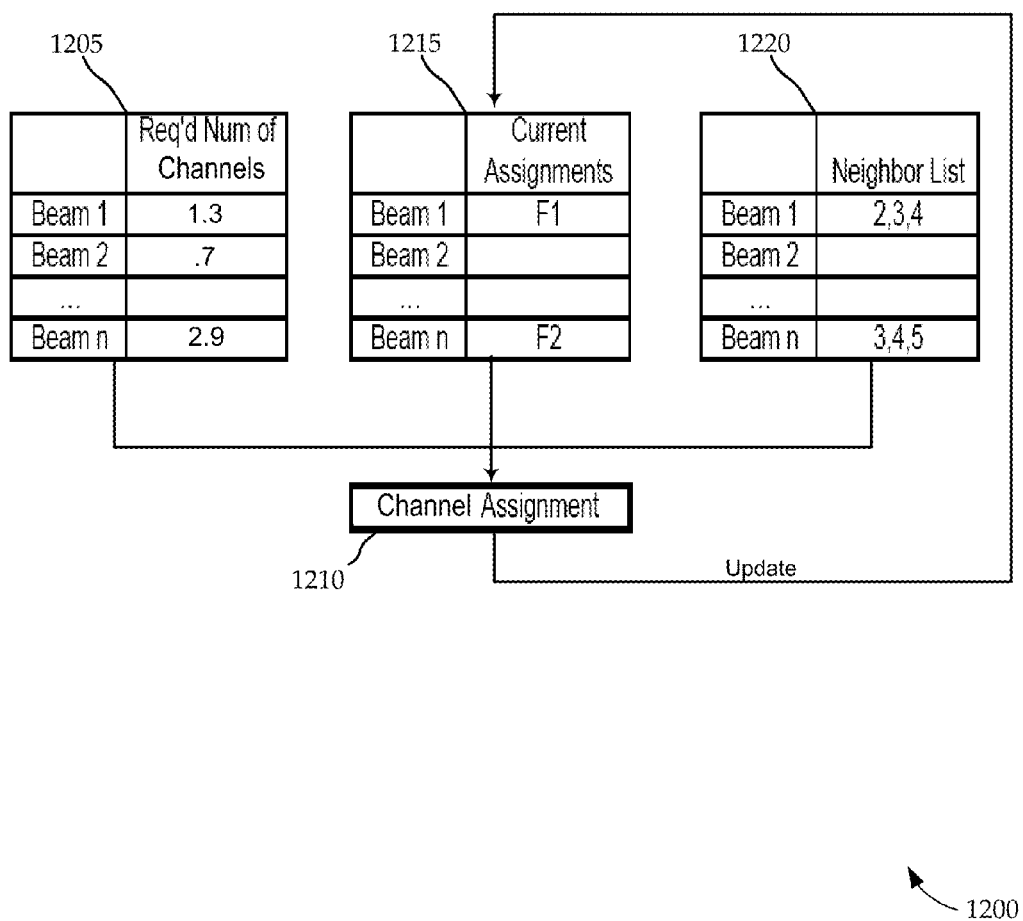
FIG. 12 is a diagram of a set of tables that may be used to assign frequency channels to beams according to various embodiments of the invention.

Turning to FIG. 12, a block diagram 1200 illustrates a set of tables that may be used to assign frequencies to beams. The table and decisions illustrated in diagram 1200 may, for example, be performed by the NCC 140 or DBRA control unit 125 of FIG. 1, or any combination thereof. In the illustrated embodiment, assume that there are eight 80 MHz channels to be allocated to beams, and the channels are allocated to beams using a 4-color reuse pattern. Table 1205 is a table illustrating the number of channels for each beam. This may be calculated based on the bandwidth or capacity allocated to each beam. In one embodiment, the required number of channels will be rounded up for each beam. At decision block 1210, channels are assigned to particular beams. Table 1215 reflects the current channel assignments for each beam, reflecting the channel assignment from block 1210. Table 1220 reflects the neighbor beam list for each beam, indicating which beams are next to each other. Table 1220 may be used to ensure that the same frequency is not assigned to neighbors. This table 1220 may be generated based on the beam layout, in light of the color constraint (e.g., 3-color, 4-color, or 7-color). Therefore, once a channel is assigned to a beam at block 1210, table 1215 may be updated to reflect the assignment.

In the illustrated embodiment, note that the channels are each the same size. With a straight 4-color reuse, this may result in some measure of wasted spectrum (e.g., because if beam 1 only needs 1.3 channels, it may nonetheless be assigned two channels for a straight 4-color reuse). Thus, in some embodiments, there may be channels of different sizes, or be smaller channels, to make better use of the spectrum. In one embodiment, time slots for a given channel may be divided among neighboring beams to use spectrum more efficiently.

Figure 13:
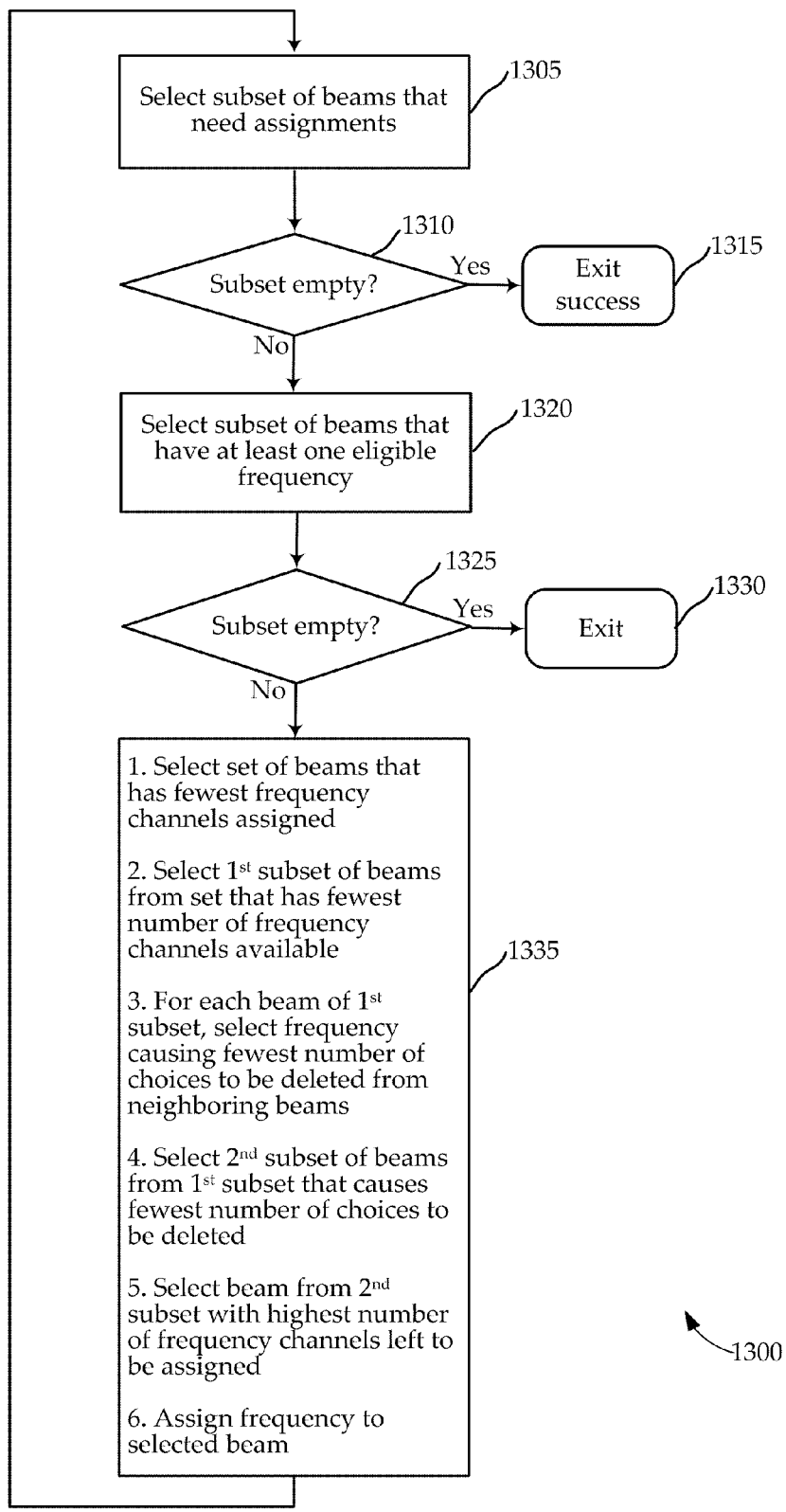
FIG. 13 is a flow chart illustrating a prioritization and selection process for the dynamic assignment of frequency channels to beams according to various embodiments of the invention.

FIG. 13 is a flowchart illustrating a method 1300 of dynamically assigning frequency channels to uplink beams (a similar process may be used for the downlink). The method 1300 may, for example, be performed by the NCC 140 or DBRA control unit 125 of FIG. 1, or any combination thereof.

At block 1305, a determination is made identifying the subset of beams that needs assignments (e.g., by analyzing tables 1205 and 1215 of FIG. 12). At block 1310, a determination may be made whether all beams have sufficient frequency assignments. If so, the process may be completed successfully at block 1315. If not (i.e., one or more beams needs additional frequency channel assignments), at block 1320, the subset of beams needing frequency assignments that has at least one eligible range of frequencies (not assigned to a neighbor) is identified. At block 1325, a determination may be made whether that subset is empty. If so, at block 1330, the process is exited.

Thus, if uplink beams that need assignments have eligible frequencies, the following steps (or any subset thereof) may be undertaken at step 1335. At block 1335 (1.), a determination may be made identifying the set of beams that has the fewest number of frequency channels assigned (or, in other embodiments, the beams that have the smallest amount of frequency assigned may be identified). At block 1335 (2.), a first subset of beams from the identified set of beams is selected, the first subset made up of beams of the set that has the fewest channel choices available for possible assignment because of neighbor assignments (or, in other embodiments, the beams that have the smallest amount of frequency available may be identified). At block 1335 (3.), for each beam of the first subset identified in block 1335 (2.), the frequency channel that causes the fewest number of choices to be deleted from neighboring beams is identified. At block 1335 (4.), for each such beam and associated channel identified in block 1335 (3.), a second subset of beams which would cause the fewest number of choices to be deleted from neighboring beams is identified (or, in other embodiments, the second subset is identified as those beams that would cause the smallest amount of frequency to be deleted from neighboring beams). At block 1335 (5.), for each beam of the second subset identified in block 1335 (4.), the beam that has the highest number of frequency channels (or, e.g., the largest amount of frequency) left to be assigned is identified. At block 1335 (6.), the beam is assigned the identified frequency channel. Hence, block 1335 may assign a frequency to a beam, and then blocks 1305 through 1335 may be repeated until complete.

While the method 1300 of FIG. 13 identifies a series of steps, it is again worth emphasizing that method 1300 is only an example. The selection process may be modified in other embodiments. For example, the determinations regarding 1) identifying the subset of beams that has the fewest number of choices of channels available because of neighbor assignments, 2) identifying the particular channel that causes the fewest number of choices to be deleted from neighboring beams, and 3) identifying the beam or beams which would cause the fewest number of choices to be deleted from neighboring beams, may be ordered differently than described above. Additionally, there may be different steps added or deleted before, during, and after such determinations that are not discussed in detail herein. It is also worth noting that in one embodiment, if at any step the frequency assignment fails for a beam, the table 1205 of FIG. 12 may be adjusted to presently assigned levels, and the beam may be pulled from additional consideration during the assignment period (e.g., n epochs).

A modem (e.g., modem unit 115, or portion thereof) may be assigned to a beam and programmed with the appropriate frequency information. For example, each modem may handle a full channel (e.g., 80 MHz) of bandwidth, or may handle more or less than one channel (i.e., a beam may be assigned more than one modem, or a modem may be shared among beams).

Carrier Group Allocation: Returning to FIG. 1, assume that a particular amount of resources (e.g., bandwidth) has been allocated for each beam 150 in a multi-beam satellite system (e.g., over n epochs). This may, for example, be the per-beam allocation described with reference to FIGS. 7-11. Thus, each beam may be assigned all, or a portion, of one or more channels (e.g., as set forth in the discussion related to FIG. 12 or 13). A given channel may have a number of different carrier group sizes (e.g., in FIG. 6, there are four carrier group sizes: 120 MHz, 30 MHz, 7.5 MHz, and 2.5 MHz). For each beam, a determination may be made apportioning the allocated bandwidth (and perhaps leftover slots) among different carrier group sizes, identifying the amount of bandwidth which may be used for each carrier group size (e.g., across n epochs). In one embodiment, the total amount of bandwidth may consist of a specified number of normalized time slots for a given sub-channel size. The total number of normalized timeslots for the beam may essentially be apportioned among carrier groups.

It is worth noting that this carrier group apportionment may occur for a number of epochs (e.g., for epochs of 640 ms, n may equal 8, 10, 20, 50, or 100). This apportionment may be at the same intervals as the bandwidth allocation and frequency assignment, or may be more or less often. The apportionment may, for example, be performed by the NCC 140 or DBRA control unit 125 of FIG. 1, or any combination thereof.

It is worth noting that this apportionment may occur with a number of different channel and sub-channel structures, but the channel structure 600 depicted in FIG. 6 will be used for purposes of example. The 120 MHz bandwidth 605 of FIG. 6 has a number of different carrier group sizes in the depicted embodiment, namely the 120 MHz 620, 30 MHz 625, 7.5 MHz 630, and 2.5 MHz 635 groups. Assume that one such channel is assigned to a beam for the transmission of the uplink bandwidth allocated to that beam (note that in other embodiments, there may be additional channels of the same or different size, and the sub-channel sizes (the bandwidth of each carrier group) may be the same, or different). For given bandwidth allocation and the particular carrier group sizes, this allocated bandwidth may be apportioned among the specific carrier groups within the channel structure 600, namely the 120 MHz 620, 30 MHz 625, 7.5 MHz 630, and 2.5 MHz 635 groups. The apportionment may occur every n epochs to determine allocations for each carrier group size that will be utilized during an n epoch period. The carrier group apportionment may be performed dynamically, or may be static at certain times or periods of the day, and may be performed by the NCC 140 or DBRA control unit 125 of FIG. 1. The carrier group apportionment process may occur at different time intervals for different beams, depending on the traffic composition and/or variability within a beam relative to other beams. It is worth noting that this process may be described as carrier group apportionment or carrier group allocation interchangeably.

Thus, referring briefly back to FIG. 1, the terminals 130 in each beam 150 may transmit resource requests specifying an amount of requested resource units and a requested carrier group size. The NCC 140 may receive the transmitted resource requests via satellite 105, and use the requests to generate resource request data associated with different carrier group sizes for a defined time duration (e.g., n epochs). The NCC 140 may also identify an amount of allocatable resource units for the beam for the defined time duration. The NCC 140 may then use the resource request data to dynamically allocate portions of the allocatable resource units of a beam among the carrier groups for the defined time duration.

Figure 14:
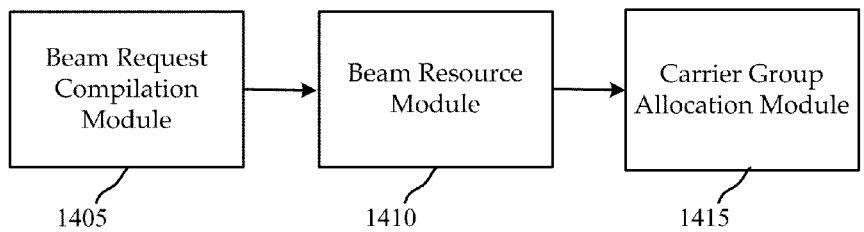
FIG. 14 is a block diagram of a configuration that may be used in a device or system to allocate system resources among carrier groups according to various embodiments of the invention.

Turning to FIG. 14, a block diagram is shown illustrating an example configuration 1400 for allocating resources to carrier groups in a beam of a satellite communications network (on the uplink and/or downlink). This configuration 1400 may be implemented in the system 100 of FIG. 1 or, more specifically, in the NCC 140 or DBRA control unit 125 of FIG. 1. However, some or all of the functionality of these modules may be implemented in other devices or sets of devices.

The configuration 1400 includes a beam request compilation module 1405, a beam resource module 1410, and a carrier group allocation module 1415, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The beam request compilation module 1405 may receive one or more resource requests from the terminals in a beam of a satellite communications network, the resource requests identifying an amount of requested resource units and a requested or otherwise identified carrier group for the requesting terminal. The resource requests may be the requests 205 of FIG. 2 or 300 for FIG. 3. The received resource requests may identify an amount of requested resource units for a particular defined time duration (e.g., an n epoch time duration in the future in which the bandwidth for a beam is to be allocated among carrier groups), or for only a portion of the time duration to be allocated. Alternatively, the received resource requests may identify an amount of requested resource units for a past defined time duration (or subpart thereof).

The beam request compilation module 1405 may generate a total amount of requested resource units for a defined duration of time, and identify the proportion of the requested resource units associated with each carrier group. This may be determined from the resource requests for the defined time duration, wherein the received resource requests are for the defined time duration and different proportions of the generated amount are associated with different carrier groups.

The beam resource module 1410 may be configured to identify an amount of allocatable resource units for the beam for a defined time duration. The amount of allocatable resource units for the beam may be determined responsive to the received resource requests for the beam relative to other beams (e.g., as described for FIGS. 7-11).

The carrier group allocation module 1415 may then receive beam resource request data for the beam (e.g., identifying the accumulated amount of requested resource units for a defined time duration, and identifying the proportion of the requested resource units associated with each carrier group). The carrier group allocation module 1415 may also receive an identified amount of allocatable resource units for the beam (e.g., for the defined time duration). The carrier group allocation module 1415 may then allocate the amount of resource units for the beam among the carrier groups for the beam to generate a carrier group allocation, the carrier group allocation based on the proportion of requested resource units associated with the respective carrier groups of the beam.

Figure 15:
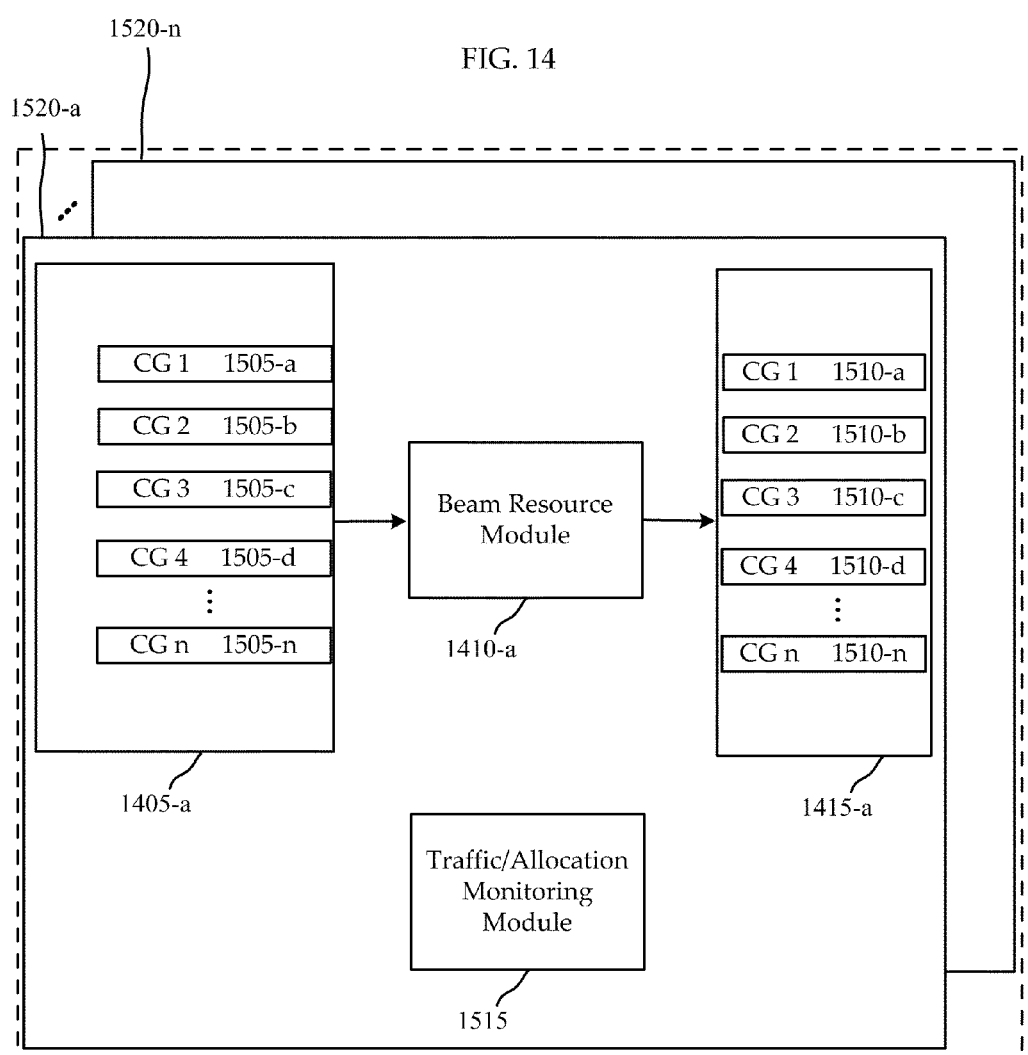
FIG. 15 is a block diagram of a device that may be used to dynamically allocate system resources among carrier groups in different beams in a multi-beam satellite communications network according to various embodiments of the invention.

Turning to FIG. 15, a block diagram is shown illustrating an example device 1500 for dynamically allocating resources of a beam among carrier groups for each of a number of beams in a multi-beam satellite communications network. This device 1500 may be implemented in a gateway or other device of the system 100 of FIG. 1 or, more specifically, be the NCC 140 or DBRA control unit 125 of FIG. 1. This may be an implementation of the configuration 1500 of FIG. 15. In other embodiments, the functionality of the device 1500 may be implemented in one or more other devices.

The device 1500 includes a module 1520 for each beam of the multi-beam satellite communications network, and each module 1520 includes a beam request compilation module 1405-a, a beam resource module 1410-a, a carrier group allocation module 1415-a, and a traffic allocation monitoring module 1515. The beam request compilation modules 1405-a may receive one or more resource requests from the terminals in respective beams of the multi-beam system, the resource requests identifying an amount of requested resource units for the requesting terminal and an identified carrier group. The resource requests for each beam may be for the n epoch allocation period (e.g., the defined time duration described above in which beam bandwidth is to be allocated among carrier groups in each beam). The resource requests may also be for only a portion of the n epoch allocation period, or be for a prior allocation period. The beam request compilation modules 1405-a may generate per-beam resource request data for the allocation period. For example, the amount of requested resource units for each carrier group (1505-a . . . 1505-n) for each beam for the allocation period may be compiled and stored in the beam request compilation modules 1405-a.

The beam resource modules 1410-a may each be configured to identify an amount of allocatable resource units for each respective beam for the allocation period (e.g., the n epoch time duration in which the beam bandwidth is to be allocated among carrier groups). This may vary across allocation periods, and may be the allocation across beams described with reference to FIGS. 7-11.

The carrier group allocation module 1415-a may be configured to allocate, based on the resource request data, a portion of the allocatable resource units to each of the carrier groups for the allocation period. Thus, the amount of requested resource units allocated for each carrier group (1510-a . . . 1510-n) for the allocation period may be generated by the carrier group allocation module 1415-a. In some embodiments, a carrier group allocation module 1415-a may dynamically change the carrier group allocation among carrier groups across different allocation periods. Thus, for a given beam, an amount of requested resource units for one or more carrier groups for the allocation period may be different from an amount of requested resource units for the allocation period for a prior time duration. The carrier group allocation changes may occur dynamically across adjacent allocation periods, responsive to proportional requests for carrier groups associated with each allocation period for a particular beam.

In some embodiments, the carrier group allocation module 1415-a may allocate the allocatable resources among each of the carrier groups using a prioritization scheme corresponding to a set of resource obligations. The set of resource obligations may be specified for each of a number of traffic classes, and thus priority in the carrier group allocation may be given to certain classes (e.g., that are associated with particular carrier groups). Similarly, the set of resource obligations may be organized according to a terminal priority scheme, and thus priority in the carrier group allocation may be given to types of terminals (e.g., that are associated with particular carrier groups).

Thus in some embodiments, and as noted above, the resource requests identify one or more traffic classes associated with different portions of the amount of requested resource units for each requesting terminal. Each requesting terminal is associated with different priority levels. The carrier group allocation module 1415-a may allocate the allocatable resources among each of the carrier groups in an order responsive to the traffic class associations and the terminal priority levels for the resource requests.

In some embodiments, the carrier group allocation module 1415-a is configured to perform to allocation among carrier groups of a particular beam for each allocation period by first allocating to respective carrier groups the minimum sustained rate resource request specified in the resource request data for the beam. The carrier group allocation module 1415-a may allocate to respective carrier groups, after allocating the minimum sustained rate resource requests, a committed information rate resource request specified in the resource request data for the beam. The carrier group allocation module 1415-a may then allocate to respective carrier groups, after allocating the committed information rate resource requests, a requested information rate resource request specified in the resource request data for the beam. For each of a series of allocation steps, the carrier group allocation module 1415-a may determine whether a sufficient amount of the allocatable resource units remain to satisfy an allocation associated with the respective allocation step. When there is not a sufficient amount of allocatable resource units remaining to satisfy an allocation associated with the allocation step, the remainder of the allocatable resource units is allocated among the plurality of carrier groups according to a fairness policy, described in more detail below.

The traffic/allocation monitoring module 1515 may be configured to monitor an amount of data traffic flow through the satellite communications network, monitor an amount of data traffic associated with the resource requests, and/or monitor the amount of variance in an amount or proportion of the resource requests for the beam for each of the carrier groups for each of a series of allocation periods. This monitoring may occur on a per-beam or per-beam group basis, occur at different intervals for different beams, and occur with more or less regularity at different times of the day. The monitoring may be for the uplink or the downlink. As the monitored data traffic flow changes, or the rate of change or resource requests vary, the length of the allocation period may be modified. For example, the length of the allocation period may be extended when the monitored data traffic flow falls below a threshold. Conversely, the length of the allocation period may be reduced when the monitored data traffic flow increases above a threshold. In another example, the length of the allocation period may be extended when the variance of carrier group requests across allocation periods decreases. Conversely, the length of the allocation period may be reduced when the variance of carrier group requests across allocation periods increases. The intervals between receiving resource requests, generating resource request data, and generating an amount of allocatable resource units may also be extended or contracted based on the monitoring.

Figure 16:
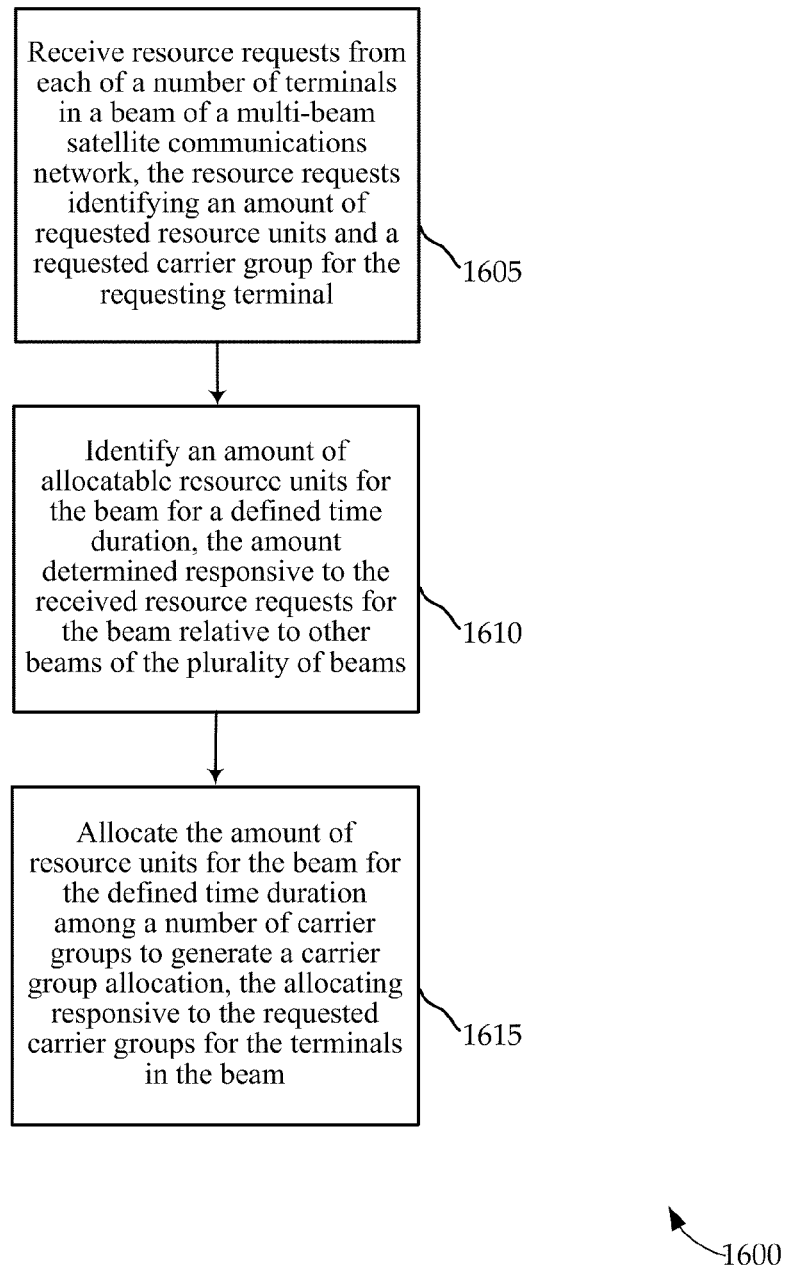
FIG. 16 is a flow chart illustrating a method of allocating system resources among carrier groups in a satellite communications network according to various embodiments of the invention.

FIG. 16 is a flowchart illustrating a method 1600 of resource allocation among carrier groups in a beam in a multi-beam satellite communications network. The method 1600 may, for example, be performed by the NCC 140 or DBRA control unit 125 of FIG. 1, or any combination thereof. More specifically, the method 1600 may be performed by the configuration 1400 of FIG. 1400 or device 1500 of FIG. 15.

At block 1605, resource requests are received from each of a number of terminals in a beam of a multi-beam satellite communications network, the resource requests each identifying an amount of requested resource units and a requested carrier group for the requesting terminal. At block 1610, an amount of allocatable resource units is identified for the beam for a defined time duration, the amount determined responsive to the received resource requests for the beam relative to other beams of the plurality of beams. At block 1615, the amount of resource units for the beam for the defined time duration is allocated among a number of carrier groups to generate a carrier group allocation, the allocating responsive to the requested carrier groups for the terminals in the beam.

Figure 17:
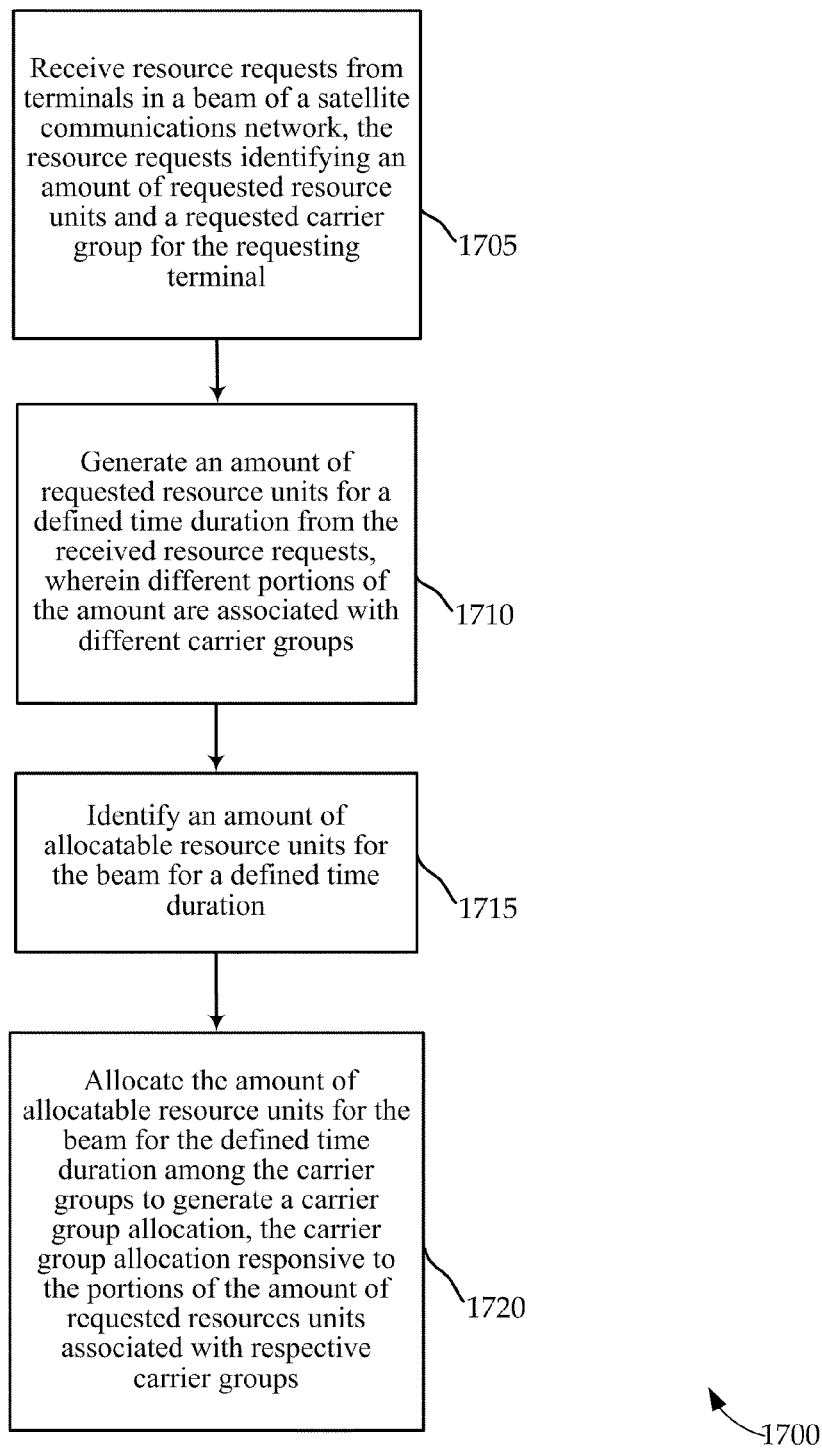
FIG. 17 is a flow chart illustrating an alternative method of allocating system resources among carrier groups in a satellite communications network according to various embodiments of the invention.

FIG. 17 is a flowchart illustrating an alternative method 1700 of resource allocation among carrier groups in a beam in a satellite communications network. The method 1700 may, for example, be performed by the NCC 140 or DBRA control unit 125 of FIG. 1, or any combination thereof. More specifically, the method 1700 may be performed by the configuration 1400 of FIG. 1400 or device 1500 of FIG. 15.

At block 1705, resource requests are received from terminals in a beam of a satellite communications network, the resource requests each identifying an amount of requested resource units and a requested carrier group for the requesting terminal. At block 1710, an amount of requested resource units for a defined time duration is generated from the received resource requests, wherein different portions of the amount are associated with different carrier groups. At block 1715, an amount of allocatable resource units is identified for the beam for a defined time duration. At block 1720, the amount of allocatable resource units for the beam for the defined time duration is allocated among the carrier groups to generate a carrier group allocation, the carrier group allocation responsive to the portions of the amount of requested resource units associated with respective carrier groups.

Figure 18:
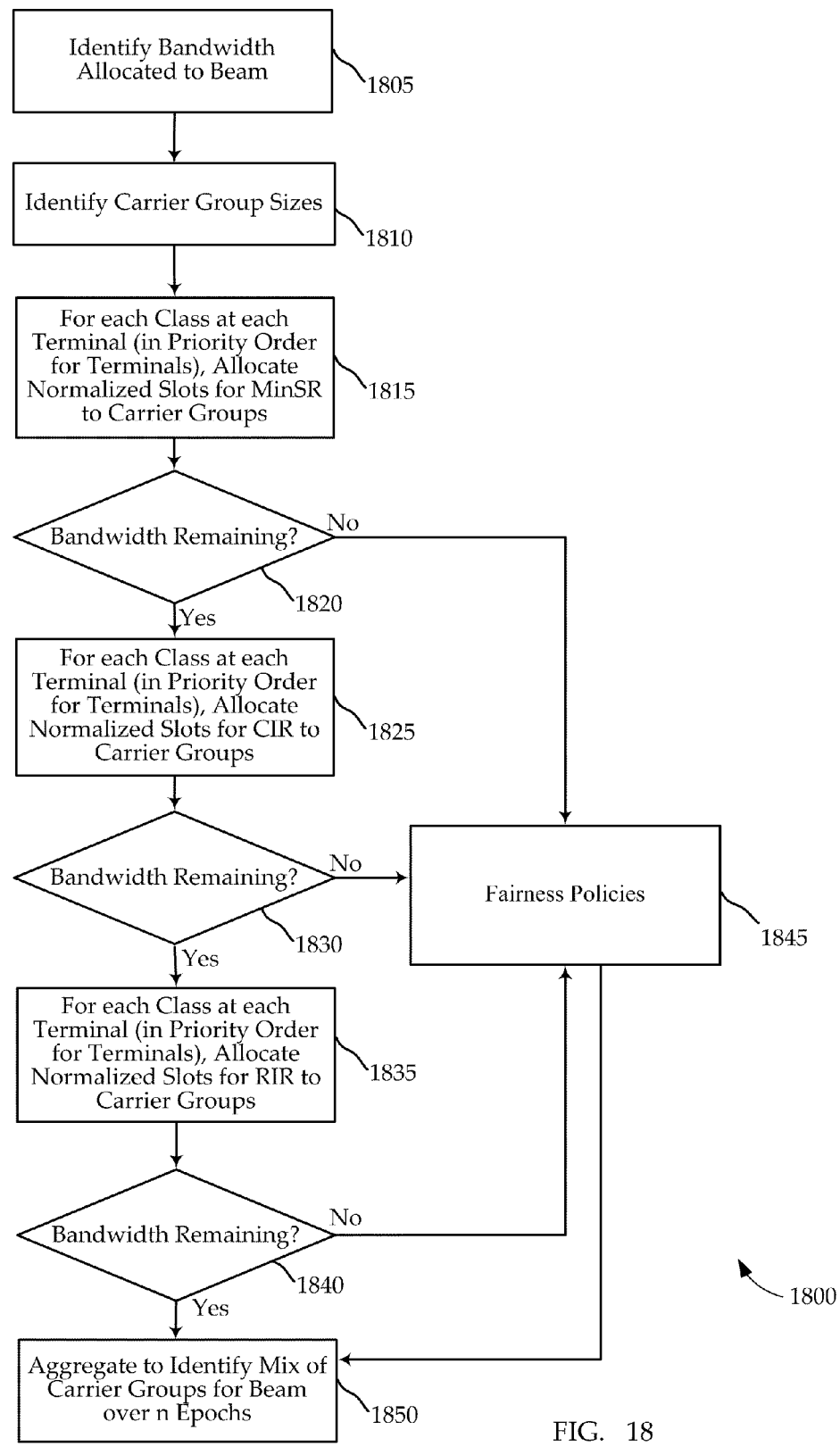
FIG. 18 is a flow chart illustrating a method of allocating system resources, according to characteristics of resource requests, among carrier groups in a satellite communications network according to various embodiments of the invention.

FIG. 18 is a flowchart illustrating a method 1800 of carrier group apportionment over n epochs. The method 1800 may, for example, be performed by the NCC 140 or DBRA control unit 125 of FIG. 1, or any combination thereof. More specifically, the method 1800 may be performed by the configuration 1400 of FIG. 1400 or device 1500 of FIG. 15.

At block 1805, the bandwidth allocated to the beam is identified. At block 1810, the carrier group sizes for the channel or channels assigned to the beam are identified, as well. The allocated bandwidth may be apportioned to carrier groups based on information provided by the requests 205 set forth in FIG. 2, as organized in one or more of the tables 400, 500, 550 set forth in FIGS. 4, 5A, or 5B). Using this information, at block 1815, the MinSR requests (e.g., from one or more of the tables 400, 500, 550 set forth in FIGS. 4, 5A, or 5B) over the n epochs for each traffic class at each terminal are identified, and the amount of bandwidth is apportioned to the applicable carrier group (as identified in the requests) in the form of normalized slots in priority order. Thus, in one embodiment, assume that each terminal has a priority designation of 1, 2, or 3 (1 being the highest priority). Thus, the requested MinSR bandwidth for each class at each priority 1 terminal is identified so that amount of bandwidth may be apportioned in the form of normalized slots for respective carrier groups. If allocatable bandwidth remains, the requested MinSR bandwidth for each class at each priority 2 terminal is identified so that amount of bandwidth may be apportioned in the form of normalized slots for respective carrier groups. If allocatable bandwidth remains, requested MinSR bandwidth for each class at each priority 3 terminal is identified so that amount of bandwidth may be apportioned in the form of normalized slots for respective carrier groups. If, as indicated at block 1820, a determination is made during any of these priority allocations that there is insufficient bandwidth to apportion to MinSR requests at that priority level, the remaining allocatable bandwidth for that priority level may be apportioned among carrier groups according to fairness policies 1845 (e.g., Proportional, Weighted Proportional, Fair Share, or Weighted Fair Share, which will be discussed in more detail below).

If bandwidth remains available for apportionment, at block 1825, the CIR requests over the n epochs for each traffic class at each terminal are identified, and the remaining allocatable bandwidth is apportioned to the applicable carrier group (as identified in the requests) in the form of normalized slots in priority order. A CIR request may be the CIR request less the previously allocated MinSR at each class and terminal. This CIR request value may equal min(CIR, RIR). Again assume that each terminal has a priority designation of 1, 2, or 3. Thus, the requested CIR bandwidth for each class at each priority 1 terminal is identified so that amount of bandwidth may be apportioned in the form of normalized slots for respective carrier groups. If bandwidth remains to be allocated, the requested CIR bandwidth for each class at each priority 2 terminal is identified so that amount of bandwidth may be apportioned in the form of normalized slots for respective carrier groups. If allocatable bandwidth remains, requested CIR bandwidth for each class at each priority 3 terminal is identified so that amount of bandwidth may be apportioned in the form of normalized slots for respective carrier groups. If, as indicated at block 1830, a determination is made during any of these priority allocations that there is insufficient bandwidth to allocate to CIR at that priority level, the remaining allocable bandwidth for that priority level may be apportioned across carrier groups according to fairness policies 1845. Note that the CIR requests may be done first, instead of the MinSR requests, in some embodiments.

If bandwidth remains available for apportionment, the RIR requests over the n epochs for each class at each terminal in the beam are identified, and remaining allocatable bandwidth apportioned to the applicable carrier group in the form of normalized slots in priority order at block 1835. An RIR request may be the RIR request less the previously allocated CIR and MinSR. Again assume that each terminal has a priority designation of 1, 2, or 3. Thus, the requested RIR bandwidth for each traffic class at each priority 1 terminal in the beam is identified so that amount of bandwidth may be apportioned in the form of normalized slots for respective carrier groups. If bandwidth remains to be allocated, the requested RIR bandwidth for each class at each priority 2 terminal is identified so that amount of bandwidth may be apportioned in the form of normalized slots for respective carrier groups. If bandwidth remains, requested RIR bandwidth for each class at each priority 3 terminal is identified so that amount of bandwidth may be apportioned in the form of normalized slots for respective carrier groups. If, as indicated at block 1840, a determination is made during any of these priority allocations that there is insufficient bandwidth to allocate to RIR at that priority level, the RIR for that priority level may be apportioned among carrier groups according to fairness policies 1845. However, if it is determined that bandwidth remains available at block 1840, the remaining bandwidth may be apportioned between carrier groups (e.g., on a round robin basis). At block 1850, the normalized slots may be aggregated to identify the mix of carrier groups to carry that traffic.

Figure 19:
FIG. 19 is a block diagram of a table that may be used in allocating system resources among carrier groups in a satellite communications network according to various embodiments of the invention.

Turning to FIG. 19, a diagram is shown representing a table 1900 illustrating an example of how the apportionment of the method of FIG. 18 may take place. Beginning at row 1905, and moving from left to right, the MinSR request over the n epochs for each class at each terminal is apportioned to the applicable carrier group 1920 in the form of normalized slots in priority order (e.g., as described with reference to block 1815). Then, at row 1910, and moving from left to right, the CIR request over the n epochs for each class at each terminal is apportioned to the applicable carrier group 1920 in the form of normalized slots in priority order (e.g., as described with reference to block 1825). On to row 1915, moving from left to right, the RIR request over the n epochs for each class at each terminal is apportioned to the applicable carrier group 1920 in the form of normalized slots in priority order (e.g., as described with reference to block 1835). If the allocatable resources are depleted before the progression is complete, the resources for the applicable priority level may be apportioned according to the fairness policies (e.g., Proportional, Weighted Proportional, Fair Share, or Weighted Fair Share, which will be discussed in more detail below).

Figure 20:
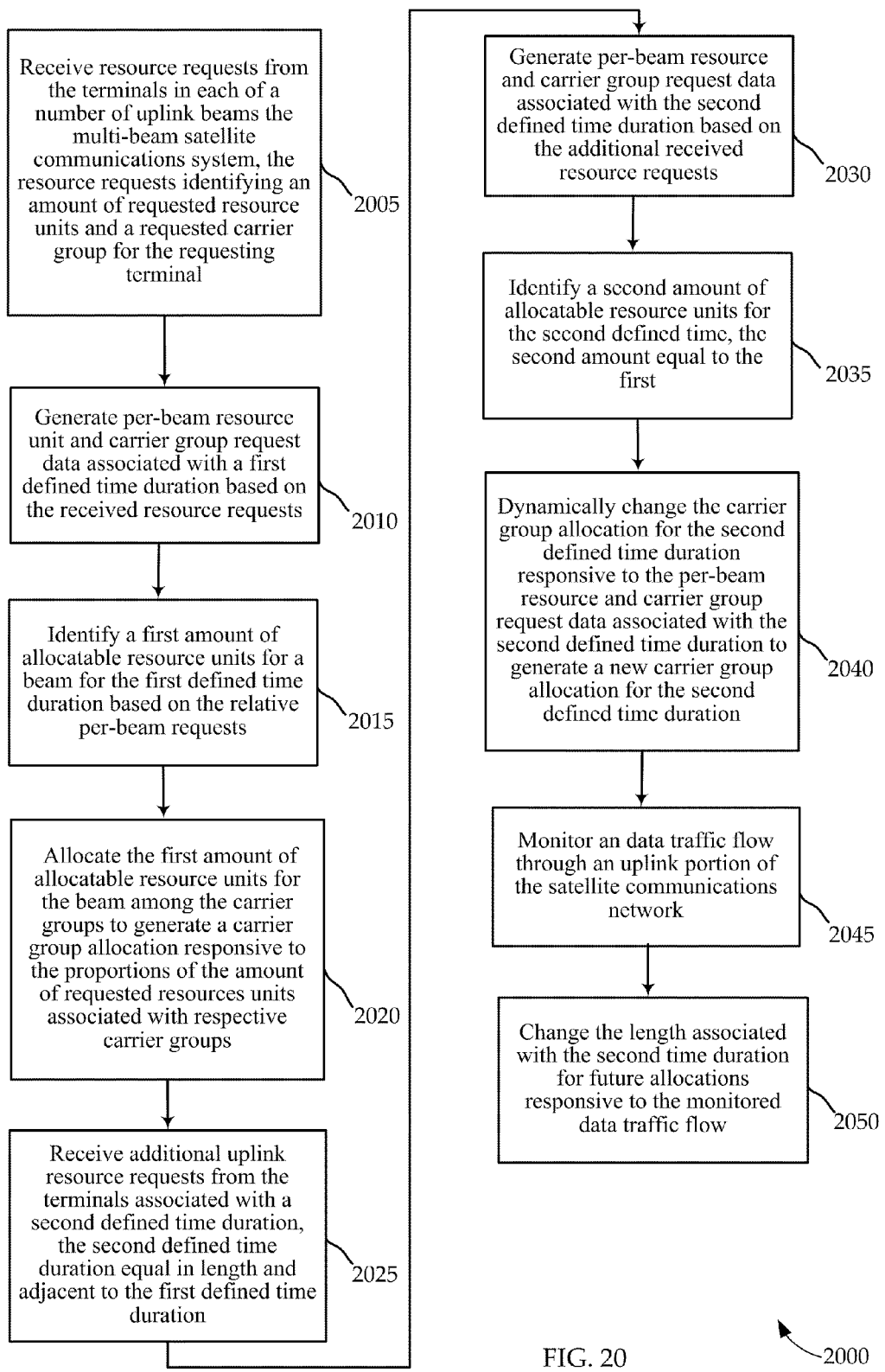
FIG. 20 is a flow chart illustrating a method of allocating system resources among carrier groups across different epochs according to various embodiments of the invention.

FIG. 20 is a flowchart illustrating an alternative method 2000 of resource allocation among carrier groups in a beam in a satellite communications network. The method 2000 may, for example, be performed by the NCC 140 or DBRA control unit 125 of FIG. 1, or any combination thereof. More specifically, the method 2000 may be performed by the configuration 1400 of FIG. 1400 or device 1500 of FIG. 15.

At block 2005, resource requests are received from the terminals in each of a number of uplink beams of the multi-beam satellite communications system, the resource requests identifying an amount of requested resource units and a requested carrier group for each requesting terminal. At block 2010, per-beam resource unit and carrier group request data associated with a first defined time duration are generated based on the received resource requests. At block 2015, a first amount of allocatable resource units for a beam for the first defined time duration is identified based on the relative per-beam requests. At block 2020, the first amount of allocatable resource units for the beam is allocated among the carrier groups to generate a carrier group allocation responsive to the proportions of the amount of requested resource units associated with the respective carrier groups.

At block 2025, additional uplink resource requests are received from the terminals associated with a second defined time duration, the second defined time duration equal in length and adjacent to the first defined time duration. At block 2030, per-beam resource and carrier group request data associated with the second defined time duration are generated based on the additional received resource requests. At block 2035, a second amount of allocatable resource units for the second defined time is identified, the second amount equal to the first. At block 2040, the carrier group allocation for the second defined time duration is dynamically changed responsive to the per-beam resource and carrier group request data associated with the second defined time duration to generate a new carrier group allocation for the second defined time duration. At block 2045, a data traffic flow is monitored through an uplink portion of the satellite communications network. At block 2050, the length associated with the second time duration is changed for future allocations responsive to the monitored data traffic flow.

The preceding discussion illustrates some examples of how a given amount of uplink bandwidth (or some other measure of capacity) over n epochs may be dynamically apportioned to particular carrier groups for a beam of a satellite in a multi-beam system. The sum of the bandwidth allocated to a beam for the n epochs may be less than, equal to, or more than the total bandwidth to be apportioned over the n epochs (there may also be an error margin). Thus, there may be a dynamic apportionment of bandwidth allocated to an uplink over n epochs to different sub-channel sizes of an assigned channel. This uplink apportionment may be adaptive to changing traffic demands, mobile terminals moving in and out of beams, and weather issues (which may require more bandwidth to transmit the same amount of data). The apportionment may be responsive to requests from terminals within the beam and account for terminal priority and the characteristics of the traffic. While the apportionment is discussed as occurring over every n epochs, n may vary (occurring more regularly when capacity increases, and less frequently when capacity in plentiful or traffic characteristics are stable).

While the above discussion identifies some embodiments, it is worth noting that there are a number of alternative options, as well. For example, the class 1 traffic may be apportioned in priority order for MinSR, CIR, and then RIR; the class 2 traffic may be apportioned in priority order for MinSR, CIR, and then RIR; up to the class n traffic apportioned in priority order for MinSR, CIR, and then RIR. In another example, the class 1 traffic may be apportioned in priority order for MinSR, and then for CIR; the class 2 traffic may be apportioned in priority order for MinSR, and then for CIR; up to the class n traffic apportioned in priority order for MinSR and then CIR; then the RIR traffic may be apportioned in priority order without accounting for classes. It is worth noting that there may be more, or fewer, traffic classes and terminal priority levels. Certain priority levels may have different priority attributes as well. For example, in some embodiments, all the traffic (MinSR, CIR, and RIR) may be apportioned first to priority 1 terminals; for lower priority terminals, the apportionment may progress as described for FIGS. 14-20. It is also worth noting that the MinSR, CIR, and RIR are merely examples, and these traffic request categorizations may be expanded, narrowed, or otherwise refined.

The following pseudocode represents an example embodiment of the carrier group apportionment:

```
Input -
    S -              Number of normalized slots in uplink
    MinSR[term, class] -      MinSR for each terminal and class, in normalized slots
    CIR[term, class, level] -  CIR for each terminal, class and level in normalized slots
                     CIR[level*] values are cumulative, with CIR[maxLevel−1] = 100%
    RIR[term, class] - Requested normalized slots for each terminal term and class
```

```
Output -
  S[k*] - Number of normalized slots allocated to each CG
Algorithm -
  S[CG*] = 0
  -- Allocate MinSR
  For each priority level p from high to low
      MinSRCGClass[CG, class] = Sum(MinSR[term, class], for all terminals of priority p
  in CG)
      MinSRCG[CG] = Sum(MinSRCGClass[CG, class], for all classes)
      if Sum(MinSRCG[CG], CG) >= S then
          -- Insufficient resources to meet MinSR, use policy to allocate
          MinSRClass[class] = Sum(MinSRCGClass[CG, class], for all CGs)
          S[CG*] = DBRAShare2(S, MinSRClass[class*], MinSRCGClass[CG*,class*],
                  PolicyCIRClass, PolicyCIRTerminal)
              done
          else
              -- Allocate MinSR
              S[CG] += MinSRCG[CG] for each CG
              S = S - allocations made in previous step
          endif
  endfor
  -- Allocate GIR (request below CIR)
  For L = 0 to numCIRLevels
      For each priority level p from high to low
          GIR[term, class, L] = max(min(RIR[term, class], CIR[term, class, L], 0) -
                      CIR[term, class, L-1], 0)
          -- CIR[term, class, -1]= minSR[term, class]
          GIRCGClass[CG, class, L] = sum(GIR[term, class, L], all terminals at priority p
      in CG)
          GIRCG[CG, L] = Sum(GIR[CG, class, L], for all classs)
          if Sum(GIRCG[CG, L], CG) >= S then
              -- Insufficient resources to meet GIR, use policy to allocate
              GIRClass[class, L] = Sum(GIRCGClass[CG, class, L], for all CGs)
              S[CG*] += DBRAShare2(S, GIRClass[class*, L], GIRCGClass[CG*, class*,
              L],
                      PolicyCIRClass, PolicyCIRTerminal)
              done
          else
              -- Allocate GIR
              S[CG] += GIRCG[CG, L] for each CG
              S = S - allocations made in previous step
          endif
      Endfor
  Endfor
  -- Allocate EIR (request above CIR)
  -- Terminal priorities are not used here
  EIR[term, class] = max(RIR[term, class] - CIR[term, class, maxLevel - 1], 0)
  EIRCGClass[CG, class] = Sum(EIR[term, class], all terminals in CG)
  EIRCG[CG] = Sum(EIRCGClass[CG, class], for all classs)
  if Sum(EIRCG[CG], CG) >= S then
      -- Insufficient resources to meet EIR, use policy to allocate
      EIRClass[class] = Sum(EIRCGClass[CG, class], for all CGs)
      S[CG*] += DBRAShare2(S, EIRClass[class*], EIRCGClass[CG*, class*],
              PolicyEIRClass, PolicyEIRTerminal)
          done
      else
          -- Allocate EIR
          S[CG] += EIRCG[CG] for each CG
          S = S - allocations made in previous step
      endif
  -- Allocate Extra
  RIRCG[CG] = Sum(RIR[term, class], all classs, all terminals in CG)
  S[CG] += DBRAExtraShare(S, RIRCG[CG*])
```

Allocate leftover slots, if any, in round-robin order to Carrier Groups

S[CG*] values are in normalized slots and should be converted to un-normalized slots.

In one embodiment, the PolicyCIRClass is Proportional with priority for GS class, the PolicyCIRTerminal is Proportional, the PolicyEIRClass is Fair Share (FS) with priority for GS class, and the PolicyEIRTerminal is Fair Share (FS).

Class Pool Sizing: Assume that one or more carrier groups within a beam have each been allocated resources. The apportioned resources in each carrier group (e.g., over one or more epochs) may be re-apportioned among classes. As discussed above, in some embodiments, each of a number of carrier groups are apportioned bandwidth over a period of n epochs. Thus, assume the following channel structure; over n epochs, there may be $x_{CG80}$ slots apportioned to first carrier group (80 MHz), $x_{CG20}$ slots apportioned to second carrier group (20 MHz), $x_{CG5}$ slots apportioned to third carrier group (5 MHz), and $x_{CG1.67}$ slots apportioned to fourth carrier group (1.67 MHz). This may be the carrier group apportionment discussed with reference to FIGS. 14-19. Each carrier group (or each set of carrier groups) may, therefore, be apportioned 1/n of such slots in each epoch. In one embodiment, in each epoch (or set of epochs) the apportioned slots in each carrier group may be re-apportioned among classes. This re-apportionment may, for example, be performed by the NCC 140 or DBRA control unit 125 of FIG. 1, or any combination thereof.

Figure 21A:
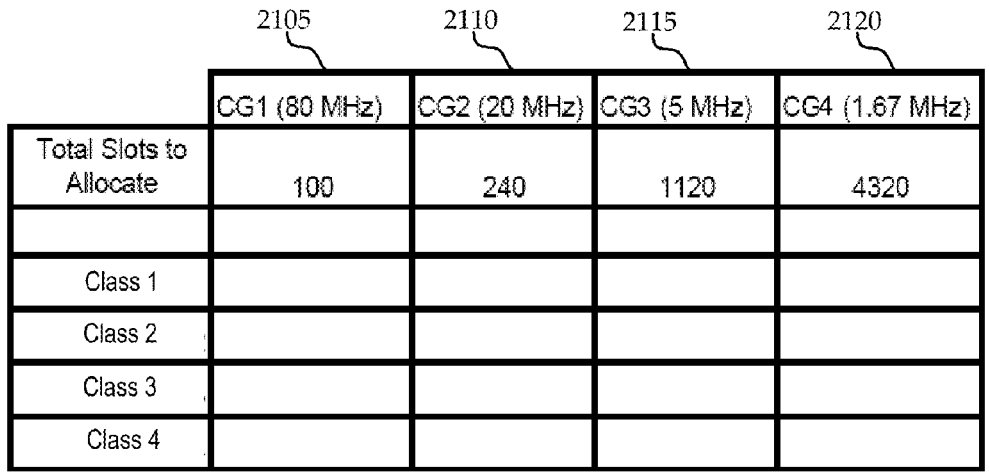
FIGS. 21A and 21B are block diagrams of tables that may be used in allocating resources among classes in a satellite communications network according to various embodiments of the invention.

Turning first to FIG. 21A, a table 2100 illustrates an example apportionment of carrier groups for an epoch. This may be 1/n of a carrier group apportionment set forth in any of FIGS. 14-20 for n epochs, or each carrier group may otherwise receive an apportionment for the epoch. The table 2100 shows the per-epoch apportionment for Carrier Group 1 (80 MHz) 2105, Carrier Group 2 (20 MHz) 2110, Carrier Group 3 (5 MHz) 2115, Carrier Group 4 (1.67 MHz) 2120. In other embodiments, the carrier groups may be of different sizes. Each epoch, a carrier group apportionment for a beam, may be re-apportioned among traffic classes. However, instead of a per-epoch re-apportionment, in some embodiments the re-apportionment may occur more or less often. The re-apportionment may be made for each carrier group individually; for example, re-apportion Carrier Group 1 2105 for the epoch, then re-apportion Carrier Group 2 2110, then re-apportion Carrier Group 3 2115, and then re-apportion Carrier Group 4 2120.

Figure 21B:
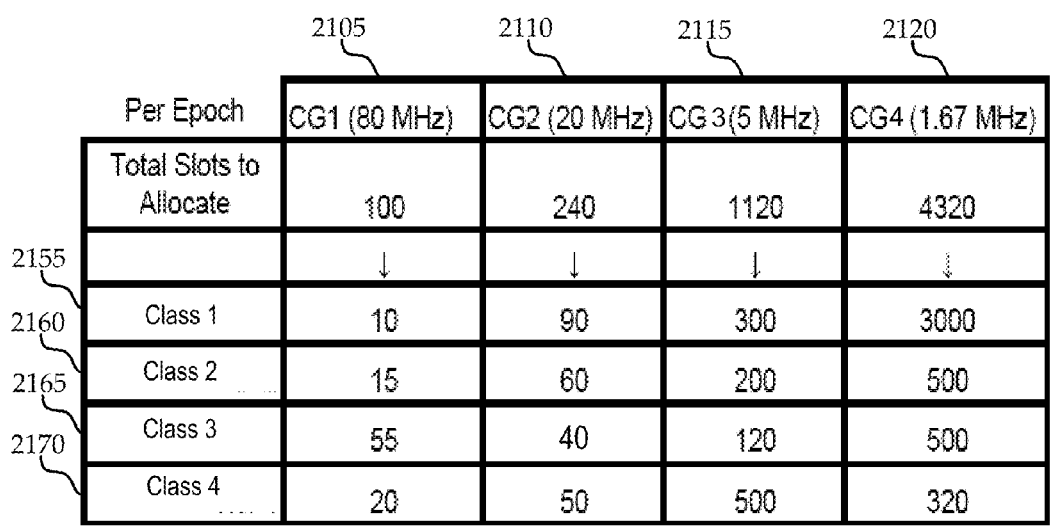

FIG. 21B is a table 2150 illustrating an example re-apportionment of each carrier group among traffic classes. In one embodiment, Carrier Group 1 2105 is first re-apportioned to traffic class 1 2155, then class 2 2160, then class 3 2165, and finally class 4 2170; Carrier Group 2 2110 is next re-apportioned to class 1 2155, then class 2 2160, then class 3 2165, and finally class 4 2170; Carrier Group 3 2115 is then re-apportioned to class 1 2155, then class 2 2160, then class 3 2165, and finally class 4 2170; concluding with Carrier Group 4 2120 being re-apportioned to class 1 2155, then class 2 2160, then class 3 2165, and finally class 4 2170. There may be different numbers of traffic classes in other embodiments.

Figure 22:
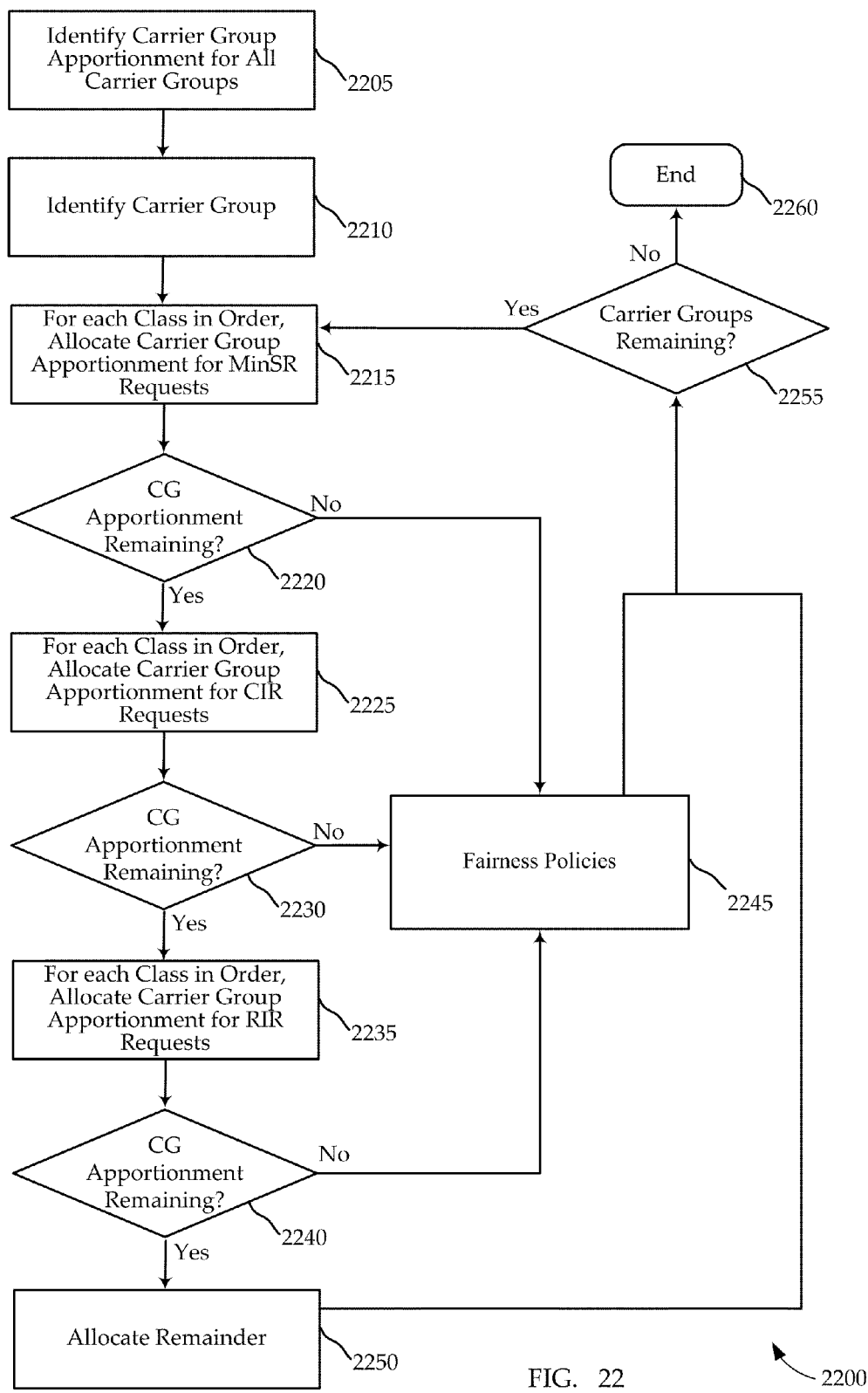
FIG. 22 is a flow chart illustrating a method for making traffic class allocations according to various embodiments of the invention.

FIG. 22 is a flowchart illustrating a method 2200 of carrier group re-apportionment among traffic classes. At block 2205, the apportionment among carrier groups is identified. The apportionment may be the apportionment to carrier groups as set forth in FIGS. 14-20. For each carrier group (although in some embodiments there need only be a single carrier group in a single beam), the following re-apportionment may occur (e.g., each epoch). At block 2210, a first carrier group is identified. At block 2215, the MinSR requests (e.g., from one or more of the tables 400, 500, 550 set forth in FIGS. 4, 5A, or 5B) over an epoch at the identified carrier group are allocated to traffic classes according to the per-traffic class MinSR requests. Thus, in one embodiment, assume that there are 3 traffic classes (1 being the highest class). Thus, the requested MinSR bandwidth for class 1 traffic may be allocated to that traffic class. If some of the carrier group apportionment ("CG apportionment") remains, the requested MinSR bandwidth for class 2 traffic may be allocated to that traffic class. If CG apportionment remains, requested MinSR bandwidth for class 3 traffic may be allocated to that traffic class. If, as indicated at block 2220, a determination is made during any of these allocations that there is an insufficient CG apportionment to allocate to MinSR requests at that class level, the MinSR for that class level may be apportioned according to fairness policies 2245 (e.g., Proportional, Weighted Proportional, Fair Share, or Weighted Fair Share, which will be discussed in more detail below).

If some of the CG apportionment remains available, at block 2225, the CIR requests over the epoch for the identified carrier group are allocated to traffic classes. A CIR request may be the CIR request less the previously allocated MinSR. This CIR request value may equal min(CIR, RIR). Thus, the requested CIR bandwidth for class 1 traffic may be allocated to that traffic class. If some of the CG apportionment remains, the requested CIR bandwidth for class 2 traffic may be allocated to that traffic class. If CG apportionment remains, requested CIR bandwidth for class 3 traffic may be allocated to that traffic class. If, as indicated at block 2230, determination is made during any of these allocations that there is an insufficient CG apportionment to allocate to CIR requests at that class level, the RIR for that class level may be apportioned according to fairness policies 2245. Note that the CIR requests may be done first, instead of the MinSR requests, in some embodiments.

If some of the CG apportionment remains available, the RIR request over the epoch for the identified carrier group is allocated to traffic classes at block 2235. An RIR request may be the RIR request less the previously allocated CIR and MinSR. Again assume that there are 3 traffic classes. Thus, the requested RIR bandwidth for class 1 traffic may be allocated to that traffic class. If some of the CG apportionment remains, the requested RIR bandwidth for class 2 traffic may be allocated to that traffic class. If CG apportionment remains, requested RIR bandwidth for class 3 traffic may be allocated to that traffic class. If, as indicated at block 2240, a determination is made during any of these allocations that there is an insufficient CG apportionment to allocate to RIR requests at that class level, the RIR for that class level may be apportioned according to fairness policies 2245. However, if it is determined that the CG apportionment remains available at block 2240, the remaining CG apportionment may be apportioned between classes at block 2250 (e.g., on a round robin basis). Once an identified carrier apportionment has been allocated to classes, a determination may be made whether there is another carrier group apportionment to allocate to classes at block 2255. If so, the method 2200 may resume from block 2210 for a new carrier group; if not, the process may be terminated 2260 for the epoch.

In other embodiments, the carrier group re-apportionment for an epoch may proceed in the following manner. First, the carrier group apportionment for an epoch may be identified (e.g., this may be identified as the number of 80 MHz slots apportioned to the 80 MHz carrier group for the epoch). The bandwidth requests of the terminals may determine the re-apportionment of carrier group slots among classes. These may be the requests 205 set forth in FIG. 2, as organized in one or more of the tables 400, 500, 550 set forth in FIGS. 4, 5A, or 5B, which include information on MinSR, CIR, and RIR for each traffic class, and identify terminal priorities. There are a number of different ways in which the re-apportionment may proceed from this point:

1) In one embodiment, the class 1 traffic may be re-apportioned slots for MinSR requests, and then for CIR requests; the remaining classes may be then proportionally re-apportioned slots (e.g., in terminal priority order) for MinSR requests, and then for CIR requests, without accounting for traffic class preferences; then the RIR requests may be re-apportioned for class 1; the remaining classes may be then proportionally re-apportioned slots (e.g., in terminal priority order) for RIR without accounting for class preferences.

2) In another embodiment, the class 1 traffic may be re-apportioned slots for MinSR requests, and then for CIR requests; the class 2 traffic may be re-apportioned slots for MinSR requests, and then for CIR requests; up to the class n traffic having re-apportioned slots for MinSR requests, and then for CIR requests; then the RIR traffic may be re-apportioned slots (e.g., in terminal priority order) without accounting for traffic classes.

3) In still other embodiments, each class may be re-apportioned slots based on MinSR requests in a progression that does not account for traffic classes (instead, proceeding according to terminal priority). Then, each class may be re-apportioned slots based on the CIR requests in a progression that does not account for classes, and then the RIR requests may be re-apportioned slots without accounting for classes.

If there is insufficient bandwidth to apportion the MinSR, CIR, or RIR requests at a particular class (or, perhaps, a priority level), the applicable MinSR, CIR, or RIR request for that class or priority level may be apportioned according to fairness policies (e.g., Proportional, Weighted Proportional, Fair Share, or Weighted Fair Share, which will be discussed in more detail below).

Thus, there may be a dynamic re-apportionment of a given carrier group's (or set of carrier groups') classes across classes in each epoch. This re-apportionment may be adaptive to changing traffic demands, mobile terminals moving in and out of beams, and weather issues (which may require more bandwidth to transmit the same amount of data). The re-apportionment may be responsive to requests from terminals within the beam and account for terminal priority and the characteristics of the traffic. While the re-apportionment is discussed as occurring over every epoch, it may also occur more or less regularly. It is worth noting that there may be more, or fewer, traffic classes and terminal priority levels. Certain priority levels may have different priority attributes as well. For example, in some embodiments, all the traffic (MinSR, CIR, and RIR) may be apportioned first to priority 1 terminals; for lower priority terminals, the apportionment may progress as described for FIG. 22. It is also worth noting that the MinSR, CIR, and RIR are merely examples, and these traffic request categorizations may be expanded, narrowed, or otherwise refined.

The following pseudocode represents an example embodiment of the carrier group re-apportionment among traffic classes:

```
Input -
    S - Number of slots in Carrier Group
    MinSR[term, class] -      MinSR for each terminal and class, in slots
    CIR[term, class, level] -   CIR for each terminal, class and level, in slots
                CIR[level*] values are cumulative, with CIR[maxLevel-1] = 100%
    RIR[term, class] -    Requested slots for each terminal and class
Output -
    S[class*] - Number of slots allocated to each class
Algorithm -
    S[class*] = 0
    -- Allocate MinSR
    For each priority level p from high to low
        MinSRClass[class] = Sum(MinSR[term, class], for all terminals at priority p in CG)
        if Sum(MinSRClass[class], for all classss) >= S then
            -- Insufficient resources to meet MinSR, use policy to allocate
            S[class*] = DBRAShare(S, MinSRClass[class*], PolicyCIRClass)
            done
        else
            -- Allocate MinSR
            S[class] += MinSRClass[class] for each classs
            S = S - allocations made in previous step
        endif
    endfor
    -- Allocate GIR (request below CIR)
    For L = 0 to numCIRLevels
        For each priority level p from high to low
            GIR[term, class, L] = max(min(RIR[term, class], CIR[term, class, L], 0) -
                        CIR[term, class, L-1], 0)
            -- CIR[term, class, -1] = minSR[term, class]
            GIRClass[class, L] = sum(GIR[term, class, L], all terminals at priority p)
            if Sum(GIRClass[class, L], class) >= S then
                -- Insufficient resources to meet GIR, use policy to allocate
                S[class*] += DBRAShare(S, GIRClass[class*, L], PolicyCIRClass)
                done
            else
                -- Allocate GIR
                S[class] += GIRClass[class, L] for each class
                S = S - allocations made in previous step
            endif
        Endfor
    Endfor
    -- Allocate EIR (request above CIR)
    EIR[term, class] = max(RIR[term, class] - CIR[term, class, maxLevel - 1], 0)
    EIRClass[class] = Sum(EIR[term, class], all terminals)
    if Sum(EIRClass[class], class) >= S then
        -- Insufficient resources to meet EIR, use policy to allocate
        S[class*] += DBRAShare(S, EIRClass[class*], PolicyEIRClass)
        done
    else
        -- Allocate EIR
        S[class] += EIRClass[class] for each class
        S = S - allocations made in previous step
    endif
    -- Allocate Extra
    RIRClass[class*] = Sum(RIR[term, class], all terminals)
    S[class*] += DBRAExtraShare(S, RIRClass[class*])
```

Allocate leftover slots, if any, in round-robin order to classes.

Slot Placement: As noted above, in some embodiments, each of a number of carrier groups is apportioned resources for a defined time duration (e.g., one epoch, or n epochs). Functionality is described for the assignment of time slots within a frequency channel to respective carrier groups. Thus, assume an 80 MHz channel structure, including carrier groups of 80 MHz, 20 MHz, 5 MHz, and 1.67 MHz. There may be $X_{CG80}$ slots apportioned to first carrier group (80 MHz), $x_{CG20}$ slots apportioned to second carrier group (20 MHz), $x_{CG5}$ slots apportioned to third carrier group (5 MHz), and $x_{CG1.67}$ slots apportioned to fourth carrier group (1.67 MHz) for n epoch. This allocation among carrier groups may be performed according to the description associated with FIGS. 14-20. In one embodiment, the carrier group allocations may be assigned particular time slots and frequency ranges within the frequency channel before (or after) they are actually assigned to particular terminals. This slot placement may, for example, be performed by the NCC 140 or DBRA control unit 125 of FIG. 1, or any combination thereof. The slot placement may be for the uplink, or downlink, beam of a satellite communications network, such as the system 100 of FIG. 1.

Thus, in one embodiment, a frequency channel (e.g., the 80 MHz channel) may be defined by a first frequency boundary and a second frequency boundary. Carrier group allocations for the frequency channel for a defined time duration (e.g., an epoch, or n epochs) may be identified for each of a number of carrier groups. A first carrier group allocation for a first carrier group (e.g., with a channel size of 80 MHz) is assigned to time slots. This assignment may be performed by spreading the first carrier group allocation to time slots within the frequency channel across the defined time duration. A second carrier group allocation for a second carrier group (e.g., with a channel size of 20 MHz) is assigned to time slots by placing the second carrier group allocation in available time slots adjacent to (or closest to) the first frequency boundary. Additional carrier group allocations for additional carrier groups (e.g., with channel sizes of 5 MHz and 1.67 MHz) are assigned to time slots by placing the additional carrier group allocations substantially between the second frequency boundary and the second carrier group time slot assignments.

In the following examples, the 80 MHz frequency channel and associated carrier group sizes of 80 MHz, 20 MHz, 5 MHz, and 1.67 MHz are used for purposes of example. In other embodiments, there may be channels of the same or different size, and the sub-channel sizes (the channel size of each carrier group) may be the same, or different. Also, in one embodiment, an epoch is 640 ms, and time slots within that epoch are 2 ms (i.e., there are 320 time slots per epoch). For each time slot in an epoch for a frequency channel, apportioned carrier group slots may be placed therein (e.g., before, during, or after the carrier group slots are assigned to terminals and/or classes). The placement may occur each epoch, or over n epochs. It is worth noting that the duration of epoch slots and the number of slots in an epoch may vary in different embodiments. Once the slot placement over an epoch (or n epochs) is complete, particular terminals may be assigned such slots for transmission. This terminal assignment may be specific to classes, or terminals may simply be allocated use of such slots. The terminal assignment will be discussed in greater detail below.

Figure 23:
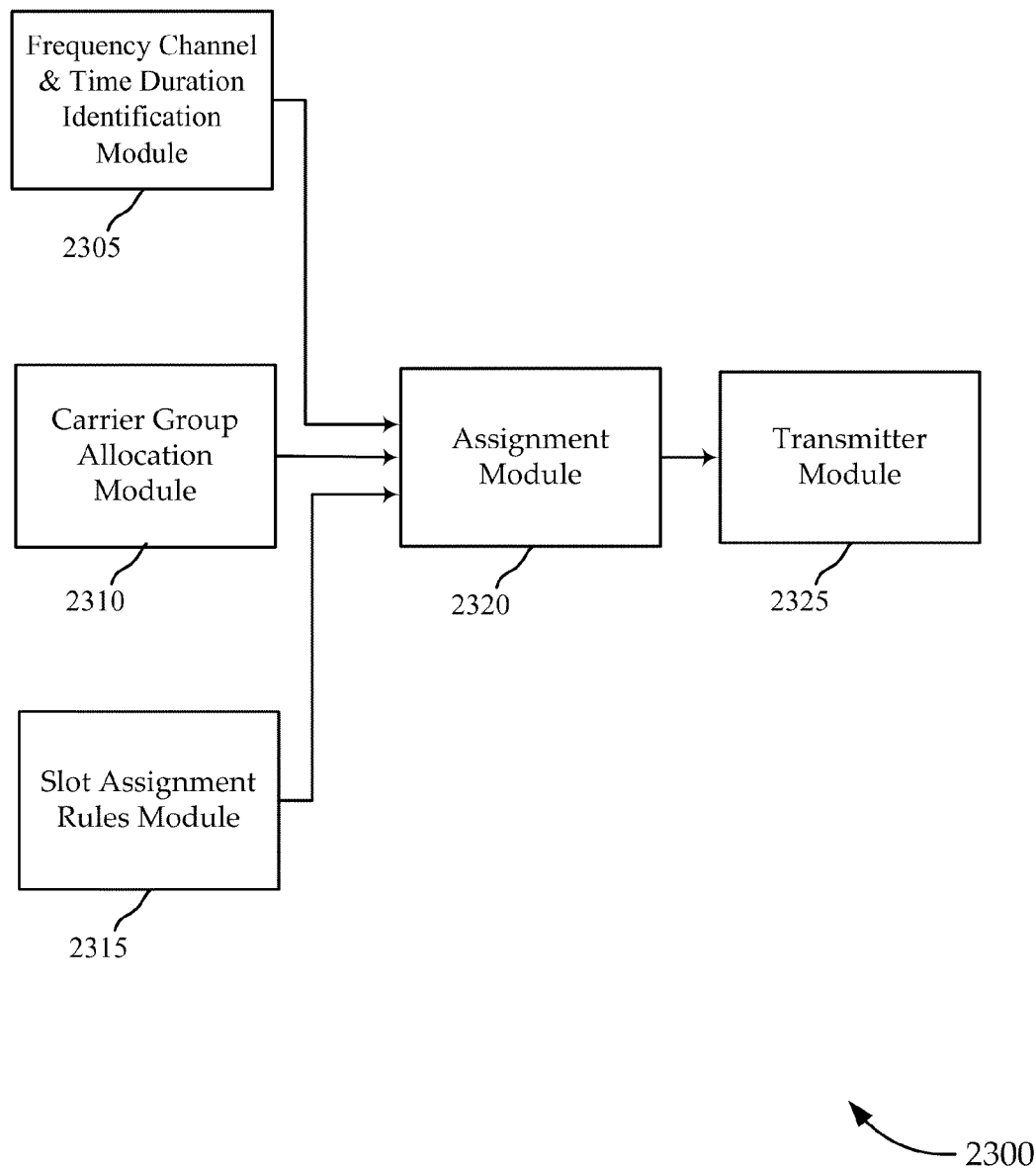
FIG. 23 is a block diagram of a configuration that may be used in a device or system to perform slot placement for carrier group allocations according to various embodiments of the invention.

Turning to FIG. 23, a block diagram is shown illustrating an example configuration 2300 for assigning time slots with a frequency channel to carrier group allocations. This configuration 2300 may be implemented by the system 100 of FIG. 1 or, more specifically, in the terminal 130, NCC 140, or DBRA control unit 125 of FIG. 1, or any combination thereof. However, some or all of the functionality of these modules may be implemented in other devices or sets of devices.

The configuration 2300 includes a frequency channel and time duration identification module 2305, a carrier group allocation module 2310, a slot assignment rules module 2315, an assignment module 2320, and a transmitter module 2325, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The frequency channel and time duration identification module 2305 may be configured to identify the frequency channel and a defined time duration for slot placement. The frequency channel may generally be defined as a frequency range between a first frequency boundary and a second frequency boundary. In one embodiment, the size of the frequency channel and the amount of time slots are identified. In other embodiments, the specific frequencies and precise transmission times are identified to define the frequency channel and time duration.

The carrier group allocation module 2310 may be configured to identify carrier group allocations associated with the defined time duration for each of a plurality of carrier groups. Thus, a different allocation amount for each carrier group (e.g., the 80 MHz, 20 MHz, 5 MHz, and 1.67 MHz carrier groups) for the defined time duration may be identified. These carrier group allocations may be the allocations described with reference to FIGS. 14-20.

The slot assignment rules module 2315 may be configured to store and identify rules for assigning the time slots to carrier group allocations. Thus, within the defined time duration for the frequency channel, there may be a number of time slots therein which are each substantially equal in duration. In one embodiment, the slot assignment rules module 2315 may have rules for first identifying a carrier group allocation for a carrier group with the largest channel size. The rules may specify how a subset of the available time slots may be assigned to the carrier group allocation with the largest channel size by spreading the assignment through the defined time duration. The assignments may be spread so that assigned time slots are substantially equidistant from each other. Specific spreading algorithms will be discussed in more detail later. In one embodiment, the first carrier group channel size may be substantially equal to the frequency range within the frequency channel.

There may also be rules specifying how additional carrier group allocations may be assigned time slots once the assignment of the initial carrier group allocation is completed. For example, the slot assignment rules module 2315 may have rules for next identifying a second carrier group allocation for a carrier group with a second largest channel size. The rules may specify how time slots will be assigned by spreading time slots for the second carrier group allocation through the defined time duration adjacent to (and/or in the closest available frequency slots near) one of the frequency boundaries.

The slot assignment rules module 2315 may have rules for next identifying additional carrier group allocations for carrier groups with smaller channel sizes. The rules may specify how time slots may be assigned by spreading the assignment of an additional carrier group allocation through the defined time duration adjacent to time slot assignments of the second carrier group allocation. The rules may specify how time slots may be assigned by spreading the assignment of an additional carrier group allocation between time slot assignments of the second carrier group allocation and the second frequency boundary of the channel. The rules for the assignment of an additional carrier group allocation may specify that times slots adjacent to the second frequency boundary be filled, so that all time slots of the defined time duration for the frequency channel be filled. The order of assignments may be from the carrier group with the largest size to the carrier group of the smallest size.

The assignment module 2320 may receive data from the frequency channel and time duration identification module 2305, the carrier group allocation module 2310, and the slot assignment rules module 2315. The assignment module 2320 may be configured to assign the received carrier group allocations to time slots in the defined time duration for the identified frequency channel according to the rules. In one embodiment, the assignments are performed based on the size of the frequency channel and the amount of time slots. Thus, the assignment module 2320 may be configured to further identify and map the assignments to specific frequencies and precise transmission times, and forward any or all of this information to the transmitter module 2325. The transmitter module 2325 may transmit any of this information to the terminal 130, NCC 140, or DBRA control unit 125 of FIG. 1.

Figure 24A:
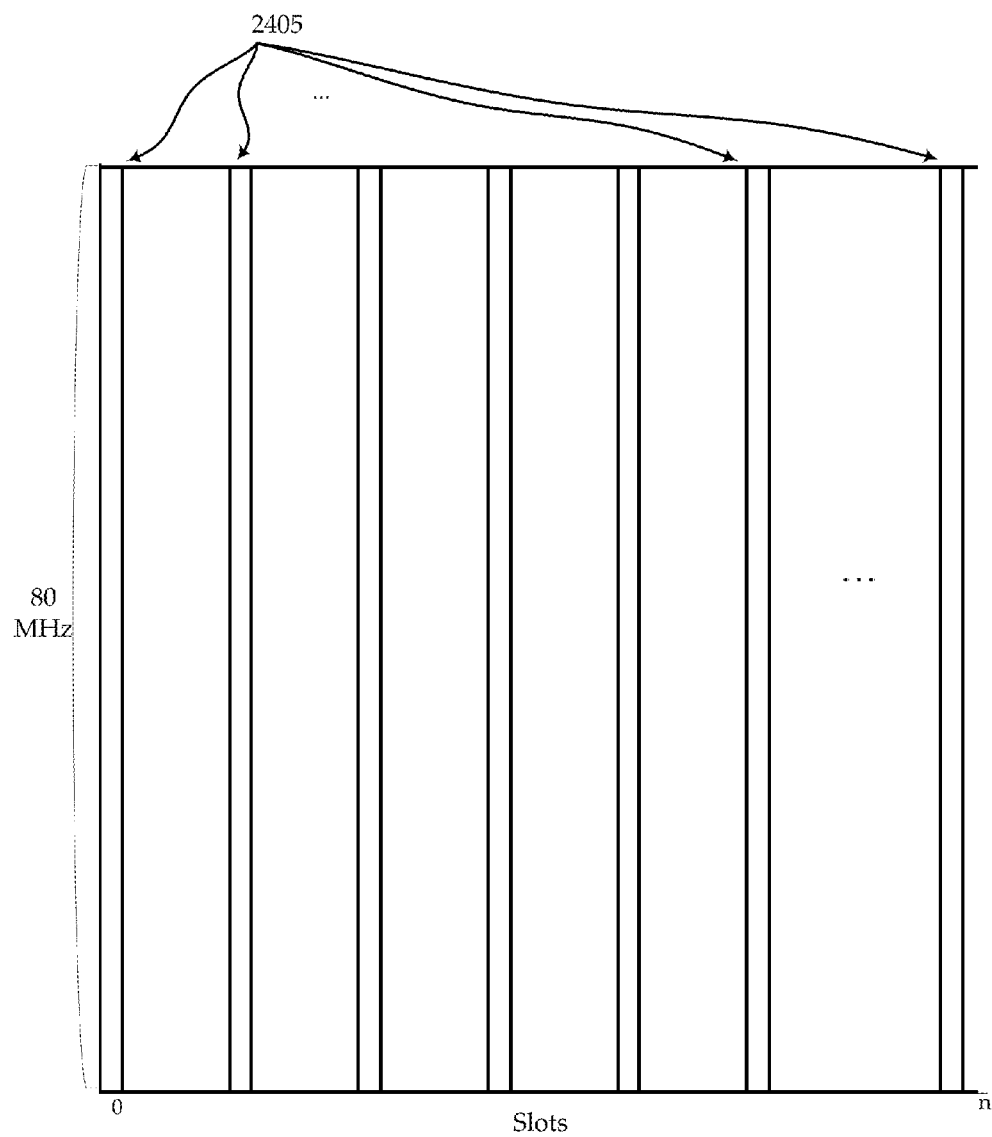
FIGS. 24A-24D are block diagrams of a slot placement scheme according to various embodiments of the invention.

Consider the following example of slot placement rules and assignments within an 80 MHz frequency channel over an epoch including n time slots. This may, for example, be performed by the terminal 130, NCC 140, or DBRA control unit 125 of FIG. 1, or any combination thereof. More specifically, the assignments may be performed by the configuration 2300 of FIG. 23. The carrier group with the widest bandwidth (80 MHz in one embodiment) is the first to be placed in time slots. In one embodiment, the carrier group with the widest bandwidth is spread throughout the time slots, and there are a number of spreading algorithms that may be used. Referring first to FIG. 24A, an example placement map 2400 for such a slot placement is illustrated. As shown, the slots of the 80 MHz carrier group 2405 are spread relatively evenly across the epoch.

One such spreading algorithm identifies a single jump length (across time slots) between each placement; once the end of the epoch is reached, the jump may continue from the beginning. By identifying the right jump length, all of the time slots in an epoch may be visited in distributed fashion. In one embodiment, the total number of time slots (e.g., 320) is divided by e, and the nearest prime integer is used as the number (m) of time slots to jump each placement:

$$m(\text{prime integer}) \approx (\text{time slots per epoch}/e) \qquad \text{Eq. 1}$$

Thus, assuming 320 time slots, m≈320/2.71≈119. If it is assumed that each of the widest carrier group members is placed in a time slot separated by 119 time slots (looping back to the beginning of the epoch once the end of the epoch is reached), the placement would be as follows (0 (jump 119)→119 (jump 119)→238 (jump 119, looping back to beginning)→, 37 (jump 119)→156 (jump 119)→275 (jump 119, looping back to beginning) 74 . . . ). This placement may continue for all of the widest carrier group apportionment, and result in a spreading as illustrated in FIG. 24A.

Figure 24B:
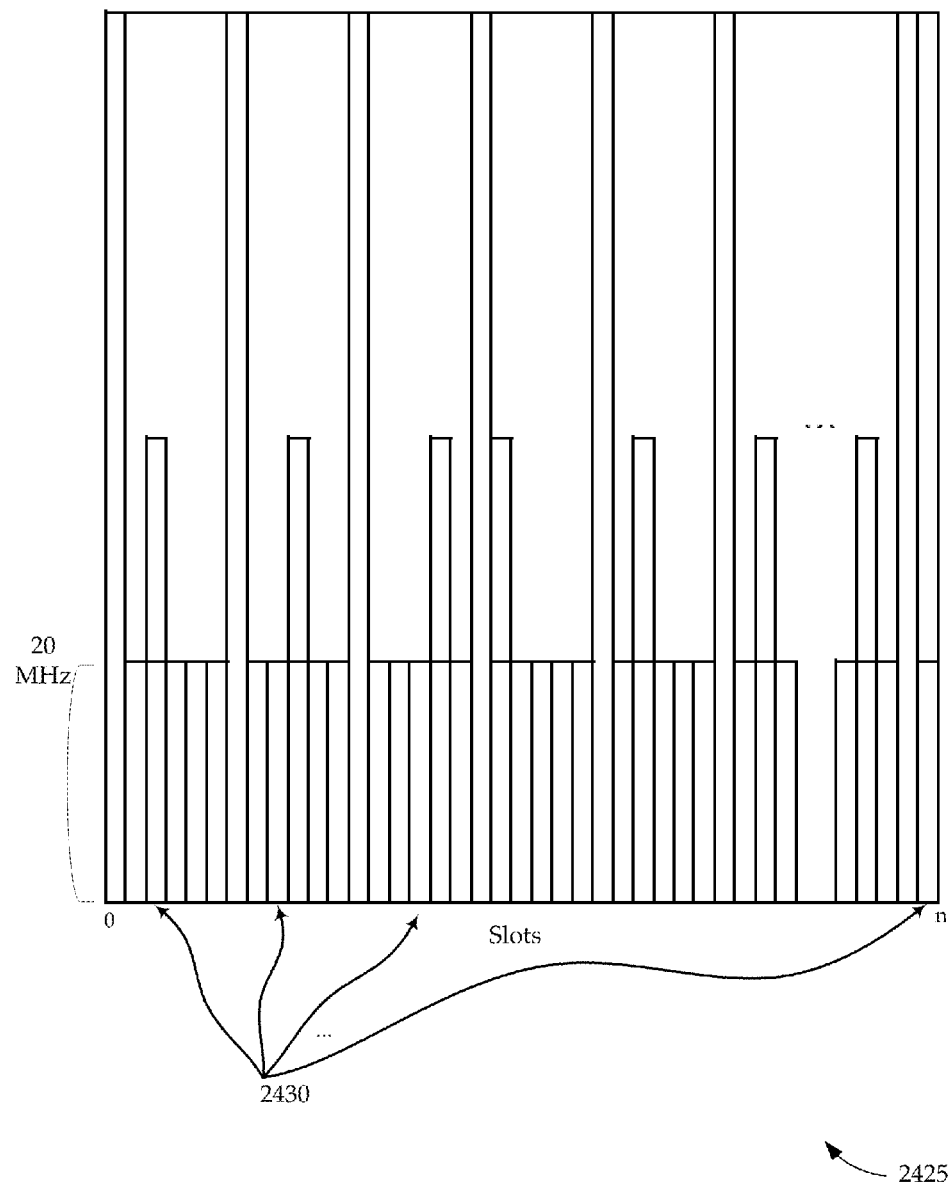

After the widest carrier group apportionment for the epoch has been placed in time slots, the placement of the next widest carrier group apportionment may be initiated. Referring next to FIG. 24B, the example for such a slot placement over an epoch with n time slots is illustrated in an example placement map 2425 for the frequency channel. As shown, the slots of the 20 MHz carrier group 2430 are spread relatively evenly across the bottom of the placement map (e.g., at the edge of the bandwidth of the 80 MHz channel). In other embodiments, such placement may be at the top of the placement map, or a combination of the top and bottom. This placement of the 20 MHz carrier group 2430 occurs between the placements of the 80 MHz carrier group 2405.

In one embodiment, the spreading algorithm identifying a single jump length (across time slots) between each placement is continued from the last placement of the 80 MHz carrier group 2405. As noted, by identifying the right jump length, all of the time slots may be visited in distributed fashion. Once the jump begins to land 80 MHz placements 2405, those timeslots may be skipped over until a 20 MHz placement 2430 is reached, and the placement process may continue. It is worth noting that the particular single jump length spreading algorithm is for purposes of examples only, and various other spreading mechanisms may be used.

Figure 24C:
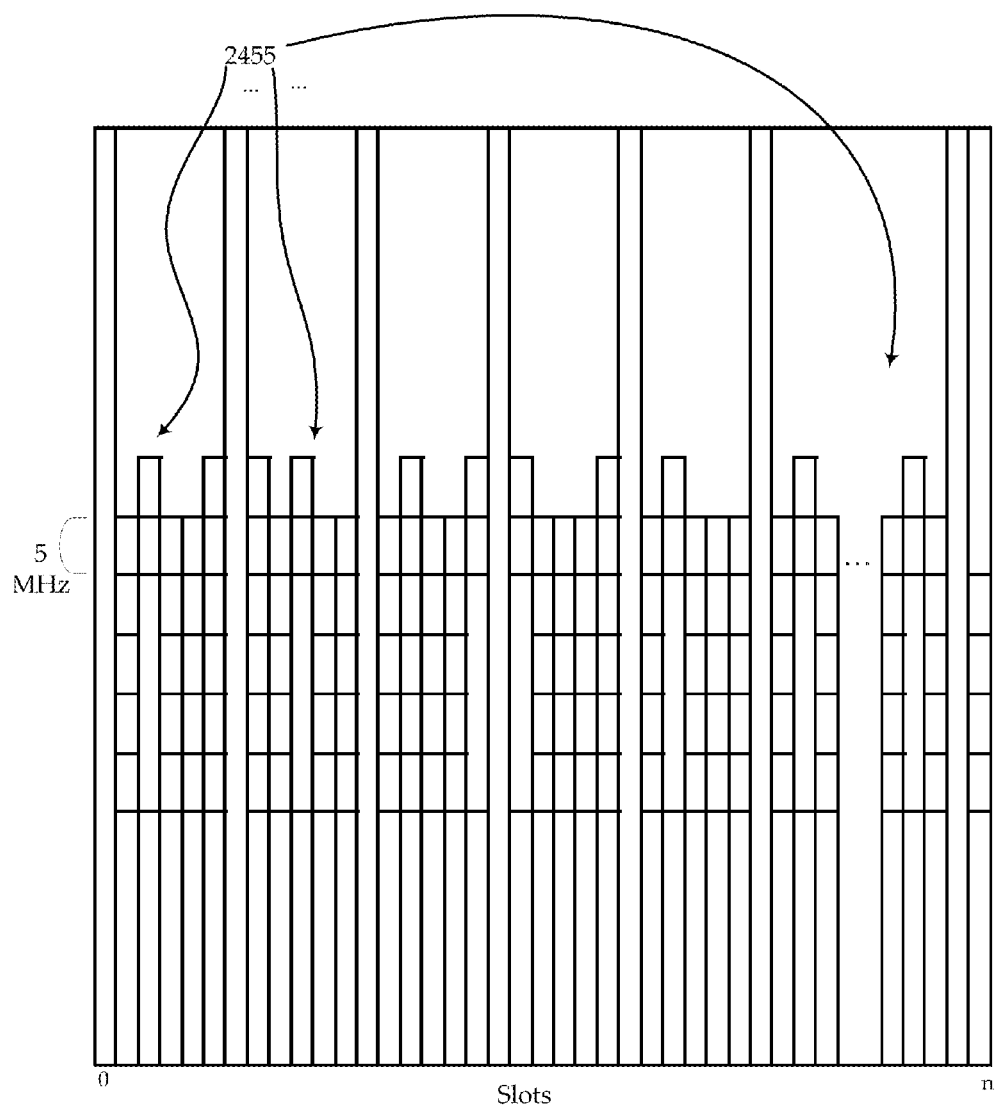

After the apportionment of the second widest carrier group for the epoch has been placed in time slots (e.g., as shown in FIG. 24B), the placement of the next widest carrier group apportionment may be initiated. Referring next to FIG. 24C, the example for such a slot placement over an epoch with n time slots is illustrated with an example placement map 2450 for the frequency channel. As shown, the slots of the 5 MHz carrier group 2455 are spread relatively evenly across the unused spaces at the bottom of the placement map (e.g., on top of 20 MHz placements 2430). In other embodiments, such placement may be at the top of the placement map, or a combination of the top and bottom. Alternatively, if the 20 MHz carrier group 2430 had been placed at the top of the channel, the placement of the 5 MHz carrier group apportionment 2455 may be at the bottom of the 20 MHz carrier group placements 2430.

In one embodiment, the spreading algorithm identifying a single jump length (across time slots) between each placement is continued from the last placement of the 20 MHz carrier group. As noted, by identifying the right jump length, all of the time slots may be visited in distributed fashion. Once the jump begins to land 80 MHz placements 2405 (or land on time slots wherein the frequency channel is completely filled with previous placements), those time slots may be skipped over until landing on an unused space, and the placement process may continue.

Figure 24D:
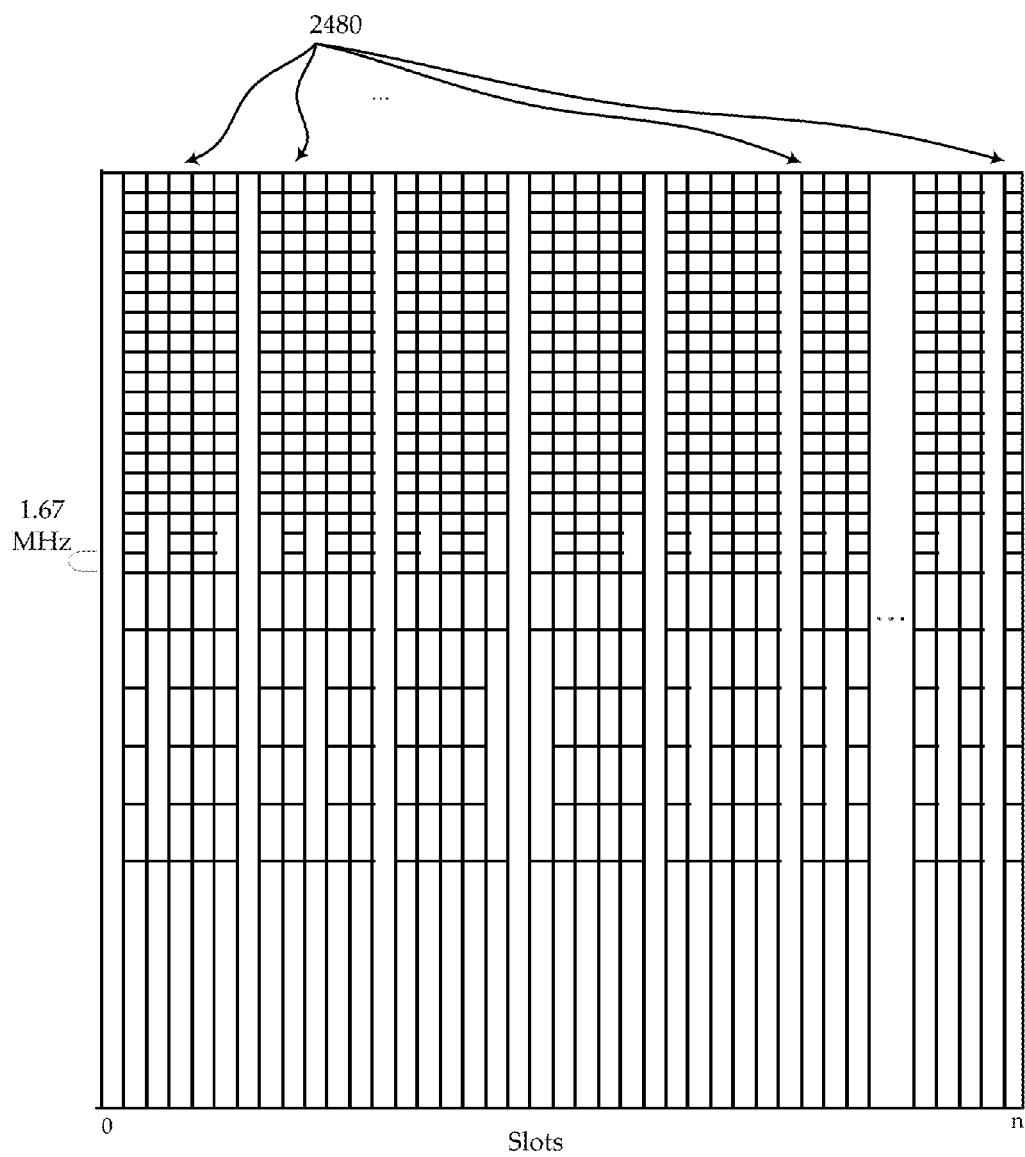

After the apportionment of the third widest carrier group for the epoch has been placed in time slots (e.g., as shown in FIG. 24C), the placement of the final carrier group apportionment may be initiated. Referring next to FIG. 24D, the example for such a slot placement over an epoch with n time slots is illustrated with an example placement map 2475 for the frequency channel. As shown, the slots of the 1.67 MHz carrier group 2480 are placed in the unused spaces of the placement map (e.g., on top of 5 MHz placements). In some embodiments, such placement may be from the top of the placement map.

In one embodiment, the spreading algorithm identifying a single jump length (across time slots) between each placement is continued from the last placement of the 5 MHz carrier group 2455. As noted, by identifying the right jump length, all of the time slots may be visited in distributed fashion. Once a jump begins to land 80 MHz placements 2405, or otherwise exceeds the maximum bandwidth for a timeslot, it may be skipped over until landing on an unused space, and the placement process may continue.

Figure 25:
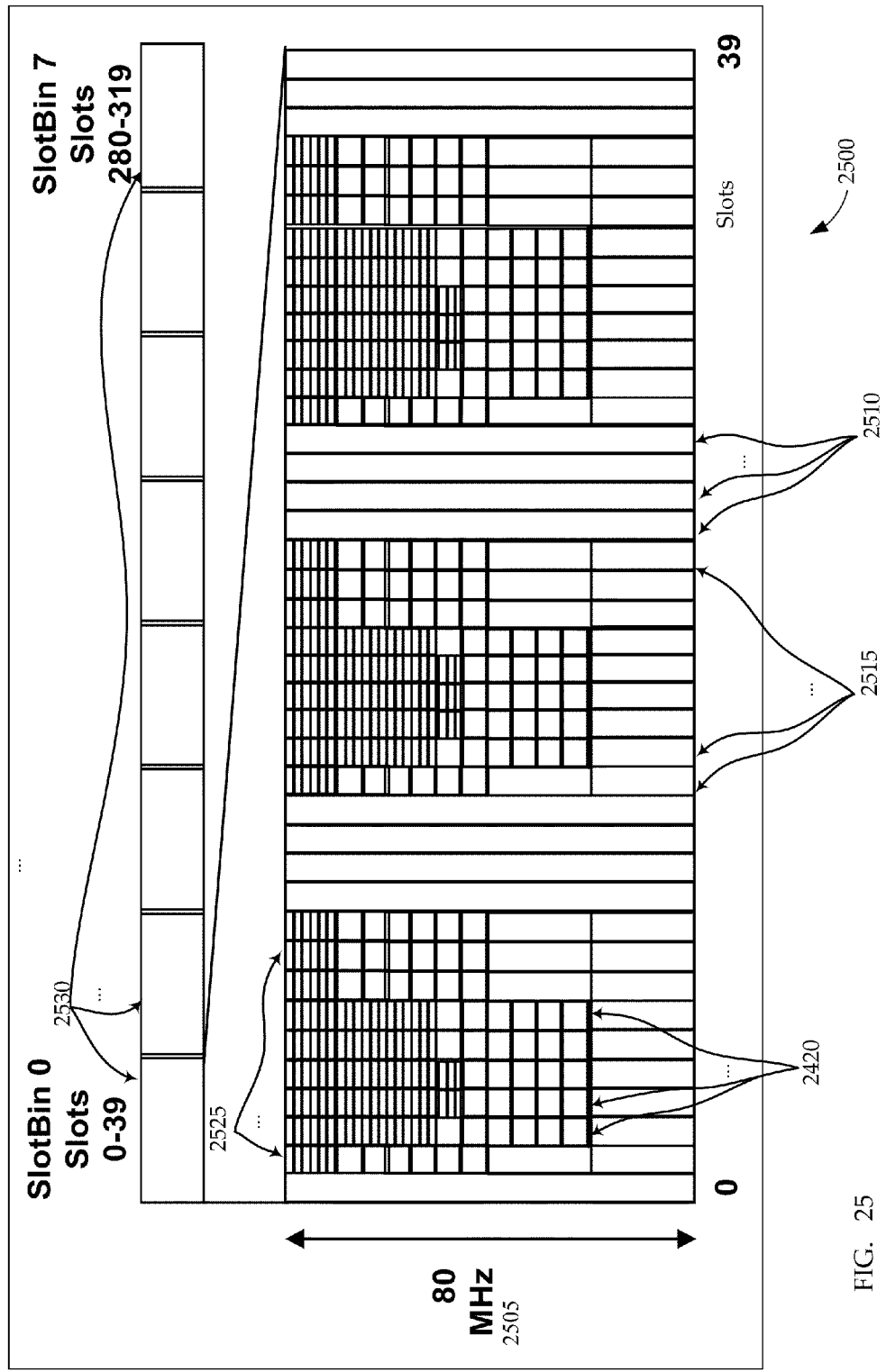
FIG. 25 is a block diagram of an alternative slot placement scheme according to various embodiments of the invention.

Those skilled in the art will recognize that different spreading algorithms may be used for different carrier groups, and the above is for purposes of example only. As noted, a number of different slot placement algorithms may be used. In other embodiments, there may be different epoch and time slot durations, and different numbers of time slots. For example, referring to FIG. 25, an alternative slot placement algorithm is shown using a slot placement map 2500 for an 80 MHz channel 2505. In this embodiment, there are eight slot bins 2530, which together make up an epoch. The placement map 2500 illustrates the layout for slots 0-39. As before, the progression from widest to narrowest carrier group may still be used, although in the illustrated embodiment the 80 MHz carrier group 2510 is spread in adjacent groups of four. A different spreading algorithm may be used for a remainder of carrier groups (20 MHz 2515, 5 MHz, 2520, and 1.25 MHz 2525), such as jump algorithm using jumps of m≈(320/e).

Figure 26:
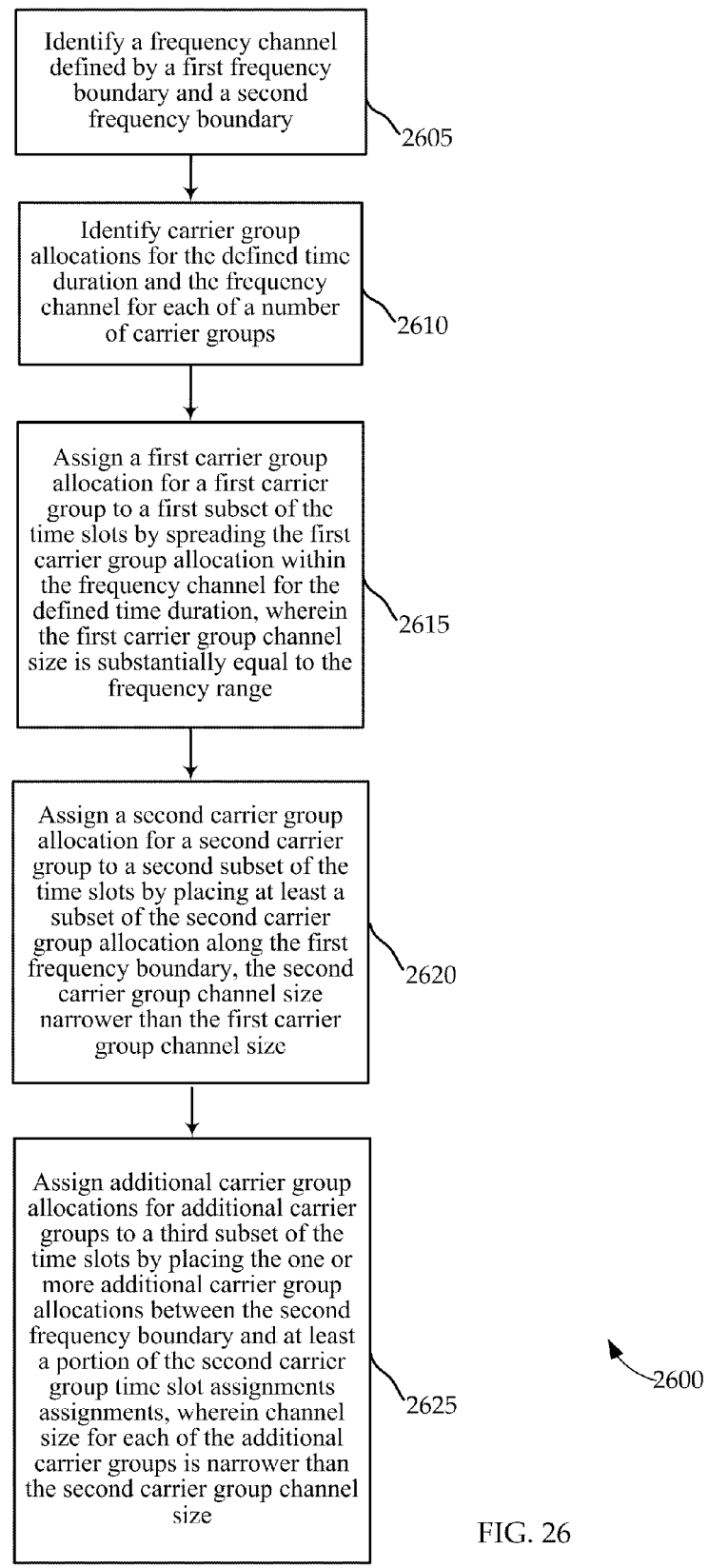
FIG. 26 is a flowchart of a method for performing slot placement for a carrier group allocation according to various embodiments of the invention.

FIG. 26 is a flowchart illustrating a method 2600 of assigning time slots within a frequency channel to carrier groups according to certain embodiments of the invention. The method 2600 may, for example, be performed by the terminal 130, NCC 140, or DBRA control unit 125 of FIG. 1, or any combination thereof. More specifically, the method 2600 may be performed by the configuration 2300 of FIG. 23.

At block 2605, the frequency channel defined by a first frequency boundary and a second frequency boundary is identified. At block 2610, carrier group allocations are identified for each of a number of carrier groups for the defined time duration and the frequency channel. At block 2615, a first carrier group allocation for a first carrier group is assigned to a first subset of the time slots. This is performed by spreading the first carrier group allocation within the frequency channel through the defined time duration. The first carrier group channel size is substantially equal to the frequency range.

At block 2620, a second carrier group allocation for a second carrier group is assigned to a second subset of the time slots by placing at least a subset of the second carrier group allocation along the first frequency boundary. The second carrier group channel size is narrower than the first carrier group channel size. At block 2625, additional carrier group allocations for additional carrier groups are assigned to a third subset of the time slots by placing the additional carrier group allocations substantially between the second frequency boundary and the second carrier group time slot assignments. The channel size for each of the one or more additional carrier groups is narrower than the second carrier group channel size.

Figure 27:
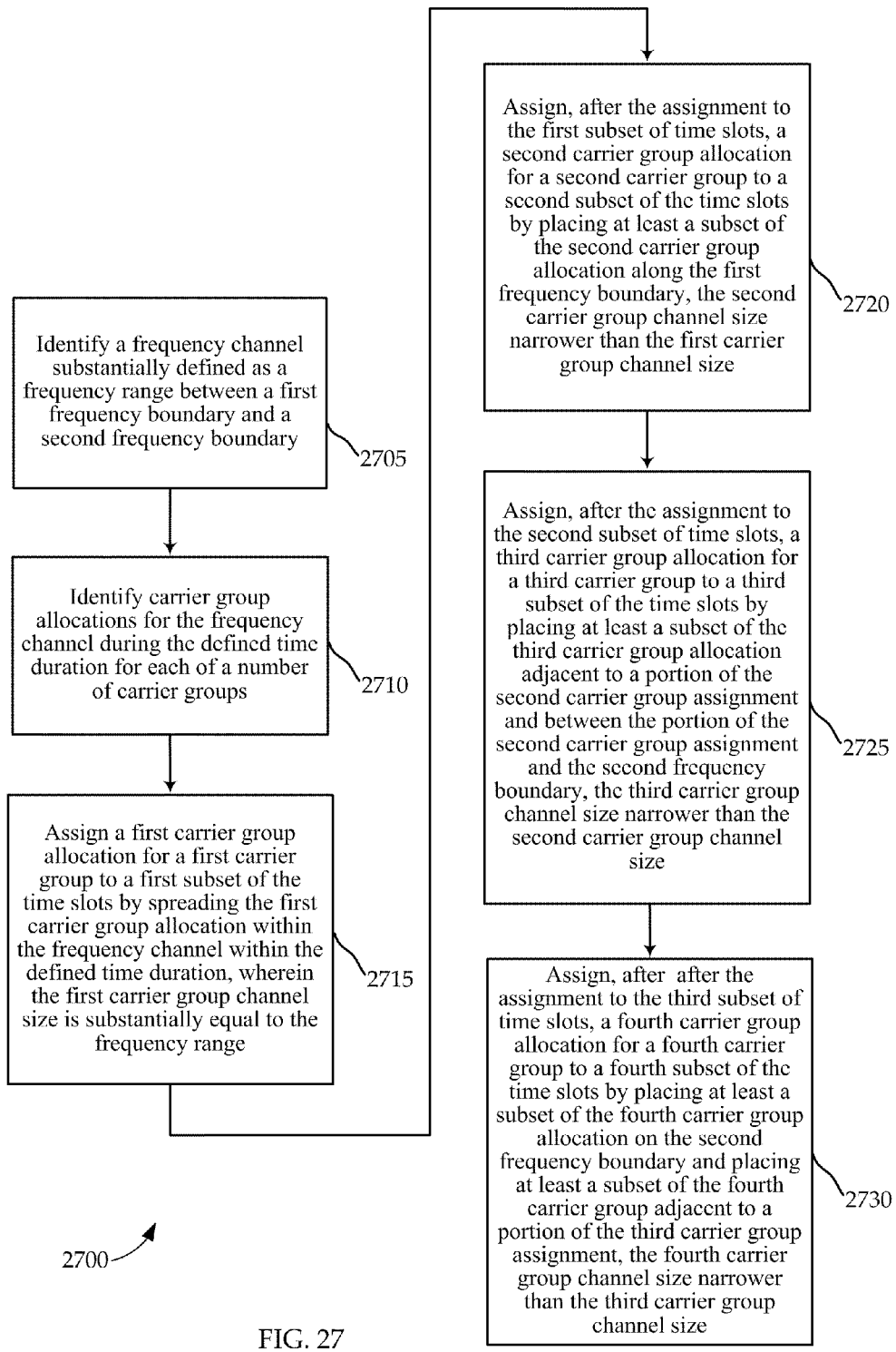
FIG. 27 is a flowchart illustrating a method of slot placement for a carrier group for a time duration according to various embodiments of the invention.

FIG. 27 is a flowchart illustrating a method 2700 of assigning time slots of a defined duration within a frequency channel according to certain embodiments of the invention. The method 2700 may, for example, be performed by the terminal 130, NCC 140, or DBRA control unit 125 of FIG. 1, or any combination thereof. More specifically, the method 2700 may be performed by the configuration 2300 of FIG. 23.

At block 2705, a frequency channel is identified, the frequency channel substantially defined as a frequency range between a first frequency boundary and a second frequency boundary. At block 2710, carrier group allocations for the frequency channel during the defined time duration are identified for each of a number of carrier groups. At block 2715, a first carrier group allocation for a first carrier group is assigned to a first subset of the time slots. The assignments are performed by spreading the first carrier group allocation within the frequency channel and the defined time duration. The first carrier group channel size is substantially equal to the frequency range.

At block 2720, a second carrier group allocation for a second carrier group is assigned to a second subset of the time slots after the assignment to the first subset of time slots. This is performed by placing at least a subset of the second carrier group allocation along the first frequency boundary. The second carrier group channel size is narrower than the first carrier group channel size. At block 2725, a third carrier group allocation for a third carrier group is assigned to a third subset of the time slots after the assignment to the second subset of time slots. This is performed by placing at least a subset of the third carrier group allocation adjacent to a portion of the second carrier group assignment and between the portion of the second carrier group assignment and the second frequency boundary. The third carrier group channel size is narrower than the second carrier group channel size. At block 2730, a fourth carrier group allocation for a fourth carrier group is assigned to a fourth subset of the time slots after the assignment to the third subset of time slots. This is performed by placing at least a subset of the fourth carrier group allocation adjacent to the second frequency boundary and adjacent to a portion of the third carrier group assignment. The third carrier group channel size narrower than the second carrier group channel size.

Figure 28:
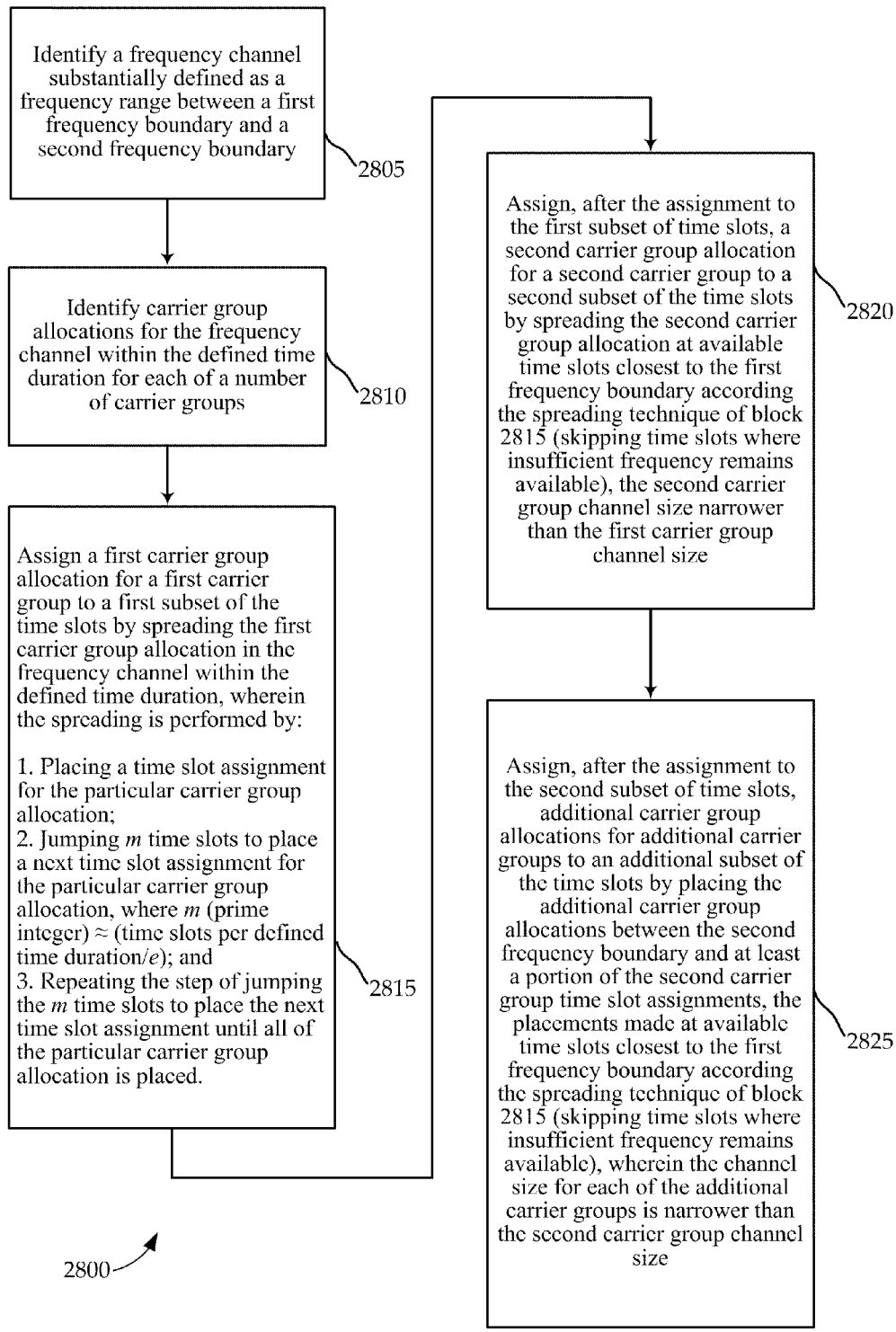
FIG. 28 is a flowchart illustrating an alternative method for performing slot placement for a carrier group allocation for a defined time duration according to various embodiments of the invention.

FIG. 28 is a flowchart illustrating an alternative method 2800 of assigning time slots of a defined duration within a frequency channel according to certain embodiments of the invention. The method 2800 may, for example, be performed by the terminal 130, NCC 140, or DBRA control unit 125 of FIG. 1, or any combination thereof. More specifically, the method 2800 may be performed by the configuration 2300 of FIG. 23.

At block 2805, a frequency channel is identified, the frequency channel substantially defined as a frequency range between a first frequency boundary and a second frequency boundary. At block 2810, carrier group allocations for the frequency channel within the defined time duration are identified for each of a number of carrier groups.

At block 2815, a first carrier group allocation for a first carrier group is assigned to a first subset of the time slots by spreading the first carrier group allocation in the frequency channel within the defined time duration. The spreading is performed by:

1. Placing a time slot assignment for the particular carrier group allocation;
2. Jumping m time slots to place a next time slot assignment for the particular carrier group allocation, where m (prime integer)≈(time slots per defined time duration/e); and
3. Repeating the step of jumping the m time slots to place the next time slot assignment until all of the particular carrier group allocation is placed.

At block 2820, a second carrier group allocation for a second carrier group is assigned to a second subset of the time slots after the assignment to the first subset of time slots. This is performed by spreading the second carrier group allocation at available time slots closest to the first frequency boundary according to the spreading technique of block 2815 (skipping time slots where insufficient frequency remains available). The second carrier group channel size is narrower than the first carrier group channel size. At block 2825, additional carrier group allocations for additional carrier groups are assigned to an additional subset of the time slots after the assignment to the second subset of time slots. This is performed by placing the one or more additional carrier group allocations between the second frequency boundary and at least a portion of the second carrier group time slot assignments, the placements made at available time slots closest to the first frequency boundary according to the spreading technique of block 2815 (skipping time slots where insufficient frequency remains available). The channel size for each of the additional carrier groups is narrower than the second carrier group channel size.

Terminal Assignment: Regardless of how the slot placement occurs, the result may be that particular carrier group slots are associated with a time slot and frequency range. These carrier group slots may then be assigned to particular terminals, specific classes on the terminals, particular traffic request categories (MinSR, CIR, and RIR), etc. There are a number of different ways in which terminals may be assigned to particular carrier group placements. In some embodiments, the terminal assignment may take place concurrently, before, or after the slot placement (e.g., before, in parallel, or after the specific time slot during the epoch and the specific frequency for the carrier group allocation is associated with a terminal).

Figure 29:
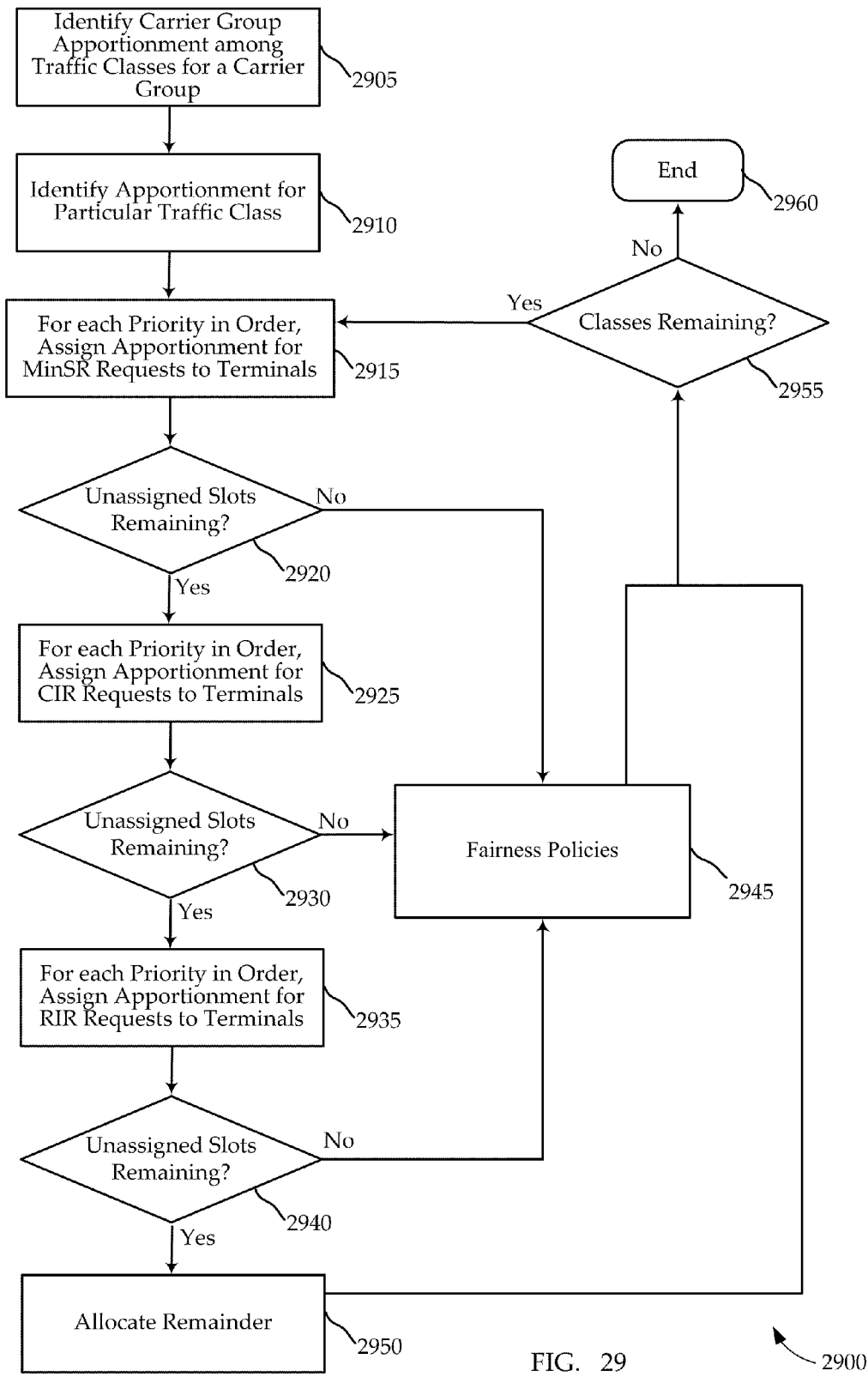
FIG. 29 is a flowchart illustrating a method of assigning a set of slots to particular terminals according to various embodiments of the invention.

FIG. 29 is a flowchart illustrating a method 2900 of assigning, for an epoch, a set of slots for a carrier group to particular terminals. In the illustrated embodiment, the number of carrier group slots (e.g., the number of 80 MHz slots, or 20 MHz slots, or x MHz slots, as applicable to a terminal or set of terminals) assigned to each class for each particular terminal is computed. This terminal assignment may be performed before, or after, the slot placement algorithm discussed above, according to various embodiments. At block 2905, the apportionment of a carrier group among classes for an epoch is identified (e.g., for a given beam). The apportionment may be the apportionment of a given carrier group among classes set forth in FIG. 22. For each class, the following assignment may occur each epoch. At block 2910, the apportionment to be assigned for a particular traffic class (or subset of classes, or set of all classes) is identified. At block 2915, the carrier group slots are assigned to particular terminals (e.g., for an epoch) based on the MinSR requests (e.g., from one or more of the tables 400, 500, 550 set forth in FIG. 4, 5A, or 5B) for the particular traffic class at each relevant terminal. In this embodiment, the relevant terminals may be a set or subset of terminals transmitting a particular carrier size (e.g., 80 MHz, 20 MHz, 5 MHz, or 1.67 MHz) within a given beam or set of beams. In one embodiment, assume that each such terminal has a priority designation of 1, 2, or 3 (1 being the highest priority). The requested MinSR for the class at each priority 1 terminal may be used to assign slots to respective terminals. If unassigned slots remain for the class in the carrier group, the requested MinSR bandwidth for the class at each priority 2 terminal may be used to assign slots to respective terminals. If unassigned slots remain for the class in the carrier group, requested MinSR bandwidth for each class at each priority 3 terminal may be used to assign slots to respective terminals. If, as indicated at block 2920, a determination is made during any of these allocations that insufficient slots remain for the class in the carrier group at that priority level, the MinSR requests for that priority level may be managed according to fairness policies 2945 (e.g., Proportional, Weighted Proportional, Fair Share, or Weighted Fair Share, which will be discussed in more detail below).

If unassigned slots remain for the class in the carrier group, at block 2925, the carrier group slots are assigned to terminals for an epoch based on the CIR requests (e.g., from one or more of the tables 400, 500, 550 set forth in FIG. 4, 5A, or 5B) for the particular traffic class at each relevant terminal. A CIR request may be the CIR request less the previously allocated MinSR. This CIR request value may equal min(CIR, RIR). The requested CIR for the class at each priority 1 terminal may be used to assign slots to respective terminals. If unassigned slots remain for the class in the carrier group, the requested CIR bandwidth for the class at each priority 2 terminal may be used to assign slots to respective terminals. If unassigned slots remain for the class in the carrier group, requested CIR bandwidth for each class at each priority 3 terminal may be used to assign slots to respective terminals. If, as indicated at block 2930, a determination is made during any of these allocations that insufficient slots remain for the class in the carrier group at that priority level, the CIR requests for that priority level may be managed according to fairness policies 2945.

If unassigned slots remain for the class in the carrier group after the CIR requests are processed, at block 2935, the carrier group slots are assigned to terminals for an epoch based on the RIR requests (e.g., from one or more of the tables 400, 500, 550 set forth in FIG. 4, 5A, or 5B) for the particular traffic class at each relevant terminal. An RIR request may be the RIR request less the previously allocated RIR. The requested RIR for the class at each priority 1 terminal may be used to assign slots to respective terminals. If unassigned slots remain for the class in the carrier group, the requested RIR bandwidth for the class at each priority 2 terminal may be used to assign slots to respective terminals. If unassigned slots remain for the class in the carrier group, requested RIR bandwidth for each class at each priority 3 terminal may be used to assign slots to respective terminals. If, as indicated at block 2940, a determination is made during any of these allocations that insufficient slots remain for the class in the carrier group at that priority level, the RIR for that priority level may be apportioned according to fairness policies 2945. However, if it is determined that unassigned slots remain for the class in the carrier group at block 2940, the remaining slots may be assigned across terminals at block 2950 (e.g., on a round robin basis). Once an identified carrier group apportionment for a given class has been assigned to terminals, a determination may be made whether there is another class apportionment to be assigned to terminals at block 2955 (e.g., if the apportionment for traffic class 1 has been assigned to terminals, the apportionment for traffic class 2 may be initiated). If so, the method 2900 may resume from block 2910 for the new class; if not, the process may be terminated 2960 for the selected carrier group during the epoch. This method may be repeated (serially or in parallel) for other carrier groups within the beam or set of beams.

The following pseudocode represents examples of the terminal assignment described above:

```
A[term*, class*] = 0
For each class do
    -- Allocate MinSR
    For each priority level p from high to low
        if (Sum(MinSR[term, class], for all terminals of priority p in CG) >= S then
            -- Insufficient resources to meet MinSR, use policy to allocate
            A[term*, class] = DBRAShare(S, MinSR[term*, class], PolicyCIRTerminal)
            done
        else
            -- Allocate MinSR
            A[term*, class] += MinSR[term, class] for each terminal
            S = S - allocations made in previous step
```

```
    endif
  endfor
-- Allocate GIR (request below CIR)
For L = 0 to numCIRLevels
  For each priority level p from high to low
    GIR[term, class, L] = max(min(RIR[term, class], CIR[term, class, L], 0) −
            CIR[term, class, L−1], 0)
    -- CIR[term, class, −1]= minSR[term, class]
    if Sum(GIR[term, class, L], all terminals at priority p) >= S then
      -- Insufficient resources to meet GIR, use policy to allocate
      A[term*, class] += DBRAShare(S, GIR[term*, class, L],
      PolicyCIRTerminall)
      done
    else
      -- Allocate GIR
      A[term, class] += GIR[term, class, L] for each terminal
      S = S − allocations made in previous step
    endif
  Endfor
Endfor
-- Allocate EIR (request above CIR)
EIR[term, class] = max(RIR[term, class] − CIR[term, class, maxLevel − 1], 0)
if Sum(EIR[term, class], all terminals) >= S then
  -- Insufficient resources to meet EIR, use policy to allocate
  A[term*, class] += DBRAShare(S, EIR[term*, class], PolicyEIRTerminall)
  done
else
  -- Allocate EIR
  A[term, class] += EIR[term, class] for each terminal
  S = S − allocations made in previous step
endif
Endfor
A[term] = Sum(A[term, class], all classes)
```

Terminal Mode Assignment: There are a number of different factors that may dictate the mode in which a terminal 130 operates in the system 100 of FIG. 1. The mode, in some embodiments, is a particular combination of a modulation scheme and carrier group selected for use at a terminal. The mode may, for example, be determined by the terminal 130 itself, the NCC 140, or the DBRA control unit 125 of FIG. 1, or any combination thereof. The mode for a terminal 130 may be assigned dynamically in response to bandwidth requests of a terminal (e.g., the bandwidth requests 205 of FIG. 2) and power to noise ratio (Pr/No) (or other signal quality factors).

A mode for a terminal may be assigned before the carrier group apportionment, class pool sizing, terminal assignment, and slot placement described above, or may occur in some embodiments at a time within these processes. A mode may be selected for n epochs, or x*n epochs, or may be selected to be of shorter duration to vary more dynamically with changes to the Pr/No. While a "mode" may be defined by the carrier group and modulation scheme being used, in other embodiments the mode may also be defined by the coding rate, spreading factor, or other attributes, as well.

Thus, referring briefly back to FIG. 1, a terminal 130 may identify a terminal signal quality metric associated with a communications link between the terminal 130 and the satellite 105 (e.g., this may be measured by or otherwise received at the terminal 130). The terminal 130 may then identify a minimum mode signal quality metric for each of the modes supported at a terminal 130 (e.g., accessed from local memory or otherwise received). Modes may be eliminated from consideration when their minimum mode signal quality metric is greater than the terminal signal quality metric less a margin. The terminal 130 may select the mode it will use (e.g., for a defined time duration) from remaining modes according to a selection criteria. The selection criteria may specify that the mode to be selected for the terminal 130 is the mode with a minimum mode signal quality metric less than and closest to the identified terminal signal quality metric plus the margin. One or more of these steps may, alternatively, be performed by the NCC 140 or the DBRA control unit 125 of FIG. 1.

Figure 30:
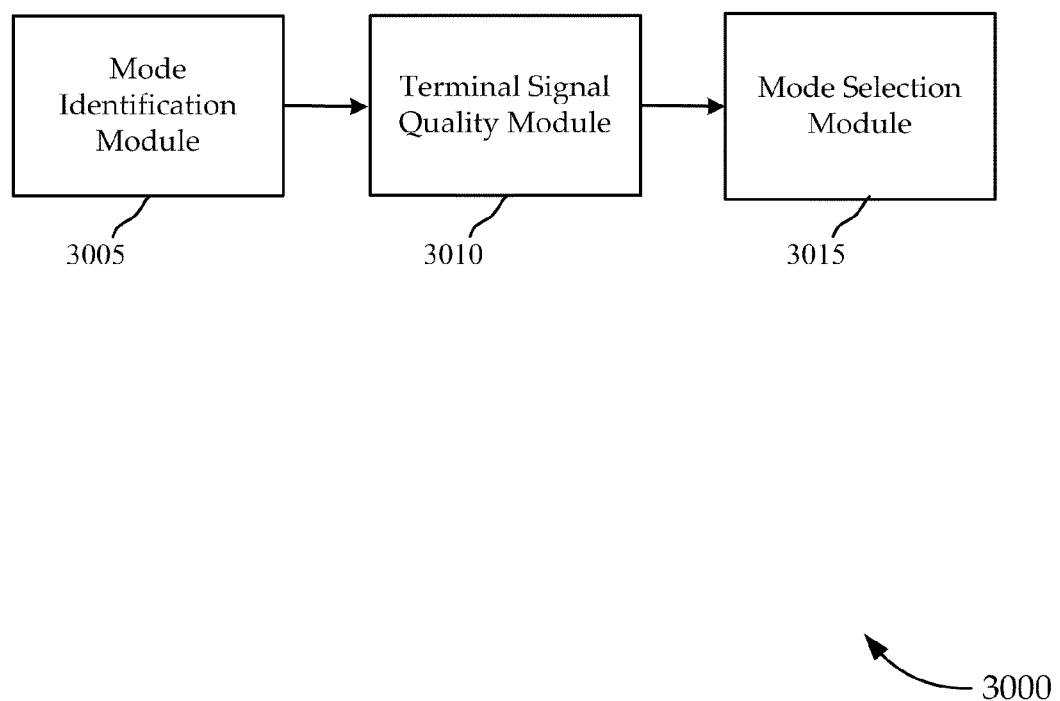
FIG. 30 is a block diagram of a configuration that may be used in a device or system to perform mode selection for a terminal according to various embodiments of the invention.

Turning to FIG. 30, a block diagram is shown illustrating an example configuration 3000 for selecting a mode to be used by a terminal in a satellite communications network. This configuration 3000 may be implemented by the system 100 of FIG. 1 or, more specifically, in the terminal 130, NCC 140, or DBRA control unit 125 of FIG. 1, or any combination thereof. However, some or all of the functionality of these modules may be implemented in other devices or sets of devices.

The configuration 3000 includes a mode identification module 3005, a terminal signal quality module 3010, and a mode selection module 3015, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The mode identification module 3005 may identify a set of modes that are supported by the terminal, each mode made up of a different combination of one of a plurality of modulation schemes supported at the terminal and one of a plurality of carrier groups supported at the terminal. The mode identification module 3005 may then identify a minimum mode signal quality metric for each of at least some modes of the set. To identify this information, a mode table may be generated for the terminal.

Turning to FIG. 31, an example of a mode table 3100 illustrating a variety of mode options is shown. This may be a mode table used for the uplink and/or downlink, and may be stored in the mode identification module 3005. This table 3100 may be used to determine the uplink mode or downlink mode to be used for terminals 130 in the system 100 of FIG. 1. Each of the four columns 3105 represents a different carrier group, and these may be the carrier groups discussed previously herein. From left to right, there is a 1.67 MHz carrier group 3105-*a*, a 5 MHz carrier group 3105-*b*, a 20 MHz carrier group 3105-*c*, and an 80 MHz carrier group 3105-*d*. There are also 4 rows 3110 of different modulation schemes: BPSK 3110-*a*, QPSK 3110-*b,* 8-PSK 3110-*c*, and 16 QAM 3110-*d*. In the illustrated embodiment, the mode is defined by the particular carrier group in combination with a particular modulation scheme. It is worth noting that, in other embodiments, there may be more or fewer carrier groups, modulation schemes, channel sizes, modes, etc.

For each mode, the mode table 3100 lists information relating to whether a mode should be used for a terminal (e.g., terminal 130 of FIG. 1). The information for each mode may include the required Pr/No (or other minimum mode signal quality metric), Mbps/Channel, Mbps/80 MHz, Minimum Allocation. Other requirements related to an ability to close the loop may be listed as well (e.g., other signal quality metrics), as may other power efficiency and bandwidth efficiency metrics. As noted, the mode table 3100 may be used to characterize a mode and thereby determine the appropriate mode to be used for a terminal 130. The mode table 3100 may be stored at a terminal 130, the NCC 140 or DBRA control unit 125 of FIG. 1, or any combination thereof, and accessed to determine the proper mode for terminal assignment.

Returning to FIG. 30, the terminal signal quality module 3010 may be configured to identify a terminal signal quality metric associated with a communications link between the terminal and the satellite. Thus, there may be a measurement of a Pr/No for a link from the terminal 130 to the satellite 105 of FIG. 1. While Pr/No is used in this example, other signal quality measurements may be used, as well. A Pr/No measurement may be made at the satellite 105 or terminal 130 (e.g., by the terminal signal quality module 3010). The measurement may either be stored or transmitted to a remote terminal signal quality module 3010 at the terminal 130 or NCC 140 for use during mode assignment. In still other embodiments, a Pr/No estimate may be used (e.g., an estimate based on historic Pr/No, average Pr/No, or Pr/No at nearby terminals). Thus, an NCC may estimate the terminal signal quality metric based on signal quality measurements associated with other terminals. In some embodiments, only a subset of the modes will be supported at certain terminals. Therefore, for a given terminal, only the supported modes will be considered in some embodiments. Based on the signal quality at the terminal, the available modes for a given terminal 130 may be pared down further, as discussed below.

The terminal signal quality module 3010 may further be configured to set a margin. The margin may be set in an amount which depends on whether the terminal is a fixed terminal or a mobile terminal. The terminal signal quality metric may be combined with the margin to calculate the baseline signal quality metric for the terminal. There may also be a variety of different margins used for particular terminals (e.g., terminals with improved functionality or better power control capabilities may have lower margins).

The mode selection module 3015 may then be configured select the mode for the terminal according to a selection criteria. The mode may be selected for the terminal for a defined time duration, perhaps based on an amount resource requested for the defined time duration. Thus, the modes where the minimum mode signal quality metric is greater than the terminal's baseline signal quality metric may be eliminated.

In determining the appropriate mode, there may be terminal or system preferences for bandwidth- or power-efficient modes. The set of modes supported at the terminal may be divided into a first subset of modes designated power-efficient modes and a second subset of modes designated bandwidth-efficient modes. The non-preferred subset may be eliminated after receiving a preference for power-efficient modes or bandwidth-efficient modes. This elimination may be performed before the selection criteria is applied.

As will be discussed in more detail, there may be a variety of selection criteria used selecting the mode for the terminal from remaining modes. The mode selection module 3015 may select the mode for the terminal with minimum mode signal quality metric less than and closest to the baseline signal quality metric for the terminal.

In other embodiments, different selection criteria may be used. In some embodiments, for example, modes of higher modulation order in the same carrier group may be favored because of their greater bandwidth efficiency. Thus, when a number of modes from a same carrier group are the remaining modes, all modes with lower order modulation schemes than a mode with a highest order modulation scheme for a carrier group may be eliminated. Also, when a number of modes from a same carrier group are the remaining modes, the mode selected for the terminal may be the mode of the carrier group with a highest order modulation scheme of the remaining modes from the same carrier group.

In another example, when modes with different modulation schemes from different carrier groups make up the remaining modes, all modes of the remaining modes with lower order modulation schemes than the one or more modes with a highest order modulation scheme of the remaining modes may be eliminated. Also, when modes with different modulation schemes from different carrier groups make up the remaining modes, the mode selected for the terminal may be the mode with a highest order modulation scheme of the remaining modes from the different carrier groups.

In some embodiments, a mode for the terminal is selected responsive to an amount of a resource request from the terminal. For example, a mode may be selected whose Mbps/Channel is closest to the RIR request (e.g., for all traffic classes on the terminal over the epoch, or for particular classes, for the allocation period). However, as the load for a beam increases, and there may not be sufficient bandwidth to serve all the requests from the terminals of a beam, a mode may be selected wherein the Mbps/Channel is closest to the CIR request (e.g., for all classes on the terminal over the epoch, or for particular classes).

Thus, the terminal mode may be determined based on a combination of the following factors: a supported mode list for a terminal, a system or terminal mode preference, terminal priority, the measured or estimated Pr/No, the MinSR, CIR, and RIR from a request of the terminal, the load and bandwidth availability, terminal power control, or other terminal attributes (e.g., fixed v. mobile). Once a mode is selected for a terminal by the mode selection module 3015, the selection may be transmitted from the mode selection module 3015 (wherever located) to the terminal 130, NCC 140, or satellite 105 of FIG. 1, and may also be stored locally.

Figure 32:
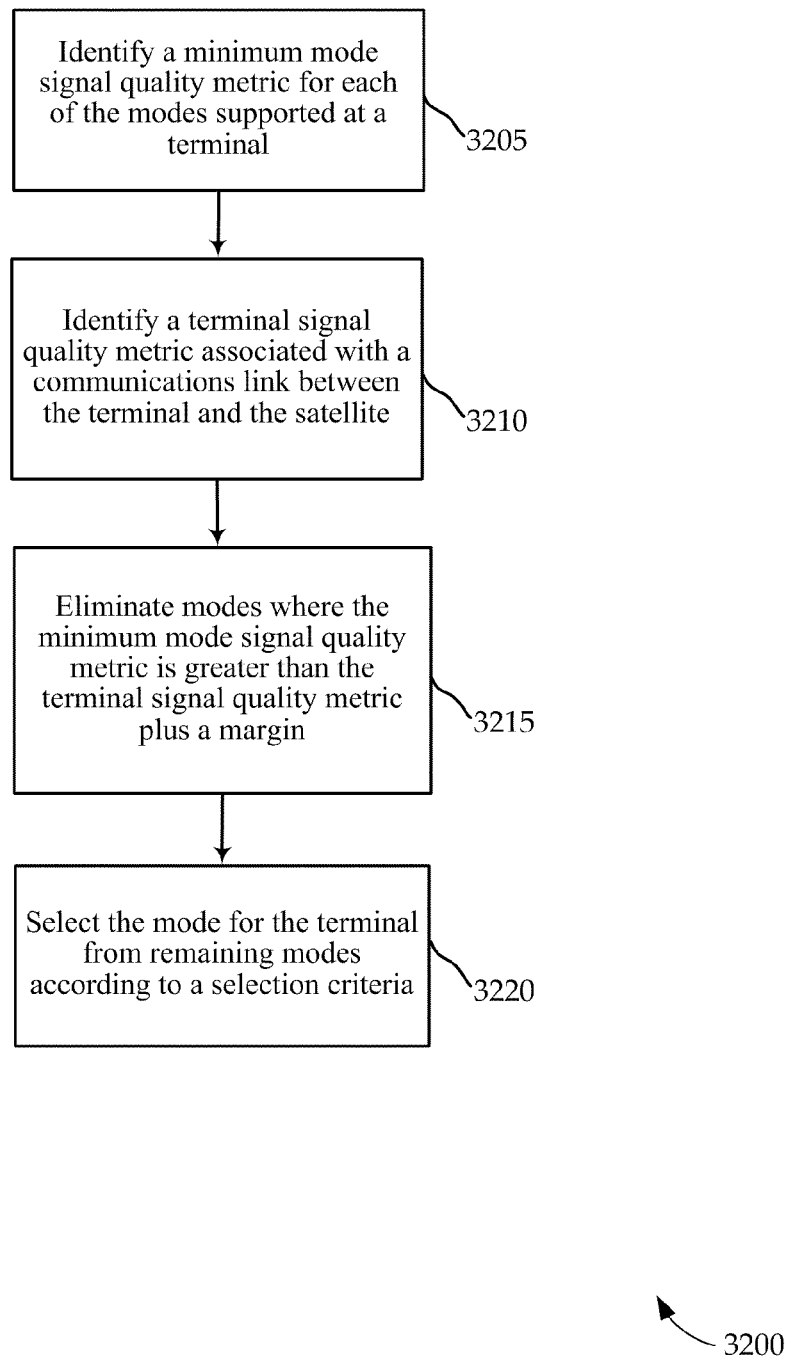
FIG. 32 is a flowchart illustrating a method of selecting a mode for a terminal in a satellite communications network according to various embodiments of the invention.

FIG. 32 is a flowchart illustrating a method 3200 of selecting a mode for a terminal in a satellite communications network. The method 3200 may, for example, be performed by the terminal 130, NCC 140, or DBRA control unit 125 of FIG. 1, or any combination thereof. More specifically, the method 3200 may be performed by the configuration 3000 of FIG. 30.

At block 3205, a minimum mode signal quality metric is identified for each of the modes supported at a terminal. At block 3210, a terminal signal quality metric associated with a communications link between the terminal and the satellite is identified. At block 3215, modes are eliminated when the minimum mode signal quality metric is greater than the terminal signal quality metric less a margin. At block 3220, the mode for the terminal is selected from remaining modes according to a selection criteria.

Figure 33:
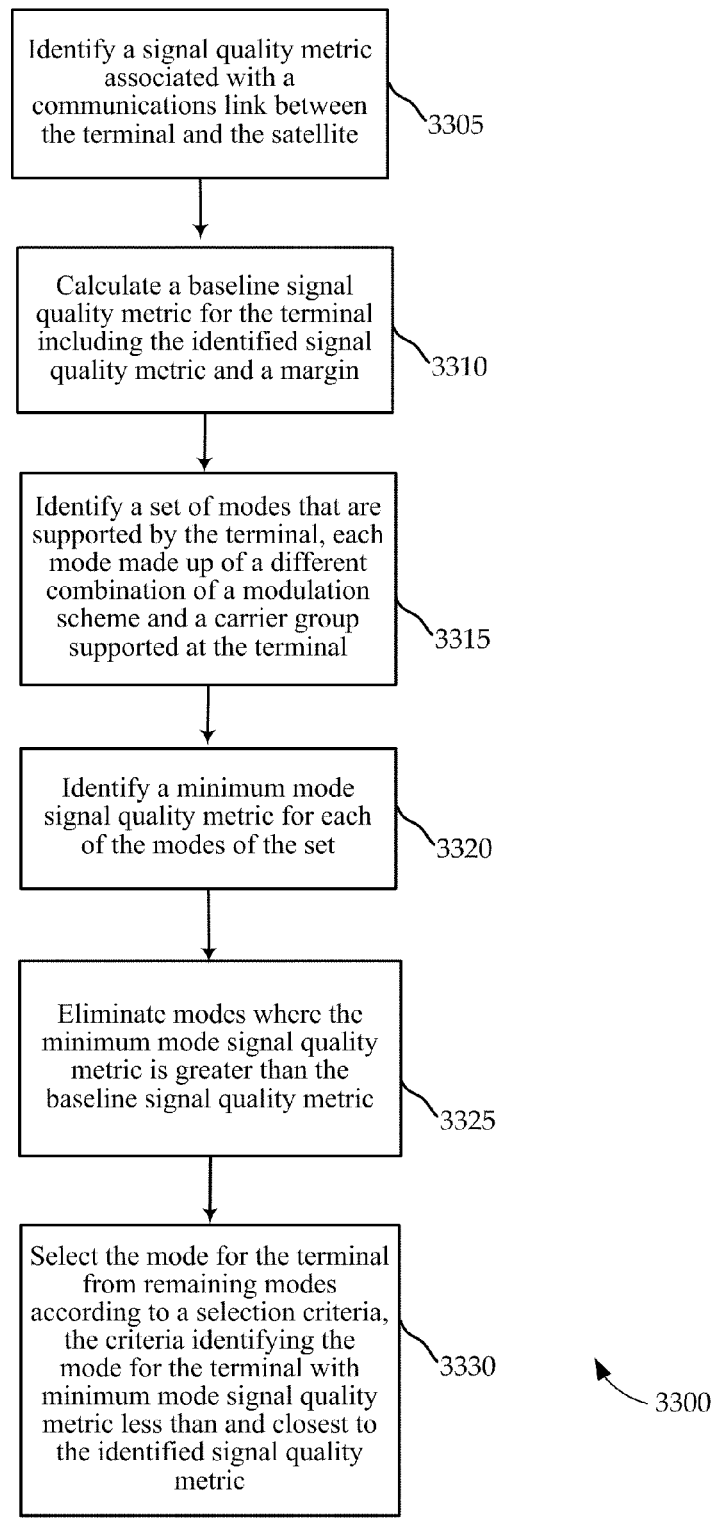
FIG. 33 is a flowchart illustrating an alternative method of selecting a mode for a terminal in a satellite communications network according to various embodiments of the invention.

FIG. 33 is a flowchart illustrating an alternative method 3300 of selecting a mode for a terminal in a satellite communications network. The method 3300 may, for example, be performed by the terminal 130, NCC 140, or DBRA control unit 125 of FIG. 1, or any combination thereof. More specifically, the method 3300 may be performed by the configuration 3000 of FIG. 30.

At block 3305, a signal quality metric associated with a communications link between the terminal and the satellite is identified. At block 3310, a baseline signal quality metric for the terminal is calculated made up of the identified signal quality metric less a margin. At block 3315, a set of modes that is supported by the terminal is identified, each mode including a different combination of a modulation scheme and a carrier group supported at the terminal. At block 3320, a minimum mode signal quality metric is identified for each of the modes of the set. At block 3325, modes where the minimum mode signal quality metric is greater than the baseline signal quality metric are eliminated. At block 3330, the mode for the terminal is selected from the remaining modes according to a selection criteria, the criteria identifying the mode for the terminal with the minimum mode signal quality metric less than and closest to the identified signal quality metric.

Figure 34:
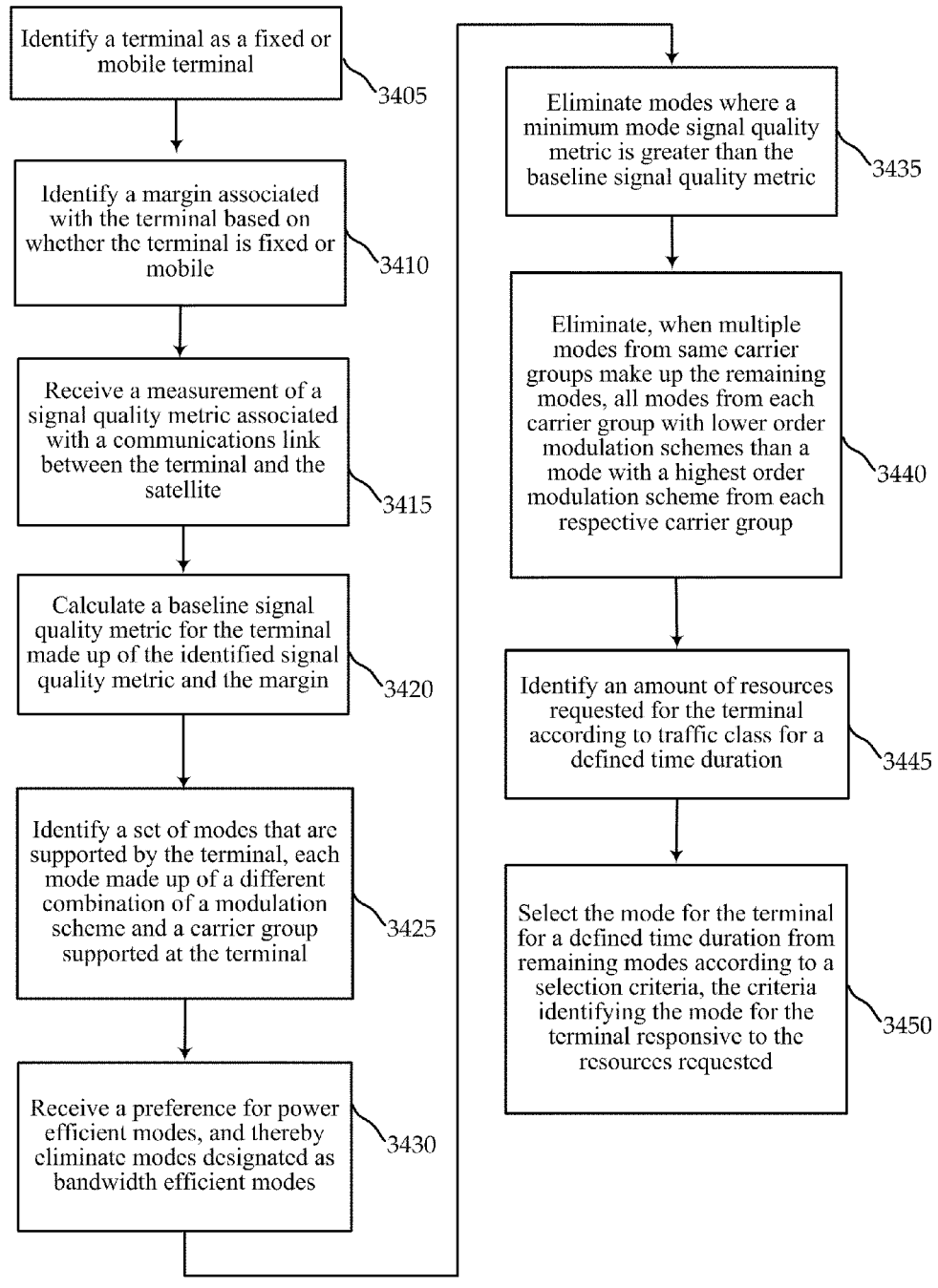
FIG. 34 is a flowchart illustrating a method of using selection criteria for selecting a mode for a terminal in a satellite communications network according to various embodiments of the invention.

FIG. 34 is a flowchart illustrating a method 3400 using selection criteria for selecting a mode for a terminal in a satellite communications network. The method 3400 may, for example, be performed by the terminal 130, NCC 140, or DBRA control unit 125 of FIG. 1, or any combination thereof. More specifically, the method 3400 may be performed by the configuration 3000 of FIG. 30.

At block 3405, a terminal is identified as a fixed or mobile terminal. At block 3410, a margin associated with the terminal is identified based on whether the terminal is fixed or mobile. At block 3415, a measurement of a signal quality metric associated with a communications link between the terminal and the satellite is received. At block 3420, a baseline signal quality metric is calculated for the terminal made up of the identified signal quality metric and the margin.

At block 3425, a set of modes that is supported by the terminal is identified, each mode made up of a different combination of a modulation scheme and a carrier group supported at the terminal. At block 3430, a preference for power efficient modes is received, and thereby modes designated as bandwidth efficient modes are eliminated. At block 3435, modes where a minimum mode signal quality metric is greater than the baseline signal quality metric are eliminated.

At block 3440, when multiple modes from the same carrier groups make up the remaining modes, all modes from each carrier group with lower order modulation schemes than a mode with a highest order modulation scheme from each respective carrier group are eliminated. At block 3445, an amount of resources requested for the terminal according to the traffic class for a defined time duration is identified. At block 3450, the mode for the terminal for the defined time duration is selected from remaining modes according to a selection criteria, the criteria identifying the mode for the terminal responsive to the resources requested.

Figure 35A:
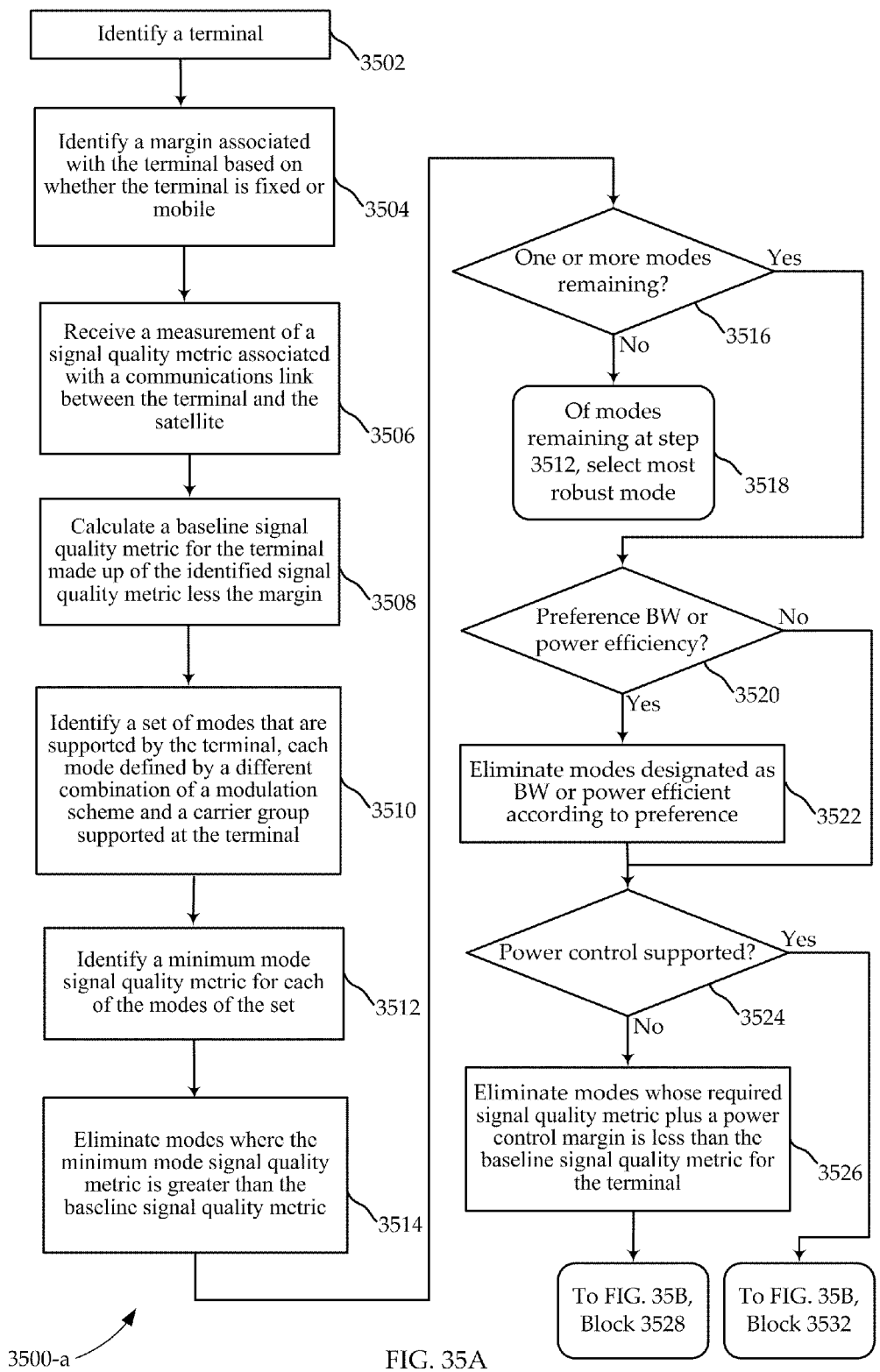
FIGS. 35A and 35B illustrate a flowchart of an alternative method for using selection criteria for selecting a mode for a terminal in a satellite communications network according to various embodiments of the invention.

FIG. 35 is a flowchart illustrating a method 3500 of selecting a mode for a terminal in a satellite communications network. The method 3500 may, for example, be performed by the terminal 130, NCC 140, or DBRA control unit 125 of FIG. 1, or any combination thereof. More specifically, the method 3500 may be performed by the configuration 3000 of FIG. 30.

At block 3502, a terminal is identified. At block 3504, a margin associated with the terminal is identified based on whether the terminal is fixed or mobile. At block 3506, a measurement of a signal quality metric associated with a communications link between the terminal and the satellite is received. At block 3508, a baseline signal quality metric is calculated for the terminal made up of the identified signal quality metric less the margin.

At block 3510, a set of modes that is supported by the terminal is identified, each mode including a different combination of a modulation scheme and a carrier group supported at the terminal. At block 3512, a minimum mode signal quality metric for each of the modes of the set is identified. At block 3514, modes where the minimum mode signal quality metric is greater than the baseline signal quality metric are eliminated. At block 3516, a determination is made whether one or more modes are remaining after block 3514. If not, at block 3518, the most robust mode of the modes remaining at step 3512 is selected as the mode for the terminal.

If one or more modes remain at block 3516, a determination is made at block 3520 whether there is a preference for BW or power-efficient modes. If the preference is BW or power efficiency, then at block 3522, modes designated as BW or power-efficient are eliminated/retained according to preference. At block 3524, a determination is made whether power control is supported. If power control is supported, the process jumps to block 3532 in FIG. 35B. If power control is not supported, at block 3526, modes whose minimum signal quality metric plus a power control margin is less than the baseline signal quality metric for the terminal are eliminated.

Figure 35B:
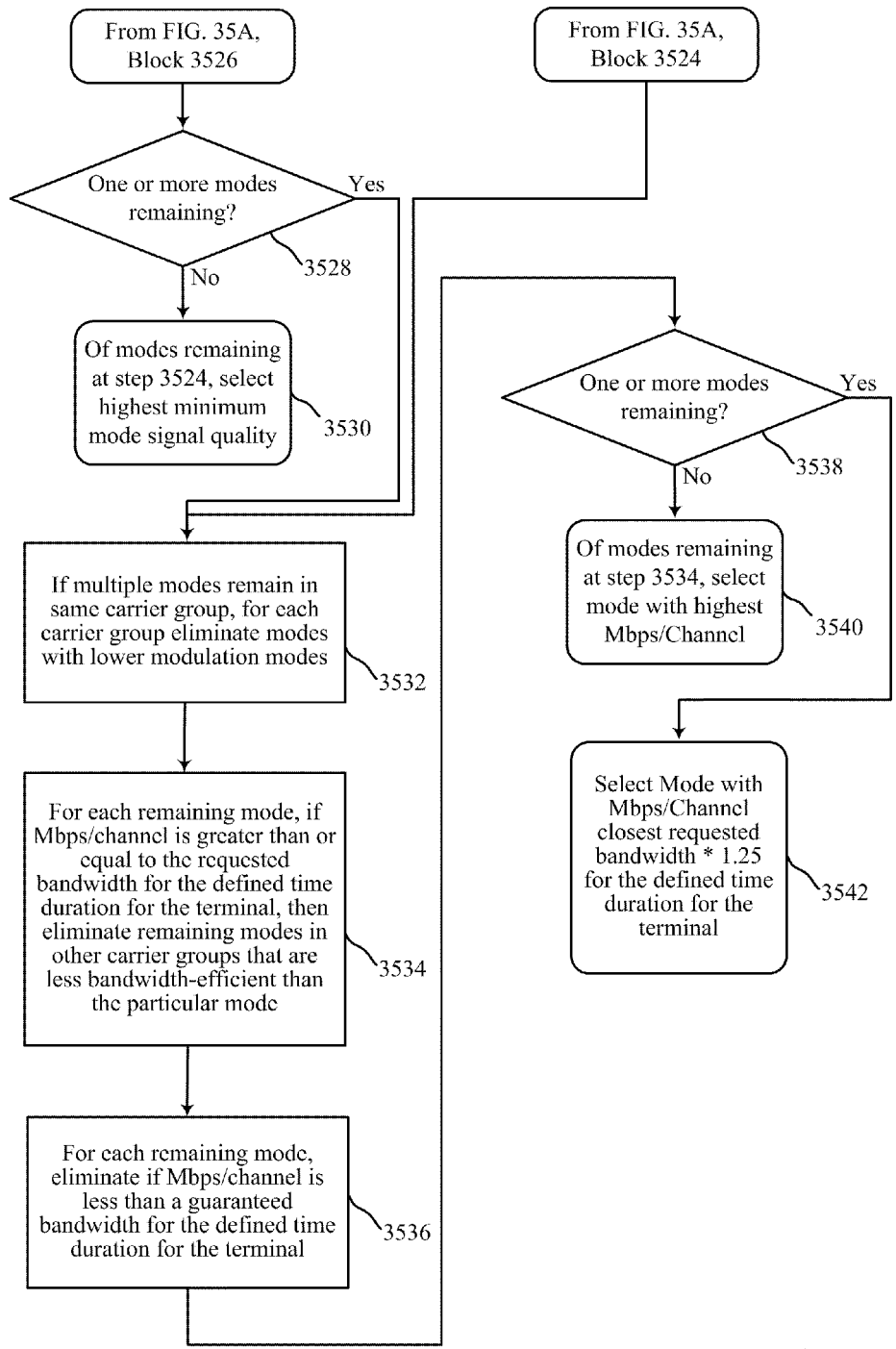

From block 3526, this branch of the process goes to block 3528 in FIG. 35B, and a determination is made whether one or more modes remain after block 3526. If not, at block 3530, the mode with the highest minimum mode signal quality metric of the modes remaining at step 3524 is selected as the mode for the terminal. If one or more modes remain at block 3528 (or continuing from block 3524 of FIG. 35A), at block 3532, modes with lower modulation modes are eliminated for each carrier group with multiple modes remaining.

At block 3534, for each remaining mode, if the Mbps/channel is greater than or equal to the requested bandwidth for the defined time duration for the terminal, then the remaining modes in other carrier groups that are less bandwidth-efficient than the particular mode are eliminated. At block 3536, those modes whose Mbps/channel is less than a guaranteed bandwidth for the defined time duration for the terminal are eliminated. At block 3538, a determination is made whether one or more modes remain from block 3536. If not, at block 3540, the mode with the highest Mbps/Channel of the modes remaining at step 3534 is selected as the mode for the terminal. If one or more modes remain at block 3538, the mode with the Mbps/Channel closest to the requested bandwidth for the defined time duration for the terminal*1.25 is selected.

The following pseudocode represents two different examples of the terminal mode assignment functionality described herein:

Reqkbps=Sum(ReqMbps[class]) for all class
GIRkbps=Sum(max(min(ReqMbps[class], CIR[class]), MinSR[class]) for all class
If terminal does not report uplink Pr/No (or SNR), but reports least robust mode instead, then may compute Pr/No=Pr/No of least robust mode+margin.

Alternative 1:
1. Terminal Pr/No=Measured Pr/No−margin.
2. Start with list of modes that are supported by the terminal.
3. If preference=power-efficient-modes, then eliminate modes designated bandwidth-efficient modes.
4. Select mode whose required Pr/No is lower than and closest to terminal Pr/No.

Alternative 2:
1. Terminal Pr/No=Measured Pr/No−margin.
2. Start with list of modes that are supported by the terminal.
3. Eliminate modes whose required Pr/No>terminal Pr/No. If no modes remain, select most robust mode as mode for terminal.
4. If preference=power-efficient-modes, then eliminate modes designated bandwidth-efficient modes.
5. If power control not supported by terminal, then eliminate modes whose required Pr/No value+ PCmargin<terminal Pr/No. If no modes remain, select mode with highest Pr/No as mode for terminal.
6. If mode x is eligible, then eliminate modes in same carrier group with lower modulation modes.
7. If mode x is eligible and Mbps/channel>=ReqMbps, then eliminate remaining modes in other carrier groups that are less bandwidth-efficient than x.
8. Eliminate modes whose Mbps/Channel<GIRMbps. If no modes remain, select mode with highest Mbps/channel.
9. Select mode whose Mbps/Channel is closest to x*ReqMbps, preferably higher.
10. Compute load based on assigned mode for all terminals If load above threshold, for each terminal return to step 8 to identify remaining modes, then do steps 11-12 for each terminal.
11. If Mbps/channel<GIRkbps for all modes, then select mode whose kbps/channel is closest to GIRkbps.
12. Otherwise eliminate modes with Mbps/channel<GIRkbps, eliminate lower-efficiency modes and, select the mode whose Mbps/Channel is closest to Reqkbps, preferably higher.

Parameters for Alternative 2 (which are Examples Only, and May be Modified or Excluded):
Margin=[1.5] dB for fixed terminals, [3] dB for COTM terminals.
PCmargin=[3] dB
x=[1.25]
Both alternatives may be selectable in some embodiments, while in other embodiments only one may be selected.

Resource Sharing Policies: There are a number of policy options for resource sharing when available resources are insufficient to meet aggregate MinSR, CIR, or RIR requests. In some embodiments, a sharing policy provides priority or weighted allocations to the certain classes (e.g., the GS or voice class). Allocations may also be in proportion to the CIR requests for one or more classes at one or more terminals. For traffic in excess of CIR, there may be a different allocation scheme. A number of other possible policies may be used in various embodiments, and such policies may be dynamically or more permanently configurable.

When resources are insufficient to meet aggregate MinSR, CIR, or RIR requests, there are a number of ways the available resources may be distributed. In one embodiment, one of the following policies may be selected depending on when in the process there are insufficient resources: 1) A Proportional policy may distribute insufficient resources in a same percentage of a requested amount across a set of terminals (e.g., for a particular traffic class or a set of classes), or across a set of beams (e.g., among terminals of a given priority or set of priorities); 2) A Weighted Proportional policy may distribute insufficient resources in two or more different percentages across a set of terminals or across a set of beams (e.g., for a set of classes, voice or other preferred classes may receive a greater percentage, but the percentage amount may be the same for each class); 3) A Fair Share policy may distribute insufficient resources in a same amount across a set of terminals (e.g., for a particular traffic class or a set of classes), or across a set of beams (e.g., among terminals of a given priority or set of priorities), while ensuring that no allocation is more than requested; 4) A Weighted Fair Share policy may distribute insufficient resources in two or more same amounts across a set of terminals or across a set of beams (e.g., for a set of classes, voice or other preferred classes may receive a greater amount, but the amount may be the same for each class), while ensuring that no allocation is more than requested. Other policies may be used, such as a policy when all requests have been filled and there is an extra share to be allocated, a set fraction may be distributed equally among groups.

As noted throughout this Disclosure, there are a number of instances when the above policies may be implemented. In a given system (such as the system 100 of FIG. 1), different policies may be implemented at different steps in the process. Consider, for example, bandwidth allocation across beams. The fairness policies 1045 described with reference to FIG. 10 for bandwidth allocation across beams may be the fairness policies described above. During any of the allocations (e.g., at a given priority level), if there is insufficient MinSR, CIR, or RIR for that priority level, the resources may be allocated according to a Proportional, Weighted Proportional, Fair Share, or Weighted Fair Share policy. The policy being used may vary when there are different loads, or vary between different types of requests (e.g., CIR and RIR requests).

Similarly, the fairness policies 1845 described with reference to FIG. 18 for carrier group apportionment may be the fairness policies described above. During the carrier group apportionment (e.g., at a given class, or priority level), if there is insufficient MinSR, CIR, or RIR, for that level, the resources may be apportioned according to a Proportional, Weighted Proportional, Fair Share, or Weighted Fair Share policy. The policies may also be used during class pool sizing (e.g., block 2245 of FIG. 22) and terminal assignment (e.g., block 2945 of FIG. 29).

The following pseudocode represents examples of the fairness policies described above:

```
Input parameters -
    Rmax -   Total number of resource units
    R[k*] -  Resource Request Values for each group k
    Policy - {WProportional, Proportional, WFS, FS}
    HighPriorityGroupList -
             {group, ...}
    w[k*] -  Weight value for each group k. Used when
             Policy = WProportional or WFS
Output -
    A[k*] -  Resource allocation for each group k
    If Policy = WProportional, then
        A[k] = R[k] * w[k] * x, x is largest value possible so that
        sum(A[k]) <= RMax;
```

-continued

```
If Policy = Proportional, then
    A[k] = R[k] * x, x is largest value possible so that
    sum(A[k]) <= RMax
If Policy = WeightedFS, then
    A[k] = min(w[k] * F, R[k]), F is largest value possible
    so that sum(A[k]) <= RMax
If Policy = FS, then
    A[k] = min(F, R[k]), F is largest value possible
    so that sum(A[k]) <= RMax
```

The following pseudocode represents examples of the extra share policies described above:

```
Input parameters -
    Rmax -     Total number of resource units
    w[k*] -    Weight values for each group
    F          Fraction of Rmax shared equally among groups
    K          Number of groups
Output -
    A[k*] -    Resource assignments
Algorithm -
    -- Share F fraction of Rmax equally among groups
    A1[k] = Rmax * F / K for each k
    -- Share 1-F fraction of Rmax in weighted proportion
    A2[k] += w[k] * x, x is largest value possible
        so that sum(A2[k]) <= RMax * (1 - F)
    A[k] = A1[k] + A2[k] for each k
```

Any of the functionality described above with reference to the satellite 105, terminals 130, or NCC 140 of FIG. 1, or components thereof (e.g., a modem unit 115 or DBRA control unit 125), may be implemented in one or more Application Specific Integrated Circuits (ASICs), or in one or more general purpose processors adapted to perform the applicable functions. Alternatively, the functions of a satellite 105 may be performed by one or more other processing units (or cores) on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for allocating bandwidth resources in a multi-beam satellite communications network having a plurality of terminals in each of a plurality of beams, the bandwidth resources defined in resource units, the method comprising:
receiving a resource request from each of at least a subset of the plurality of terminals in a beam of the plurality of beams, wherein at least a subset of resource requests identify an amount of requested resource units and a requested carrier group for the requesting terminal;
identifying an amount of allocatable resource units for the beam for a defined time duration, the amount of allocatable resource units for the beam determined responsive to the received resource requests for the beam relative to other beams of the plurality of beams; and
allocating the amount of resource units for the beam for the defined time duration among a plurality of carrier groups for the beam using a prioritization scheme corresponding to a set of resource obligations to generate a carrier group allocation associated with each of the plurality of carrier groups, the allocating responsive to the requested carrier groups for the at least the subset of the plurality of terminals in the beam.

2. The method of claim 1, wherein the allocating among the plurality of carrier groups comprises:
dynamically changing the carrier group allocation, wherein an amount of requested resource units for one or more carrier groups of the plurality of carrier groups for the defined time duration is different from an amount of requested resource units for the one or more carrier groups of the plurality of carrier groups for a prior time duration, the amount of requested resource units for the prior time duration determined according to prior resource requests.

3. The method of claim 2, wherein the defined time duration is substantially adjacent to the prior time duration.

4. The method of claim 1, wherein the set of resource obligations are specified in the resource requests, and the specified resource obligations include:
a minimum sustained rate for communications from each requesting terminal;
a committed information rate for communications from each requesting terminal; and
a requested information rate for communications from each requesting terminal.

5. The method of claim 4, wherein the set of resource obligations is specified for each of a plurality of traffic classes.

6. The method of claim 1, wherein the allocating among the plurality of carrier groups comprises:
allocating among each of the carrier groups in an order corresponding to a terminal prioritization scheme.

7. The method of claim 1, wherein,
the resource requests identify one or more traffic classes associated with different portions of the amount of requested resource units for each requesting terminal;
each requesting terminal is associated with a priority level; and
the allocation among the plurality of carrier groups is further responsive to the traffic class associations and the terminal priority levels for the resource requests.

8. The method of claim 1, wherein the allocating among the plurality of carrier groups comprises:
allocating to each carrier group of the plurality of carrier groups, a minimum sustained rate resource request specified in the received resource requests for each carrier group;
allocating to each carrier group, after allocating the minimum sustained rate resource request, a committed information rate resource request specified in the received resource requests for each carrier group; and
allocating to each carrier group, after allocating the committed information rate resource requests, a requested information rate resource request specified in the received resource requests for each carrier group.

9. The method of claim 1, wherein the allocating among the plurality of carrier groups comprises, for each of a series of allocation steps:
determining whether a sufficient amount of the allocatable resource units remain to satisfy an allocation associated with the respective allocation step; and
when there is not the sufficient amount of allocatable resource units remaining to satisfy the allocation associated with the allocation step, allocating a remainder of the allocatable resource units among the plurality of carrier groups according to a fairness policy.

10. The method of claim 1, further comprising:
monitoring an amount of data traffic associated with the resource requests; and
changing the defined time duration as the monitored data traffic flow varies.

11. The method of claim 1, further comprising:
generating an amount of requested resource units from the resource requests for the defined time duration, wherein the received resource requests are associated with the defined time duration and different portions of the generated amount are associated with different carrier groups of the plurality of carrier groups.

12. The method of claim 1, wherein the amount of allocatable resource units for the defined time duration is determined based on the amount of requested resource units in the received resource requests for the beam for the time duration relative to other beams of the plurality of beams for the time duration.

13. The method of claim 1, wherein the method is performed by the satellite.

14. The method of claim 1, wherein the method is performed by a network control center, and the bandwidth resource comprises uplink bandwidth resources.

15. A system for allocating bandwidth resources in a beam of a satellite communications network having a plurality of terminals, the bandwidth resources defined in resource units and the beam including a plurality of carrier groups, the system comprising:
a beam request compilation module configured to:
receive one or more resource requests from each of at least a subset of the plurality of terminals in the beam, wherein at least a subset of resource requests identifies an amount of requested resource units and a requested carrier group for the requesting terminal; and
generate an amount of requested resource units from the received resource requests, wherein different portions of the amount are associated with different carrier groups of the plurality of carrier groups;
a beam resource module configured to identify an amount of allocatable resource units for the beam for a defined time duration; and
a carrier group allocation module, communicatively coupled with the beam request compilation module and the beam resource module, and configured to allocate the amount of allocatable resource units for the beam for the defined time duration among the plurality of carrier groups using a prioritization scheme corresponding to a set of resource obligations to generate a carrier group allocation associated with each of the plurality of carrier groups, the carrier group allocation responsive to the portions of the amount of requested resource units associated with respective carrier groups of the plurality of carrier groups.

16. The system of claim 15, wherein the carrier group allocation module is configured to:
dynamically change the carrier group allocation, wherein an amount of requested resource units for one or more carrier groups of the plurality of carrier groups for the defined time duration is different from an amount of requested resource units for the one or more carrier groups of the plurality of carrier groups for a prior time duration, the amount of requested resource units for the prior time duration determined according to prior resource requests.

17. The system of claim 15, wherein the set of resource obligations is specified for each of a plurality of traffic classes, and the prioritization scheme specifies that allocating is performed in an order corresponding to traffic class priority.

18. The system of claim 15, wherein,
the resource requests identify one or more traffic classes associated with different portions of the amount of requested resource units for each requesting terminal;
each requesting terminal is associated with a priority level; and
the allocation among the plurality of carrier groups is further responsive to the traffic class associations and the terminal priority levels for the resource requests.

19. The system of claim 15, wherein the carrier group allocation module is configured to perform the allocation among the plurality of carrier groups by:
- allocating to each carrier group of the plurality of carrier groups, a minimum sustained rate resource request specified in the received resource requests for each carrier group;
- allocating to each carrier group, after allocating the minimum sustained rate resource requests, a committed information rate resource request specified in the received resource requests for each carrier group; and
- allocating to each carrier group, after allocating the committed information rate resource requests, a requested information rate resource request specified in the received resource requests for each carrier group.

20. The system of claim 15, further comprising a monitoring module, communicatively coupled with the carrier group allocation module, and configured to:
- monitor a variance in an amount of data traffic associated with the resource requests for the beam for each of the plurality of carrier groups for each of a series of time durations; and
- change a length of the defined time duration change when the variance exceeds a threshold.

21. The system of claim 15, wherein the system comprises the satellite, a gateway, or any combination thereof.

22. A system for allocating bandwidth resources in a multi-beam satellite communications network having a plurality of terminals in each of a plurality of beams, the bandwidth resources defined in resource units, the system comprising:
- the plurality of terminals in a beam of the plurality of beams, wherein at least a subset of the plurality of terminals in the beam are each configured to transmit a resource request identifying an amount of requested resource units and a requested carrier group for the requesting terminal;
- a network control center in communication with the at least a subset of the terminals via satellite, and configured to:
  - receive the resource requests;
  - generate, for a defined time duration, an amount of requested resource units for respective carrier groups of a plurality of carrier groups for the beam from the received resource requests;
  - identify an amount of allocatable resource units for the beam for the defined time duration; and
  - allocate the amount of resource units for the beam for the defined time duration among a plurality of carrier groups using a prioritization scheme corresponding to a set of resource obligations to generate a carrier group allocation associated with each of the plurality of carrier groups, the allocation responsive to the amount of requested resource units for respective carrier groups for the defined time duration.

23. The system of claim 22, wherein,
- the network control center comprises a plurality of devices;
- the bandwidth resources comprise bandwidth resources on the satellite uplink for the beam; and
- the resource requests comprise resource requests for the plurality of terminal within the beam on the satellite uplink.

24. A device for allocating bandwidth resources in a satellite communications network having a plurality of terminals in a beam of the satellite, the bandwidth resources defined in resource units, the device comprising:
- means for receiving resource requests from each of at least a subset of the plurality of terminals in the beam, wherein at least a subset of resource requests identifies an amount of requested resource units and a requested carrier group for the requesting terminal;
- means for generating, for a defined time duration, an amount of requested resource units for respective carrier groups of a plurality of carrier groups for the beam from the received resource requests;
- means for identifying an amount of resource units for the beam for the defined time duration; and
- means for allocating the amount of resource units for the beam for the defined time duration among the plurality of carrier groups using a prioritization scheme corresponding to a set of resource obligations to generate a carrier group allocation associated with each of the plurality of carrier groups, the allocating responsive to the amount of requested resource units for respective carrier groups.

* * * * *